US012659749B2

(12) United States Patent
Opulskis et al.

(10) Patent No.: US 12,659,749 B2
(45) Date of Patent: Jun. 16, 2026

(54) PROVISIONING MULTI-PROVIDER SECURE SUBSCRIBER IDENTIFICATION MODULE SERVICES

(71) Applicant: UAB 360 IT, Vilnius (LT)

(72) Inventors: Linas Opulskis, Vilnius (LT); Emanuelis Norbutas, Vilnius (LT); Vykintas Maknickas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 19/376,436

(22) Filed: Oct. 31, 2025

(65) Prior Publication Data

US 2026/0143310 A1     May 21, 2026

Related U.S. Application Data

(60) Provisional application No. 63/722,216, filed on Nov. 19, 2024.

(51) Int. Cl.
| | |
|---|---|
| *H04W 4/24* | (2024.01) |
| *H04L 67/02* | (2022.01) |
| *H04W 8/18* | (2009.01) |

(52) U.S. Cl.
CPC .............. *H04W 4/24* (2013.01); *H04L 67/02* (2013.01); *H04W 8/18* (2013.01)

(58) Field of Classification Search
CPC ......... H04W 4/24; H04W 8/18; H04W 12/35; H04L 67/02; H04L 63/0853; H04L 63/20
See application file for complete search history.

(56) References Cited

U.S. PATENT DOCUMENTS

| | | | | |
|---|---|---|---|---|
| 11,184,766 | B1 | 11/2021 | Lord et al. | |
| 11,678,172 | B2 * | 6/2023 | Chaugule .............. | H04W 8/205 |
| | | | | 455/419 |
| 12,323,551 | B2 * | 6/2025 | Johnson ............ | H04M 15/8038 |
| 12,507,071 | B1 * | 12/2025 | Mikulskij ............. | H04W 12/72 |
| 2018/0063697 | A1 | 3/2018 | Li et al. | |
| 2018/0367578 | A1 | 12/2018 | Verma et al. | |
| 2022/0322068 | A1 * | 10/2022 | Chughtai .............. | H04W 8/183 |
| 2022/0345492 | A1 | 10/2022 | Wu et al. | |
| 2022/0394457 | A1 * | 12/2022 | Mene ................ | H04M 15/8214 |
| 2024/0007848 | A1 * | 1/2024 | Chaugule .............. | H04W 8/265 |
| 2024/0064133 | A1 * | 2/2024 | Ahmed .................... | H04W 4/60 |
| 2024/0314237 | A1 * | 9/2024 | Garcia Fernandez ....................... | |
| | | | | H04M 3/42059 |

(Continued)

FOREIGN PATENT DOCUMENTS

WO          2024023628          2/2024

*Primary Examiner* — Khawar Iqbal
(74) *Attorney, Agent, or Firm* — Young Basile Hanlon & MacFarlane, P.C.

(57)          ABSTRACT

Disclosed herein are techniques associated with an embedded subscriber identification module (eSIM) service. A first request message, including a plan identifier for a service plan, is received from a client device. A target service provider module corresponding to the service provider system is identified based on the plan identifier. The module is a dedicated data structure stored in an intermediary system. An order creation request signal is provided to complete an order for the plan. After receiving a subscription creation confirmation, an order completion status is received. An indication of the completed order is posted to a subscription change topic to cause an event handler to provide an updated order status signal.

20 Claims, 20 Drawing Sheets

(56)       References Cited

U.S. PATENT DOCUMENTS

| 2024/0340622 | A1* | 10/2024 | Raleigh | ................. | H04M 15/80 |
| 2024/0414525 | A1* | 12/2024 | Nearing | ................ | H04W 8/265 |
| 2025/0324257 | A1* | 10/2025 | Coyle | ................... | H04W 12/30 |

\* cited by examiner

100

102

DATA INTERFACE

112

104

PROCESSOR

106

MEMORY

108

POWER

110

USER INTERFACE

300

302

400

402

CLIENT

416

SIM 1

418

SIM 2

404

NETWORK

406

SERVICE PROVIDER SYSTEM

408

SERVICE PROVIDER SYSTEM

410

INTERMEDIARY SYSTEM

412

TARGET

414

TARGET

520

522

CLIENT

532

SIM

530

EXPERIENCE
SERVICE
COMPONENT

524

NETWORK

526

INTERMEDIARY SYSTEM

534

SECURITY SERVICE
PLATFORM

536

POP SYSTEM

538

VPN

528

TARGET

1500

1502

RECEIVE A COMMUNICATION
ORIGINATING FROM A CLIENT DEVICE
AND DIRECTED TO A TARGET

1504

GENERATE, BASED ON THE
COMMUNICATION AND A SUBSCRIBER
IDENTIFICATION MODULE (SIM)
SECURITY SERVICE, A SECURE
COMMUNICATION

1506

PROVIDE THE SECURE
COMMUNICATION TO THE TARGET

1600

1602

RECEIVE, FROM A SERVICE PROVIDER SYSTEM, FIRST METADATA ASSOCIATED WITH A COMMUNICATION ORIGINATING FROM A CLIENT DEVICE AND DIRECTED TO A TARGET

1604

TRANSMIT, TO A POP AND BASED ON A SIM SECURITY SERVICE, SERVICE INFORMATION COMPRISING THE FIRST METADATA AND SECOND METADATA ASSOCIATED WITH THE CLIENT

1700

1702

RECEIVE A CLIENT REQUEST
ASSOCIATED WITH A TARGET

1704

APPLY A SIM SECURITY SERVICE TO A
COMMUNICATION TO GENERATE A
SECURE COMMUNICATION

1706

PROVIDE THE SECURE
COMMUNICATION TO THE TARGET

1800

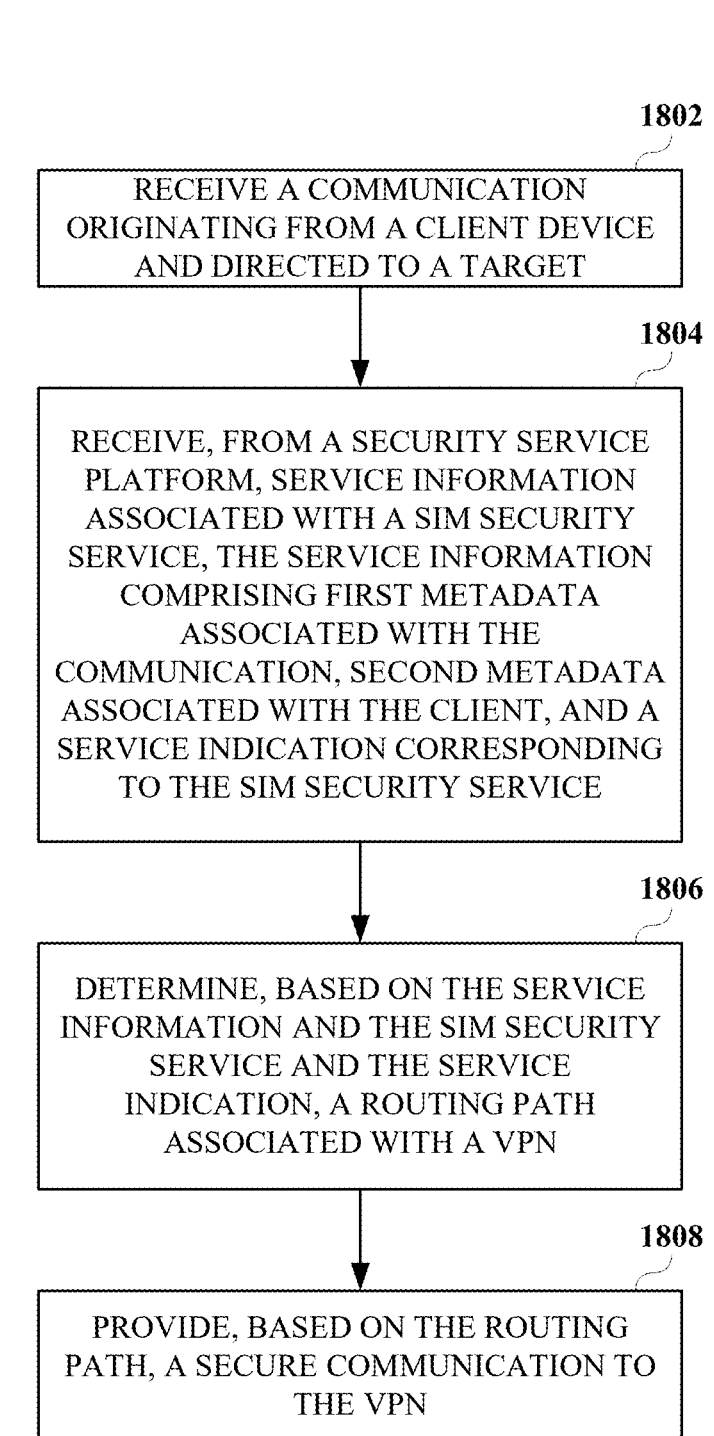

1802

RECEIVE A COMMUNICATION ORIGINATING FROM A CLIENT DEVICE AND DIRECTED TO A TARGET

1804

RECEIVE, FROM A SECURITY SERVICE PLATFORM, SERVICE INFORMATION ASSOCIATED WITH A SIM SECURITY SERVICE, THE SERVICE INFORMATION COMPRISING FIRST METADATA ASSOCIATED WITH THE COMMUNICATION, SECOND METADATA ASSOCIATED WITH THE CLIENT, AND A SERVICE INDICATION CORRESPONDING TO THE SIM SECURITY SERVICE

1806

DETERMINE, BASED ON THE SERVICE INFORMATION AND THE SIM SECURITY SERVICE AND THE SERVICE INDICATION, A ROUTING PATH ASSOCIATED WITH A VPN

1808

PROVIDE, BASED ON THE ROUTING PATH, A SECURE COMMUNICATION TO THE VPN

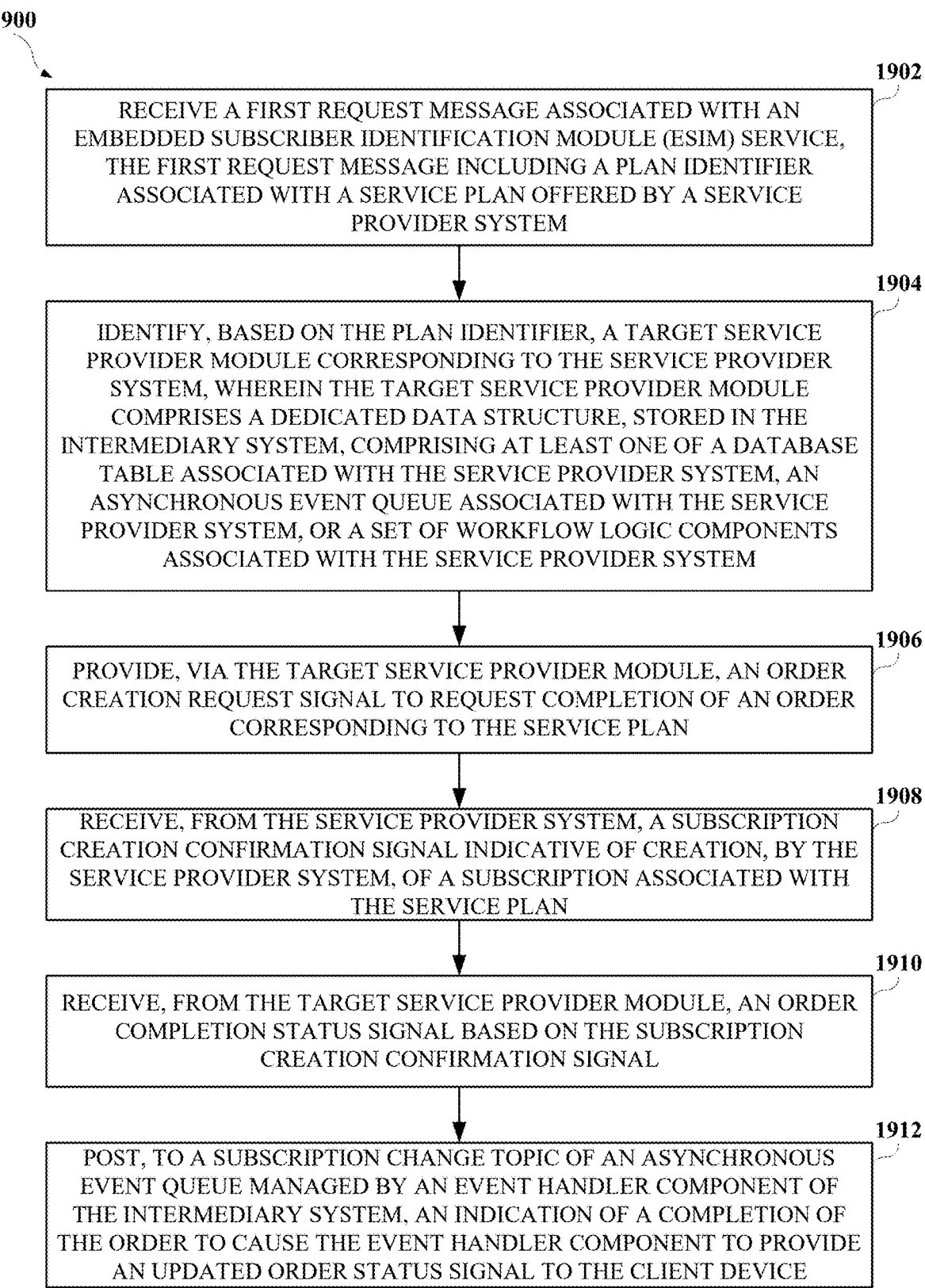

1902

RECEIVE A FIRST REQUEST MESSAGE ASSOCIATED WITH AN EMBEDDED SUBSCRIBER IDENTIFICATION MODULE (ESIM) SERVICE, THE FIRST REQUEST MESSAGE INCLUDING A PLAN IDENTIFIER ASSOCIATED WITH A SERVICE PLAN OFFERED BY A SERVICE PROVIDER SYSTEM

1904

IDENTIFY, BASED ON THE PLAN IDENTIFIER, A TARGET SERVICE PROVIDER MODULE CORRESPONDING TO THE SERVICE PROVIDER SYSTEM, WHEREIN THE TARGET SERVICE PROVIDER MODULE COMPRISES A DEDICATED DATA STRUCTURE, STORED IN THE INTERMEDIARY SYSTEM, COMPRISING AT LEAST ONE OF A DATABASE TABLE ASSOCIATED WITH THE SERVICE PROVIDER SYSTEM, AN ASYNCHRONOUS EVENT QUEUE ASSOCIATED WITH THE SERVICE PROVIDER SYSTEM, OR A SET OF WORKFLOW LOGIC COMPONENTS ASSOCIATED WITH THE SERVICE PROVIDER SYSTEM

1906

PROVIDE, VIA THE TARGET SERVICE PROVIDER MODULE, AN ORDER CREATION REQUEST SIGNAL TO REQUEST COMPLETION OF AN ORDER CORRESPONDING TO THE SERVICE PLAN

1908

RECEIVE, FROM THE SERVICE PROVIDER SYSTEM, A SUBSCRIPTION CREATION CONFIRMATION SIGNAL INDICATIVE OF CREATION, BY THE SERVICE PROVIDER SYSTEM, OF A SUBSCRIPTION ASSOCIATED WITH THE SERVICE PLAN

1910

RECEIVE, FROM THE TARGET SERVICE PROVIDER MODULE, AN ORDER COMPLETION STATUS SIGNAL BASED ON THE SUBSCRIPTION CREATION CONFIRMATION SIGNAL

1912

POST, TO A SUBSCRIPTION CHANGE TOPIC OF AN ASYNCHRONOUS EVENT QUEUE MANAGED BY AN EVENT HANDLER COMPONENT OF THE INTERMEDIARY SYSTEM, AN INDICATION OF A COMPLETION OF THE ORDER TO CAUSE THE EVENT HANDLER COMPONENT TO PROVIDE AN UPDATED ORDER STATUS SIGNAL TO THE CLIENT DEVICE

FIG. 19

PROVISIONING MULTI-PROVIDER SECURE SUBSCRIBER IDENTIFICATION MODULE SERVICES

CROSS REFERENCE TO RELATED APPLICATIONS

This application claims the benefit of U.S. Provisional Patent Application Ser. No. 63/722,216, filed Nov. 19, 2024, the entire disclosure of which is incorporated herein by reference.

BACKGROUND

Computing devices, and users thereof, use wireless services to access content. In some cases, the wireless services are provided via a subscriber identification module (SIM) networking service or an embedded SIM (eSIM) networking service.

SUMMARY

Disclosed herein are one or more examples of implementations associated with a secure SIM networking service.

In one embodiment, a method includes receiving, by a provider management component of an intermediary system and from a client device, a first request message associated with an embedded subscriber identification module (eSIM) service, the first request message including a plan identifier associated with a service plan offered by a service provider system; identifying, by the provider management component and based on the plan identifier, a target service provider module corresponding to the service provider system, wherein the target service provider module comprises a dedicated data structure, stored in the intermediary system, comprising at least one of a database table associated with the service provider system, an asynchronous event queue associated with the service provider system, or a set of workflow logic components associated with the service provider system; providing, by the provider management component via the target service provider module, an order creation request signal to request completion of an order corresponding to the service plan; receiving, by the target service provider module from the service provider system, a subscription creation confirmation signal indicative of creation, by the service provider system, of a subscription associated with the service plan; receiving, by the provider management component from the target service provider module, an order completion status signal based on the subscription creation confirmation signal; and posting, by the provider management component to a subscription change topic of an asynchronous event queue managed by an event handler component of the intermediary system, an indication of completion of the order to cause the event handler component to provide an updated order status signal to the client device.

In another embodiment, a system includes one or more memories; and one or more processors communicatively coupled with the one or more memories, the one or more processors configured to execute instructions stored in the one or more memories to cause the system to: receive, by a provider management component of the system and from a client device, a first request message associated with an eSIM service, the first request message including a plan identifier associated with a service plan offered by a service provider system; identify, by the provider management component and based on the plan identifier, a target service provider module corresponding to the service provider system, wherein the target service provider module comprises a dedicated data structure, stored in the system, comprising at least one of a database table associated with the service provider system, an asynchronous event queue associated with the service provider system, or a set of workflow logic components associated with the service provider system; provide, by the provider management component via the target service provider module, an order creation request signal to request completion of an order corresponding to the service plan; receive, by the target service provider module from the service provider system, a subscription creation confirmation signal indicative of creation, by the service provider system, of a subscription associated with the service plan; receive, by the provider management component from the target service provider module, an order completion status signal based on the subscription creation confirmation signal; and post, by the provider management component to a subscription change topic of an asynchronous event queue managed by an event handler component of the system, an indication of a completion of the order to cause the event handler component to provide an updated order status signal to the client device.

In yet another embodiment, one or more non-transitory computer-readable media store instructions operable to cause one or more processors to perform operations including receiving, by a provider management component of an intermediary system and from a client device, a first request message associated with an eSIM service, the first request message including a plan identifier associated with a service plan offered by a service provider system; identifying, by the provider management component and based on the plan identifier, a target service provider module corresponding to the service provider system, wherein the target service provider module comprises a dedicated data structure, stored in the intermediary system, comprising at least one of a database table associated with the service provider system, an asynchronous event queue associated with the service provider system, or a set of workflow logic components associated with the service provider system; providing, by the provider management component via the target service provider module, an order creation request signal to request completion of an order corresponding to the service plan; receiving, by the target service provider module from the service provider system, a subscription creation confirmation signal indicative of creation, by the service provider system, of a subscription associated with the service plan; receiving, by the provider management component from the target service provider module, an order completion status signal based on the subscription creation confirmation signal; and posting, by the provider management component to a subscription change topic of an asynchronous event queue managed by an event handler component of the intermediary system, an indication of a completion of the order to cause the event handler component to provide an updated order status signal to the client device.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 18 is a flowchart of a technique for providing a secure SIM networking service.

FIG. 19 is a flowchart of a technique for provisioning multi-provider secure subscriber identification module services.

DETAILED DESCRIPTION

Figure 1:
FIG. 1 is a block diagram of an example of a computing device.
Figure 1:
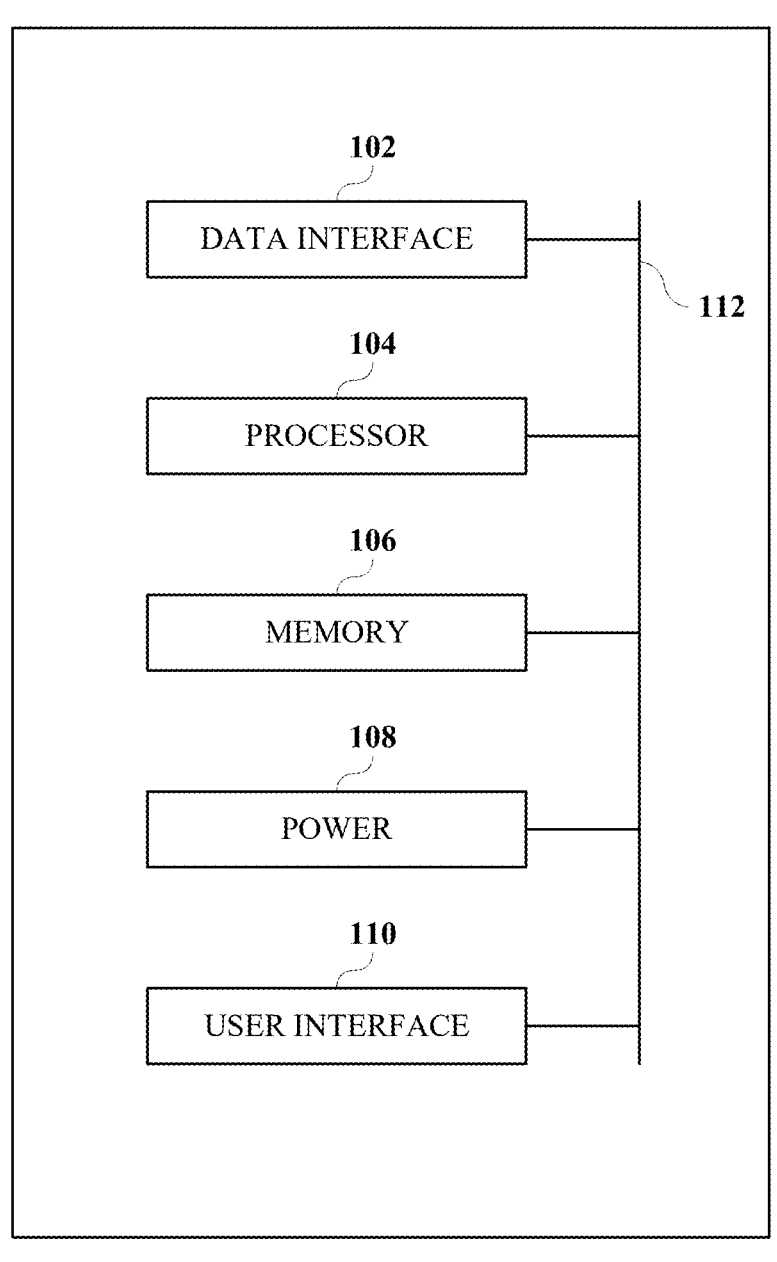

Wireless networking has revolutionized the way devices connect and communicate, allowing for seamless access to digital content and services without the need for physical connections. In traditional cellular networks, a subscriber identification module (SIM) card is used to authenticate and identify a user's device on the network. SIM technology may include traditional removable SIM cards or embedded SIM (eSIM) technology integrated directly into a device's hardware. SIMs offer functionality for securely storing subscription and identity information essential for accessing cellular networks. Traditional removable SIM cards provide a physical component that can be swapped between devices, while eSIMs offer greater flexibility by allowing users to switch between network providers without physically changing SIM cards.

While traditional SIM cards provided a physical barrier to unauthorized access, SIMs, particularly eSIMs being programmable and remotely manageable, may present a more complex security landscape. The integration of SIM functionality directly into device hardware, while offering flexibility, may also expose users to potential vulnerabilities in the digital realm. These challenges may be particularly acute in an era where cyber threats are increasingly sophisticated and pervasive.

The current SIM setup may offer limited protection against online threats such as phishing, malware, or privacy risks that arise from direct exposure to the internet. Existing security mechanisms may primarily focus on securing the transmission of data between the device and the mobile network, potentially leaving users vulnerable to a wide array of cyber threats once their traffic reaches the broader internet. Moreover, users may lack options for enhanced privacy controls, such as the ability to mask their location by choosing an exit country for their network traffic. This absence of integrated safeguards that proactively block threats and provide users with granular control over their online privacy may represent a gap in the current SIM ecosystem.

Another challenge with SIM implementations may lie in the lack of end-to-end data encryption beyond the initial connection between the device and the mobile network. While SIM connections may encrypt data during the first leg of transmission, they may not provide comprehensive encryption throughout the entire journey of the data across the internet. This limitation may expose user data to potential interception or manipulation at various points along its path, potentially compromising the confidentiality and integrity of sensitive information. Additionally, the current SIM infrastructure may not readily support advanced security features like domain name system (DNS)-based threat protection or flexible routing options that could enhance both security and performance for users.

Implementations of this disclosure may address problems such as these by providing a secure SIM networking service that enhances privacy and security for users of SIM technology. The system may include an intermediary system positioned between an access network and a target, which receives communications originating from a client device (sometimes referred to, interchangeably, as a "client") and generates secure communications based on a SIM security service. As used herein, the term "intermediary system" refers to a set of interconnected components that may include, but is not limited to, a security service platform, one or more PoPs, and a virtual private network (VPN) infrastructure.

The intermediary system may receive first information associated with the client communication from a service provider system (sometimes referred to, interchangeably, as a "service provider") and combine it with second information associated with the client to create a comprehensive security profile. This information may include, but is not limited to, a mobile station international subscriber directory number (MSISDN), an integrated circuit card identifier (ICCID), location information, and IP addresses associated with the client device or service provider system. The system may use this information to apply appropriate security measures and determine optimal routing paths for the client device's traffic. For instance, the intermediary system may select a specific PoP based on the client device's information and the requirements of the SIM security service.

Some implementations may provide flexible routing options and enhanced privacy controls. Users may specify an exit point for their traffic, which may be associated with a particular VPN server or country. This may allow users to mask their true location and bypass geographic restrictions while maintaining a secure connection. The system may determine the appropriate routing path based on the user's preferences and the SIM security service parameters, transmitting the secure communication to the selected VPN for further processing before reaching the target destination. As used herein, the term "exit point" refers to the final node through which the user's traffic passes before reaching the open internet, which may be located in a different geographic region from the user's actual location.

Some implementations may address the lack of end-to-end encryption in traditional SIM setups by incorporating VPN functionality directly into the network infrastructure. In this way, data may remain encrypted not just between the device and the mobile network, but throughout its journey across the internet. Some implementations may include DNS-based threat protection to proactively block malicious websites and other online threats. A security service platform, which may include an application programming interface (API) and a service engine, may coordinate these security features by generating service information that includes first information, second information, and security indications. As used herein, the term "engine" may include software, hardware, or a combination of software and hardware. An engine may be implemented using software stored in the memory subsystem. Alternatively, an engine may be hard-wired into the processing system. In some cases, an engine includes a combination of software stored in the memory subsystem and hardware that is hard-wired into the processing system. This comprehensive approach may provide users with a secure, private, and flexible SIM networking experience without requiring complex client-side configurations.

In addition to security and privacy gaps in conventional SIM networking, the management of multiple, disparate embedded eSIM service provider systems presents technical challenges for a platform configured to offer users a choice of connectivity options. A client-facing application or system API may face the task of implementing and maintaining separate, customized logic for each service provider system's unique interface for operations such as querying available plans, creating orders, and handling status updates. This direct integration approach can lead to a tightly coupled architecture that may be difficult to scale, maintain, and update.

The lack of a unified abstraction layer may increase development complexity, duplicate logic within the primary application, and make the overall system less resilient to changes or failures in any single service provider system's backend system. For example, updating the system to accommodate a change in one provider's API may introduce instability into the integrations with other providers. Furthermore, adding a new service provider system may involve engineering effort to build a new, bespoke integration from the ground up, hindering the platform's ability to quickly expand its offerings.

This architectural limitation may hamper development agility and complicate system reliability. If a particular service provider system's API becomes temporarily unavailable during a process such as order creation, a tightly coupled system may fail the transaction, leading to a poor user experience. Without a centralized and resilient mechanism for managing these interactions, the platform's ability to provide a seamless and reliable multi-provider eSIM service may be constrained.

Some implementations may address problems such as these by providing a provider management system configured to act as an abstraction layer between a system API and a plurality of distinct eSIM service provider systems. The disclosed subject matter introduces a centralized provider management component that exposes a common interface to the rest of the system while managing the complexities of communicating with each individual service provider system's unique backend system. Within the system's architecture, each service provider system may be represented by a corresponding internal software component, which may be referred to as a service provider module. This architecture decouples the API from the specific implementations of each eSIM service provider system, which may simplify the addition of new service provider systems.

As used herein, the term "provider management system" may refer to a collection of software and hardware components, including a provider management component, a plurality of service provider modules, and associated data stores and messaging infrastructure, configured to orchestrate eSIM service provisioning from multiple, distinct service provider systems. For example, the provider management system may receive a single request from an API and, in response, communicate with multiple service provider modules to fulfill that request. In some implementations, the provider management system may be deployed in a distributed cloud environment to facilitate scalability and resilience.

The provider management system may include a "provider management component" (which may also be referred to as a provider orchestrator or service aggregation component). As used herein, the term "provider management component" may refer to a software component configured to receive requests from an API, resolve an appropriate target service provider module (e.g., a service provider module identifiable based on the request) for the request, and proxy communications between the API and the resolved service provider module. For example, a provider management component may include a remote procedure call (RPC) server and a hypertext transfer protocol (HTTP) server to handle various communication protocols. In some implementations, the provider management component may be implemented as a set of microservices, each handling a specific function such as request routing, response aggregation, or webhook management.

The system may also include a plurality of "service provider modules" (which may also be referred to as provider components or service provider system adapters). As used herein, a "service provider module" may refer to an isolated software component that programmatically represents a unique service provider system within the system's architecture. Each service provider module may be configured to translate standardized requests from the provider management component into the specific format required by its corresponding service provider system's API. For example, a service provider module for a first service provider system may have different internal business logic and data models than a service provider module for a second service provider system. In some implementations, each service provider module may be isolated with its own dedicated database tables, message queue topics, and may reside in its own dedicated code repository to enforce technical separation and simplify independent development and deployment cycles.

The system may facilitate a resilient and highly available order creation process. For example, after successful payment processing for an eSIM service, the API may publish an order creation message to a first message topic of a message queue system. The provider management system may be configured to consume this message, resolve the target service provider module based on a composite plan identifier within the message, and transmit a corresponding order creation request to the target service provider module's API. As used herein, a "composite plan identifier" may refer to an identifier that includes both a service provider system identifier and a service-provider-specific plan identifier, which may facilitate the provider management component in routing requests to the correct service provider module. In some implementations, if an error occurs during the order creation process, such as the target provider's API being temporarily unavailable, the order creation message may be published to a second message topic for a retry operation, preventing order failures from impacting the user-facing API. This asynchronous, message-based approach decouples the order initiation from the order fulfillment, enhancing system resilience.

The provider management system may be configured to handle webhook postbacks originating from the unique service provider systems. For example, the provider management component may include an HTTP server that provides a separate, dedicated endpoint for each unique service provider system. Each dedicated endpoint may be configured with a unique authorization method corresponding to its respective service provider system to facilitate secure communication. When a webhook postback is received, such as a confirmation that an eSIM service has been successfully provisioned, the provider management component may route the data to the appropriate service provider module for processing. This confirmation may, in turn, trigger the activation of a security service for the data traffic associated with the newly provisioned eSIM.

To describe some implementations in greater detail, reference is first made to examples of hardware and software structures used to implement secure SIM networking services.

FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium. In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), UV, visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hardwired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiNM), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user.

The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

Figure 2:
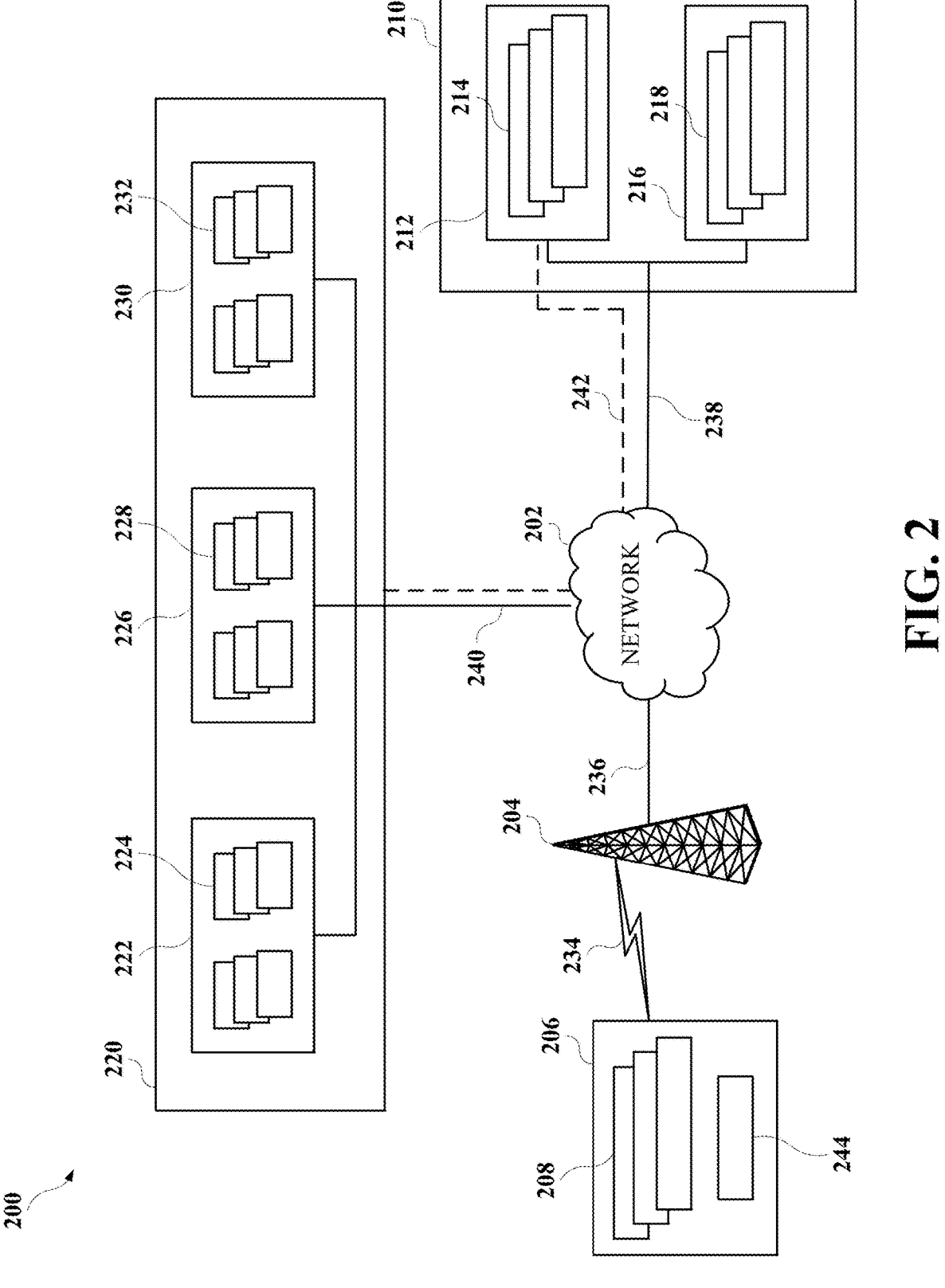
FIG. 2 is a block diagram of an example of a computing and communications system.

FIG. 2 is a diagram of an example of a computing and communications system 200. The computing and communications system 200 includes a first network 202, an access point 204, a first computing and communications device 206, a second network 210, and a third network 220. The second network 210 includes a second computing and communications device 212 and a third computing and communications device 216. The third network 220 includes a fourth computing and communications device 222, a fifth computing and communications device 226, and a sixth computing and communications device 230. Other configurations, including fewer or more computing and communications devices, fewer or more networks, and fewer or more access points, may be used.

One or more of the networks 202, 210, 220 may be, or may include, a local area network (LAN), wide area network (WAN), VPN, a mobile or cellular telephone network, the Internet, or any other means of electronic communication. The networks 202, 210, 220 respectively transmit, receive, convey, carry, or exchange wired or wireless electronic communications using one or more communications protocols, or combinations of communications protocols, the transmission control protocol (TCP), the UDP, the internet protocol (IP), the real-time transport protocol (RTP), the HTTP, or a combination thereof. For example, a respective network 202, 210, 220, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 204 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 204 is shown as a single unit, an access point can include any number of interconnected elements. Although one access point 204 is shown, fewer or more access points may be used. The access point 204 may communicate with other communicating devices via wired or wireless electronic communications links or via a sequence of such links.

As shown, the access point 204 communicates via a first communications link 234 with the first computing and communications device 206. Although the first communications link 234 is shown as wireless, the first communications link 234 may be implemented as, or may include, one or more wired or wireless electronic communications links or a sequence of such links, which may include parallel communications links for multipath communications.

As shown, the access point 204 communicates via a second communications link 236 with the first network 202. Although the second communications link 236 is shown as wired, the second communications link 236 may be implemented as, or may include, one or more wired or wireless electronic communications links or a sequence of such links, which may include parallel communications links for multipath communications.

As shown, the first network 202 communicates with the second network 210 via a third communications link 238. Although the third communications link 238 is shown as wired, the third communications link 238 may be implemented as, or may include, one or more wired or wireless electronic communications links or a sequence of such links, which may include parallel communications links for multipath communications.

As shown, the first network 202 communicates with the third network 220 via a fourth communications link 240. Although the fourth communications link 240 is shown as wired, the fourth communications link 240 may be implemented as, or may include, one or more wired or wireless electronic communications links or a sequence of such links, which may include parallel communications links for multipath communications.

The computing and communications devices 206, 212, 216, 222, 226, 230 are, respectively, computing devices, such as the computing device 100 shown in FIG. 1. For example, the first computing and communications device

206 may be a user device, such as a mobile computing device or a smartphone, the second computing and communications device 212 may be a user device, such as a laptop, the third computing and communications device 216 may be a user device, such as a desktop, the fourth computing and communications device 222 may be a server, such as a database server, the fifth computing and communications device 226 may be a server, such as a cluster or a mainframe, and the sixth computing and communications device 230 may be a server, such as a web server.

The computing and communications devices 206, 212, 216, 222, 226, 230 communicate, or exchange data, such as voice communications, audio communications, data communications, video communications, messaging communications, broadcast communications, or a combination thereof, with one or more of the other computing and communications devices 206, 212, 216, 222, 226, 230 respectively using one or more of the networks 202, 210, 220, which may include communicating using the access point 204, via one or more of the communications links 234, 236, 238, 240.

For example, the first computing and communications device 206 may communicate with the second computing and communications device 212, the third computing and communications device 216, or both, via the first communications link 234, the access point 204, the second communications link 236, the network 202, the third communications link 238, and the second network 210. The first computing and communications device 206 may communicate with one or more of the third computing and communications device 222, the fourth computing and communications device 226, the fifth computing and communications device 226, via the first communications link 234, the access point 204, the second communications link 236, the network 202, the fourth communications link 240, and the third network 220.

For simplicity and clarity, the sequence of communications links, access points, networks, and other communications devices between a sending communicating device and a receiving communicating device may be referred to herein as a communications path. For example, the first computing and communications device 206 may send data to the second computing and communications device 212 via a first communications path, or via a combination of communications paths including the first communications path, and the second computing and communications device 212 may send data to the first computing and communications device 206 via the first communications path, via a second communications path, or via a combination of communications paths, which may include the first communications path.

The first computing and communications device 206 includes, such as executes, performs, or operates, one or more applications or services 208. The second computing and communications device 212 includes, such as executes, performs, or operates, one or more applications or services 214. The third computing and communications device 216 includes, such as executes, performs, or operates, one or more applications or services 218. The fourth computing and communications device 222 includes, such as stores, hosts, executes, performs, or operates, one or more documents, applications or services 224. The fifth computing and communications device 226 includes, such as stores, hosts, executes, performs, or operates, one or more documents, applications, or services 228. The sixth computing and communications device 230 includes, such as stores, hosts, executes, performs, or operates, one or more documents, applications or services 232.

In some implementations, one or more of the computing and communications devices 206, 212, 216, 222, 226, 230 may communicate with one or more other computing and communications devices 206, 212, 216, 222, 226, 230, or with one or more of the networks 210, 220, via a virtual private network. For example, the second computing and communications device 212 is shown as communicating with the third network 220, and therefore with one or more of the computing and communications devices 222, 226, 230 in the third network 220, via a virtual private network 242, which is shown using a broken line to indicate that the virtual private network 242 uses the first network 202, the third communications link 238, and the fourth communications link 240.

In some implementations, two or more of the computing and communications devices 206, 212, 216, 222, 226, 230 may be in a distributed, or clustered, configuration. For example, the third computing and communications device 222, the fourth computing and communications device 226, and the fifth computing and communications device 226 may, respectively, be elements, or nodes, in a distributed configuration.

In some implementations, one or more of the computing and communications devices 206, 212, 216, 222, 226, 230 may be a virtual device. For example, the third computing and communications device 222, the fourth computing and communications device 226, and the fifth computing and communications device 226 may, respectively, be virtual devices operating on shared physical resources.

In some implementations, as shown in connection with the computing and communication device 206, one or more of the computing and communications devices 206, 212, 216, 222, 226, 230 may include one or more SIM components 244. A SIM component 244 may be implemented as either a traditional SIM card or an eSIM, with each providing functionality for securely storing subscription and identity information essential for accessing cellular networks. When implemented as a traditional SIM card, the SIM component 244 may conform to various standardized form factors, including full-size SIM (1FF), mini-SIM (2FF), micro-SIM (3FF), or nano-SIM (4FF). These physical SIM cards store user-specific data, such as the International Mobile Subscriber Identity (IMSI), authentication keys, subscription details, and phone numbers, enabling cellular connectivity. Traditional SIM cards are often replaceable, allowing users to switch network providers or devices as needed.

Alternatively, the SIM component 244 may be implemented as an eSIM, which is a non-removable module conforming to the embedded Universal Integrated Circuit Card (eUICC) standard. Unlike traditional SIM cards, eSIMs enable advanced features such as Remote SIM Provisioning (RSP), which allows network profiles to be updated, activated, or deactivated over-the-air without requiring physical replacement. An eSIM may store multiple network profiles simultaneously, enabling devices to connect to multiple operators or seamlessly switch between networks as required. An eSIM component may also be implemented in compact, solderable form factors such as MFF2, making it suitable for integration into rugged, space-constrained devices such as IoT sensors, connected vehicles, and industrial equipment. Furthermore, eSIMs utilize secure cryptographic protocols to protect user data, including IMSI and authentication keys, from unauthorized access.

In some implementations, the SIM component 244, whether implemented as a traditional SIM card or eSIM, may support a wide range of applications. For example, in consumer devices such as smartphones, tablets, and laptops, the SIM component 244 may enable cellular connectivity for voice, text, and data communication. In machine-to-machine (M2M) communication applications, eSIMs are widely deployed in IoT devices such as smart meters, security systems, and environmental sensors, enabling autonomous data exchange. In automotive systems, eSIMs may be used in connected vehicles to support over-the-air (OTA) software updates, real-time navigation, vehicle diagnostics, and emergency communication services. Similarly, drones and autonomous robots may use SIM components to maintain reliable connectivity for remote control, telemetry, and data exchange. In industrial IoT (IIoT) deployments, eSIMs are integrated into devices such as sensors, actuators, and programmable logic controllers (PLCs) to enable monitoring and control of industrial processes. Additional applications include wearable technology, such as smartwatches and fitness trackers, which use SIM components to facilitate cellular connectivity without relying on tethering to smartphones, and healthcare devices, such as telemedicine platforms and remote patient monitoring systems, which use eSIMs to enable real-time data exchange and emergency alerts.

SIM networking refers to the use of SIM technology, which enables computing and communication devices to authenticate and connect to mobile network operators (MNOs). SIM technology may include traditional SIM technology or eSIM technology. Traditional SIM technology typically employs a removable SIM card that stores essential information, including the IMSI, authentication keys, and subscription details, allowing the device to access the MNO's network. Upon insertion into a compatible device, the SIM card facilitates communication with the MNO's infrastructure, where the network verifies the device's credentials, assigns resources such as an IP address, and configures network parameters like the Access Point Name (APN). Data traffic from the device is then routed through the MNO's infrastructure to access internet services.

eSIM networking refers to the use of eSIM technology, which integrates a programmable subscriber identification module directly into the computing or communication device. Unlike traditional SIM cards, eSIMs conform to the eUICC standard and are soldered onto the device's circuit board, making them non-removable. This architecture enables advanced features, including remote provisioning, where users can download and activate carrier profiles over-the-air without the need to physically replace SIM cards. eSIM networking simplifies subscription management by allowing users to switch between mobile carriers or add new subscriptions remotely. In eSIM networking, when a carrier profile is downloaded and activated, the eSIM securely stores the IMSI, authentication keys, and network-specific settings. The device then communicates with the MNO's infrastructure to authenticate the stored credentials. Following authentication, the MNO assigns necessary network resources, including an IP address, and applies appropriate network settings, such as APN configurations. As with traditional SIM technology, the data traffic is routed through the MNO's infrastructure before reaching the internet. Additionally, eSIM networking supports multi-profile management, allowing a single eSIM to store multiple carrier profiles. This capability enables the device to operate across multiple MNOs, dynamically switching between them as required.

In some implementations, SIM networking may be used for communication not destined for the internet. For example, SIM networking may be used in enterprise environments, home networking environments, and/or Internet-of-Things systems, among other examples.

Figure 3:
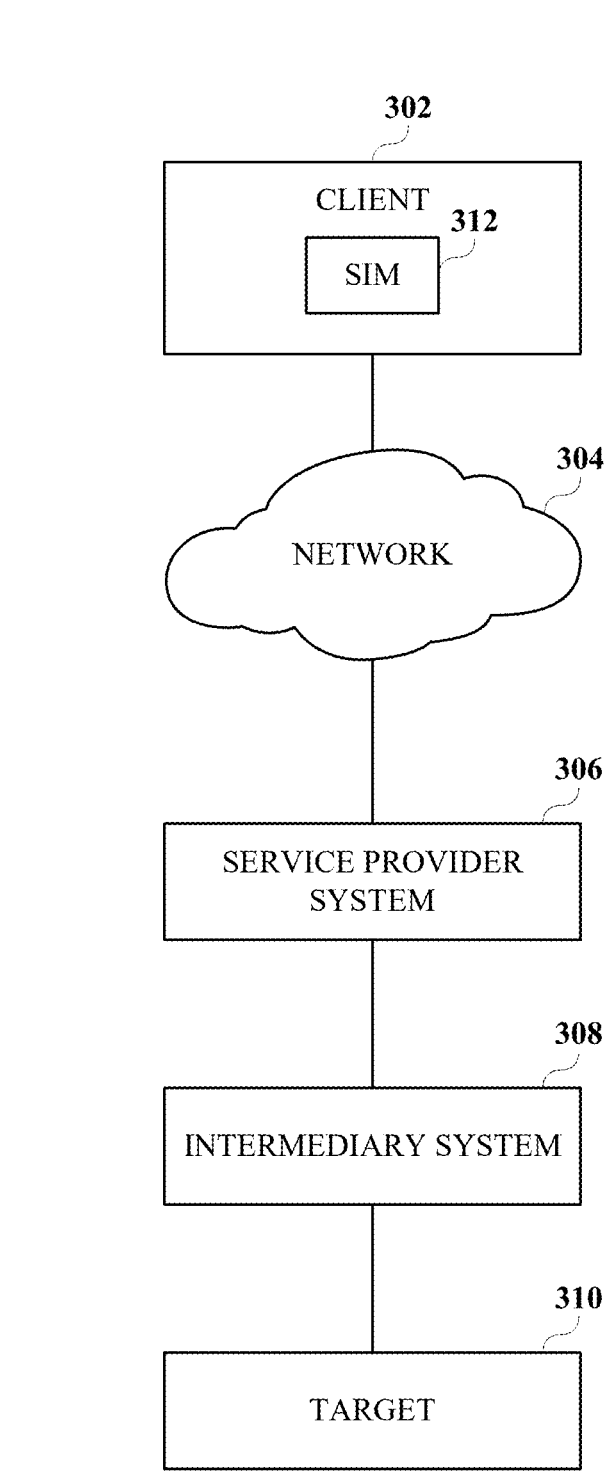
FIG. 3 is a block diagram of a system in which a secure subscriber identification module (SIM) networking service can be implemented.

FIG. 3 is a block diagram of a system 300 in which a secure SIM networking service can be implemented. The system 300 includes a client device 302, a network 304, a service provider system 306, an intermediary system 308, and a target 310, which are communicatively connected.

Each of the client device 302, the network 304, the service provider system 306, the intermediary system 308, and the target 310 may be generically referred to as a system component. A system component refers to one or more devices and/or applications. Where a system component is or refers to a device, the system component can be, be similar to, include, or be included in a computing system, which can include one or more computing devices (e.g., one or more of the computing device 100 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client device 302 may be any computing device capable of wireless communication, such as a smartphone, tablet, laptop, Internet-of-Things (IoT) device, or wearable technology. The client device 302 may include an SIM component 312. As described herein, the SIM component 312 may be a removable SIM component or an embedded component that stores and manages multiple network operator profiles, allowing the client device 302 to connect to different mobile networks. For example, the client device 302 may be a smartphone or a smartwatch with an SIM component 312 that enables cellular connectivity for making calls and accessing data services. In some implementations, the client device 302 may include multiple SIM components or a hybrid system combining both eSIM and traditional physical SIM capabilities.

The network 304 may include a communication infrastructure that facilitates data transmission between the client device 302 and the service provider system 306. This network may encompass various technologies such as cellular networks (e.g., 4G, 5G, 6G, etc.), Wi-Fi networks, or other wireless communication protocols. In some implementations, the network 304 may include multiple interconnected networks, potentially spanning different geographical regions or operated by different entities. For instance, the network 304 could comprise a combination of a local Wi-Fi network and a global cellular network, allowing seamless transition between connectivity options.

The network 304 may include one or more radio access technologies (RATs) that enable wireless communication between the client device 302 and the service provider system 306. These RATs may include, but are not limited to, GSM, UMTS, LTE, 5G New Radio (NR), Wi-Fi, Bluetooth, Zigbee, or other wireless communication standards. In some implementations, the network 304 may support multiple RATs simultaneously, allowing devices to switch between different technologies based on availability, signal strength, or specific communication requirements.

The network 304 may also incorporate various network elements and infrastructure components to support data transmission and routing. These may include base stations, Node Bs, eNodeBs, gNodeBs, access points, routers, switches, and gateways. In some cases, the network 304 may utilize software-defined networking (SDN) and network function virtualization (NFV) technologies to provide flexible and scalable network management. The network 304 may also implement various protocols and technologies to enhance security, quality of service, and network efficiency, such as Internet Protocol Security (IPSec), Transport Layer Security (TLS), Multi-Protocol Label Switching (MPLS), or Software-Defined Wide Area Network (SD-WAN) capabilities.

The service provider system 306 is typically an MNO or mobile virtual network operator (MVNO) that provides cellular connectivity services to the client device 302. The service provider system 306 manages user authentication, assigns network resources, and routes traffic between the client device 302 and the broader internet. In the context of eSIM technology, the service provider system 306 may offer remote SIM provisioning services, allowing users to download and activate new cellular plans without physical SIM cards. Some implementations may include multiple service provider systems working in conjunction to offer global or specialized connectivity services.

The intermediary system 308 may serve as a secure gateway that enhances the privacy and security of SIM-based communications. The intermediary system 308 may include multiple sub-components, including a security service platform, a PoP system including one or more PoPs, and/or a VPN system, which may include any number of VPNs. This system addresses the technical problem of limited security and privacy controls in traditional SIM setups by providing a flexible, user-controlled security layer.

The intermediary system 308 may receive requests originating from the client device 302 and generate secure requests based on an SIM security service. This process involves analyzing metadata associated with the request and the client device, applying security policies, and potentially rerouting the traffic through secure channels. For example, when a user attempts to access a website, the intermediary system 308 may check the request against known malicious domains, apply encryption, and route the traffic through a VPN server in a user-specified location such as, for example, a country, a state, a city, or other region. The intermediary system 308 may also implement DNS-based threat protection to proactively block access to potentially harmful websites. In some implementations, the system may provide users with options to customize their privacy settings, such as selecting a preferred exit point for their traffic or enabling enhanced encryption for sensitive communications. By combining these security measures with the flexibility of SIM technology, the intermediary system 308 may create a robust and adaptable secure networking service that addresses the evolving needs of wireless devices.

The target 310 represents a destination for communications originating from the client device 302. The target 310 may include a website, an application server, or any other network resource. The target 310 receives the secure request generated by the intermediary system 308, which may appear to originate from a different location or have additional security measures applied. For instance, if a user in the United States configures their SIM security service to route traffic through Germany, the target 310 would perceive the request as coming from a German IP address.

In operation, the system 300 provides a secure SIM networking service that enhances user privacy and security. When the client device 302 initiates a request, it is first sent through the network 304 to the service provider system 306. The service provider system 306 then forwards the request, along with relevant metadata, to the intermediary system 308. This metadata may include information such as the client device's MSISDN, an ICCID, or location data. The intermediary system 308 may process this information, combining it with user preferences and security policies defined by the SIM security service. The intermediary system 308 may generate a secure request that may involve rerouting the traffic, applying encryption, or implementing other security measures. The secure request is then forwarded to the target 310, completing the communication path.

Figure 4:
FIG. 4 is a block diagram of a system in which a secure SIM networking service can be implemented.

FIG. 4 is a block diagram of a system 400 in which a secure SIM networking service can be implemented. The system 400 includes a client device 402, a network 404, a service provider system 406, a service provider system 408, an intermediary system 410, a target 412, and a target 414, which are communicatively connected.

Each of the client device 402, the network 404, the service provider system 406, the service provider system 408, the intermediary system 410, the target 412, and the target 414 may be generically referred to as a system component. A system component refers to one or more devices and/or applications. Where a system component is or refers to a device, the system component can be, be similar to, include, or be included in a computing system, which can include one or more computing devices (e.g., one or more of the computing device 100 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client device 402 includes a first SIM 416 and a second SIM 418, allowing the client device 402 to potentially connect to multiple service provider systems. The client device 402 may be any computing device capable of wireless communication, such as a smartphone, tablet, laptop, IoT device, or wearable technology. For example, the client device 402 could be a smartwatch with two SIMs, one for cellular connectivity and another for specialized IoT applications. In some implementations, the client device 402 may be a connected vehicle with multiple SIMs for different functions like navigation, entertainment, and vehicle diagnostics. In some implementations, the client device 402 may be a smart home hub managing various connected devices, each with its own SIM for different service provider systems or network types. In some implementations, the client device 402 may be a portable medical device with separate SIMs for transmitting patient data and receiving software updates. Although shown with two SIMs 416 and 418, the client device 402 may include any number of SIMs. In some implementations, the client device 402 may include a combination of eSIMs and traditional physical SIM cards to provide even greater flexibility in network connectivity options.

The network 404 facilitates communication between the various components of the system 400. The network 404 may encompass a wide range of communication technologies, including cellular networks (e.g., 4G, 5G), Wi-Fi, Bluetooth, or other wireless protocols. In some implementations, the network 404 may include multiple interconnected networks spanning different geographical regions or operated by different entities. For instance, the network 404 could comprise a combination of a local Wi-Fi network, a national cellular network, and a global satellite communication system, allowing for seamless connectivity across various environments and use cases. The first service provider system 406 and the second service provider system

408 provide two different cellular connectivity services to the client device 402. The first service provider system 406 and the second service provider system 408 may manage user authentication, assign network resources, and route traffic between the client device 402 and the broader internet.

The intermediary system 410 may serve as a secure gateway that enhances the privacy and security of SIM-based communications. The intermediary system 410 may be similar to the intermediary system 308 of FIG. 3. The intermediary system 410 receives requests originating from the client device 402 through either of the service provider systems (406 or 408) and generates secure requests based on an SIM security service. This process may involve analyzing metadata associated with the request and the client device, applying security policies, and potentially rerouting the traffic through secure channels. For instance, when a user attempts to access a website, the intermediary system 410 may check the request against known malicious domains, apply encryption, and route the traffic through a VPN server in a user-specified location such as, for example, a country, a state, a city, or other region. In some implementations, the intermediary system 410 may incorporate machine learning algorithms to dynamically adjust security measures based on real-time threat intelligence.

The first target 412 and the second target 414 represent different destinations for communications originating from the client device 402. These targets may include websites, application servers, or other network resources. The first target 412 and the second target 414 receive secure requests generated by the intermediary system 410, which may appear to originate from different locations or have additional security measures applied.

Figure 5A:
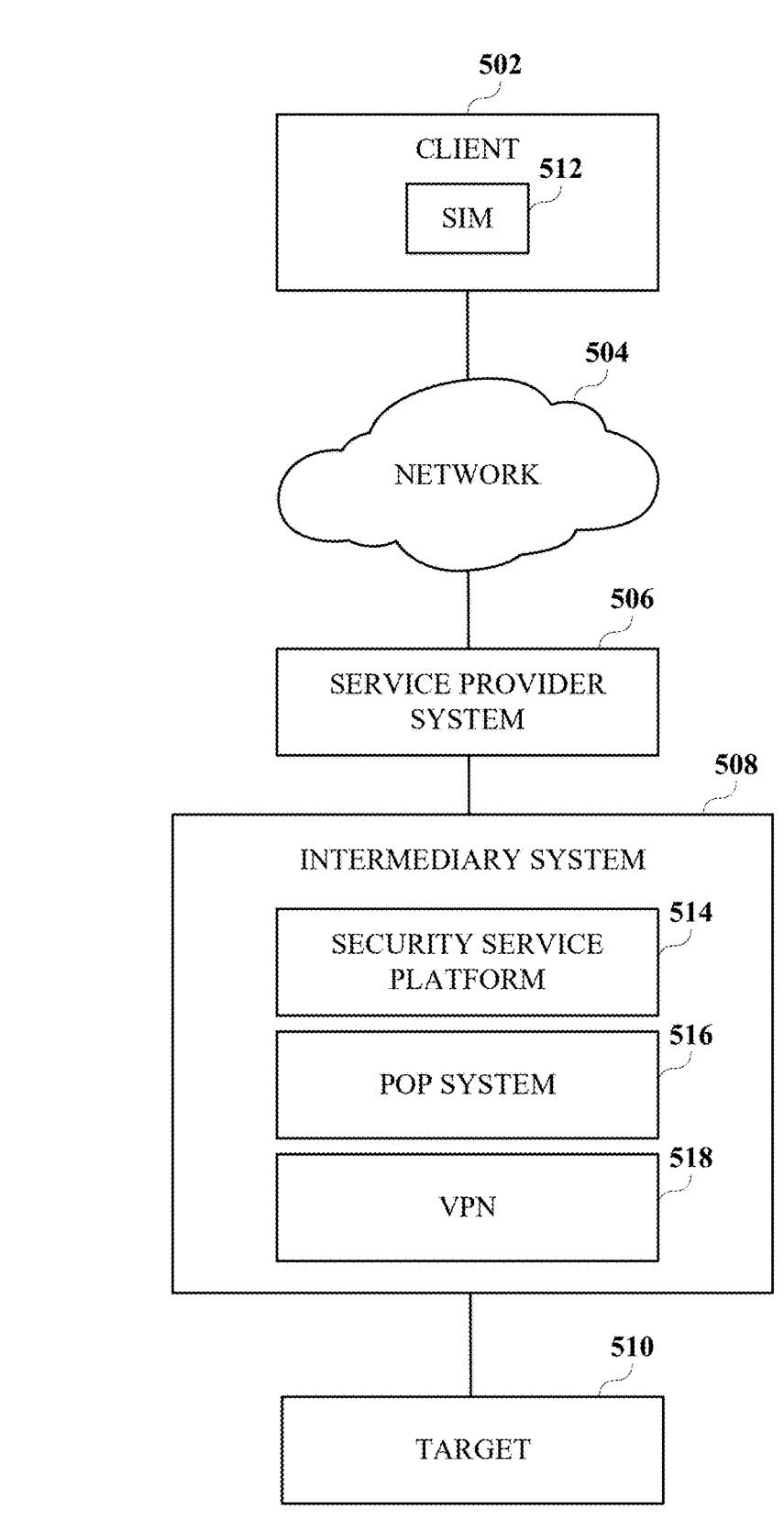
FIGS. 5A and 5B are block diagrams of systems in which a secure SIM networking service can be implemented.

FIG. 5A is a block diagram of a system 500 in which a secure SIM networking service can be implemented. The system 500 includes a client device 502, a network 504, a service provider system 506, an intermediary system 508, and a target 510, which are communicatively connected.

Each of the client device 502, the network 504, the service provider system 506, the intermediary system 508, and the target 510 may be generically referred to as a system component. A system component refers to one or more devices and/or applications. Where a system component is or refers to a device, the system component can be, be similar to, include, or be included in a computing system, which can include one or more computing devices (e.g., one or more of the computing device 100 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client device 502 may be similar to the client device 302 or 402 described above, potentially including an SIM 512 that allows the device to connect to mobile networks without a physical SIM card. The client device 502 may be any computing device capable of wireless communication, such as a smartphone, tablet, laptop, IoT device, or wearable technology. The network 504 may be similar to the networks 504 or 404 described previously, facilitating communication between the client device 502 and the service provider system 506. The network 504 may encompass various communication technologies, including cellular networks, Wi-Fi, or other wireless protocols, and may include multiple interconnected networks spanning different geographical regions. The service provider system 506 may be similar to the service provider systems 306, 406, or 408 mentioned earlier. The service provider system 506 may be responsible for providing network services to the client device 502, managing user authentication, assigning network resources, and routing traffic between the client device 502 and the broader internet. In some implementations, the service provider system 506 may offer remote SIM provisioning services for SIM-enabled devices.

The intermediary system 508 may include a security service platform 514, a PoP (Point of Presence) system 516, and a VPN (Virtual Private Network) 518.

The security service platform 514 may manage security features and services for the system 500. The security service platform 514 may include components such as an API for receiving and processing requests, a data store for managing user preferences and security policies, and a service engine for coordinating security operations. In some implementations, the security service platform 514 may incorporate machine learning algorithms to dynamically adjust security measures based on real-time threat intelligence.

The security service platform 514 may perform various advanced networking functions to enhance the security and efficiency of SIM-based communications. One such function may involve the implementation of tunneling protocols. Tunneling refers to the process of encapsulating one network protocol within another, allowing data to be transmitted securely across incompatible networks or through untrusted network infrastructure. The security service platform 514 may support multiple tunneling protocols, such as Generic Routing Encapsulation (GRE), Network Virtualization using Generic Routing Encapsulation (NVGRE), Generic Network Virtualization Encapsulation (GENEVE), Virtual Extensible LAN (VXLAN), and Internet Protocol Security (IPSec). For example, the security service platform 514 may use VXLAN to create isolated network segments for different client devices or applications, enhancing security and network performance. In some cases, IPSec tunneling may be employed to establish encrypted communication channels between the client device 502 and the target 510, facilitating data confidentiality and integrity.

In addition to these traditional tunneling protocols, the security service platform 514 may support modern tunneling protocols such as OpenVPN, WireGuard, Transport Layer Security (TLS), HTTP proxy, and HTTPS proxy. OpenVPN provides a highly secure and flexible solution for creating virtual private networks (VPNs) by leveraging SSL/TLS encryption to safeguard data traffic. WireGuard, a lightweight and efficient VPN protocol, offers enhanced performance and simplified configuration compared to traditional VPN solutions while maintaining strong cryptographic guarantees. TLS tunneling may be used to secure application-layer communications, providing encryption and data integrity for protocols such as HTTP or custom applications. HTTP proxy and HTTPS proxy protocols allow the platform to route traffic through intermediaries, facilitating additional layers of anonymity and security by obfuscating the client device's origin and encrypting transmitted data when HTTPS is used.

By supporting this comprehensive suite of tunneling protocols, the security service platform 514 provides a versatile and secure foundation for SIM-based communications. This flexibility may facilitate the creation of isolated, encrypted, and efficient communication channels suitable for a wide range of applications, including consumer devices, enterprise systems, IoT networks, and industrial deployments. The combination of traditional and modern tunneling technologies may facilitate compatibility with existing infrastructure while addressing the evolving security and performance requirements of next-generation communication systems.

The security service platform 514 may also incorporate Multiprotocol Label Switching (MPLS) functionality. MPLS is a routing technique that uses short path labels instead of complex network addresses to direct data from one network node to the next. This may allow the security service platform 514 to create efficient and flexible routing paths for SIM traffic, potentially improving network performance and enabling advanced traffic engineering capabilities. In some implementations, the security service platform 514 may use MPLS to establish VPNs for secure client device communications, or to prioritize certain types of traffic based on quality of service (QoS) requirements.

In some implementations, the security service platform 514 may offer options for dedicated leased lines or wave/dark fiber connections. A dedicated leased line is a private, fixed-bandwidth data connection between two points, which may provide guaranteed bandwidth and low latency. Wave or dark fiber refers to the leasing of unlit optical fiber, allowing client devices to implement their own networking equipment and protocols. These options may be particularly useful for enterprise client devices or applications with stringent security or performance requirements. For instance, the security service platform 514 may facilitate the establishment of a dedicated leased line between a client device's data center and a specific PoP, facilitating consistent and secure connectivity for SIM-based applications.

Some implementations may incorporate machine learning within the security service platform 514 that may be configured to enhance adaptive and proactive security measures. Machine learning may be configured to analyze network traffic data in real-time, identifying patterns and anomalies that could indicate potential security threats. For example, machine learning models may be trained to detect unusual traffic patterns or behaviors associated with specific SIMs, potentially indicating a compromised device or attempted network intrusion. The security service platform 514 may use these insights to dynamically adjust firewall rules, update routing policies, or trigger additional security measures such as multi-factor authentication. In some implementations, machine learning algorithms may also be used to optimize network performance, predicting traffic patterns and preemptively adjusting network resources to ensure optimal routing and load balancing for SIM-based communications.

The PoP system 516 may be configured to facilitate routing and traffic management within the intermediary system 508. The PoP system 516 may include multiple geographically distributed points of presence, each capable of processing and forwarding network traffic. The PoP system 516 may facilitate efficient routing of client device requests based on factors such as geographic proximity, network conditions, and user preferences. In some implementations, the PoP system 516 may employ software-defined networking (SDN) techniques for dynamic traffic optimization. Some implementations could incorporate edge computing capabilities at each PoP to provide low-latency services closer to end-users.

The VPN 518 provides secure, encrypted connections for data transmission within the intermediary system 508. The VPN 518 may include multiple VPN servers distributed across various locations, providing a mechanism by which users may choose their preferred exit point for internet traffic. The VPN 518 enhances privacy by masking the client device's true IP address and encrypting data in transit. Some implementations of the VPN 518 may support advanced features such as split tunneling or multi-hop connections for additional security.

The target 510 represents the destination for client device requests, such as websites, application servers, or other network resources. The target 510 receives the secure request generated by the intermediary system 508, which may appear to originate from a different location or have additional security measures applied. In operation, the system 500 provides a secure SIM networking service that enhances user privacy and security. When the client device 502 initiates a request, the request is first sent through the network 504 to the service provider system 506. The service provider system 506 forwards the request, along with relevant metadata, to the intermediary system 508. This metadata may include information such as the client device's MSISDN, ICCID, IP address, or location data.

Within the intermediary system 508, the security service platform 514 processes the incoming request and metadata. The security service platform 514 may combine this information with user preferences and security policies defined by the SIM security service. For example, a user might have configured their service to always use a VPN when accessing financial websites or to apply enhanced encryption for all communications while traveling abroad.

The PoP system 516 may be configured to determine the appropriate routing for the request based on the processed information. This could involve selecting the most efficient path through the network or choosing a specific exit point based on the user's privacy preferences. For instance, a journalist working in a country with strict internet censorship might configure their SIM security service to always route traffic through a PoP in a country with strong press freedoms.

If VPN functionality is indicated, the request is forwarded to the VPN 518 for secure transmission. The VPN 518 encrypts the data and routes it through the chosen exit point, effectively masking the client device's true location and enhancing privacy. This could be particularly useful for businesses conducting sensitive international operations or for individuals accessing geo-restricted content.

The processed and secured request is sent to the target 510, completing the communication path. Throughout this process, the intermediary system 508 may apply a wide range of additional security measures to facilitate the integrity, confidentiality, and availability of the communication. For instance, DNS-based threat protection may be employed to block access to known malicious domains, preventing devices from inadvertently communicating with harmful entities. Data loss prevention (DLP) techniques may be implemented to safeguard sensitive information by detecting and blocking unauthorized data transmissions based on predefined policies.

In some implementations, the intermediary system 508 may incorporate other network protection mechanisms, including IP-based firewalls and port blocking. An IP-based firewall may be configured to restrict traffic based on source and destination IP addresses, ensuring that only authorized communications are allowed through the network. Port blocking may be used to prevent unauthorized access to specific network services or applications by closing unused or vulnerable ports.

In some implementations, the intermediary system 508 may also utilize Deep Packet Inspection (DPI) to analyze packet payloads in real time, enabling the enforcement of DPI-based rules to detect and mitigate advanced threats such as malware, intrusion attempts, or unauthorized data exfiltration. Web Application Firewalls (WAF) may be applied to protect against application-layer attacks, such as SQL injection, cross-site scripting (XSS), and other vulnerabilities targeting web-based systems. By inspecting and filtering incoming and outgoing web traffic, a WAF may help to safeguard sensitive applications and services hosted on the target 510.

Furthermore, the intermediary system 508 may implement traffic pattern-based protections to identify and respond to anomalous or malicious behaviors. By analyzing traffic flows for unusual patterns, such as volumetric spikes or irregular access attempts, the intermediary system 508 can detect distributed denial-of-service (DDoS) attacks, botnet activity, or unauthorized access attempts and take appropriate countermeasures.

In various implementations, these protections may enhance the security of the communication path by addressing a wide range of network-level and application-level threats. This comprehensive approach may facilitate secure data transfer to the target 510 as well as active monitoring and mitigating of risks throughout the process, providing robust and adaptive defense mechanisms suitable for diverse deployment scenarios.

The system 500 can be implemented in various ways to suit different use cases and requirements. For example, in a corporate setting, the intermediary system 508 could be configured to enforce company-wide security policies for all SIM-enabled devices. This might include automatically routing all traffic through corporate VPN servers and/or to access internal corporate networks, applying strict access controls, and logging network activities for compliance purposes.

In an IoT scenario, the system 500 could be adapted to provide secure connectivity for large-scale sensor networks. The SIM 512 in each sensor could be provisioned with a unique security profile, allowing for granular control over data access and transmission. The intermediary system 508 could then aggregate and anonymize data from multiple sensors before forwarding it to the target 510, enhancing both security and privacy.

For consumer applications, the system 500 may provide a user-friendly interface that allows individuals to customize their privacy and connectivity settings based on their specific needs. For example, users may create profiles tailored to different situations, such as a "travel mode" that automatically routes all traffic through a VPN and enables additional security features when connecting to public Wi-Fi networks.

In some implementations, the system 500 may include functionality to route all internet traffic through a designated home or office router. This configuration may provide a mechanism by which users may securely access internal systems, such as corporate databases or private home servers, while maintaining the appearance of originating traffic from the home or office IP address. By directing traffic through the home or office network, users may benefit from existing security policies, such as firewalls, port blocking, and intrusion detection systems, which are typically implemented at these trusted locations.

In some implementations, the system 500 may provide a mechanism by which users may route all outgoing internet traffic through the home or office IP address to maintain a consistent network identity. This can be particularly beneficial for applications requiring geographical consistency or for accessing location-restricted content. The routing functionality may be seamlessly integrated into the system's privacy settings, provide a mechanism by which users may toggle this feature on or off or to associate it with specific profiles, such as "work-from-home" or "remote access" modes.

By combining the ability to route traffic through a VPN for public networks with options to channel traffic through a home or office IP address, some implementations of the system 500 may provide a versatile and secure solution that adapts to the varying needs of users, whether they are traveling, working remotely, or accessing sensitive internal systems. This flexibility may facilitate robust privacy and security while maintaining user convenience.

Figure 5B:
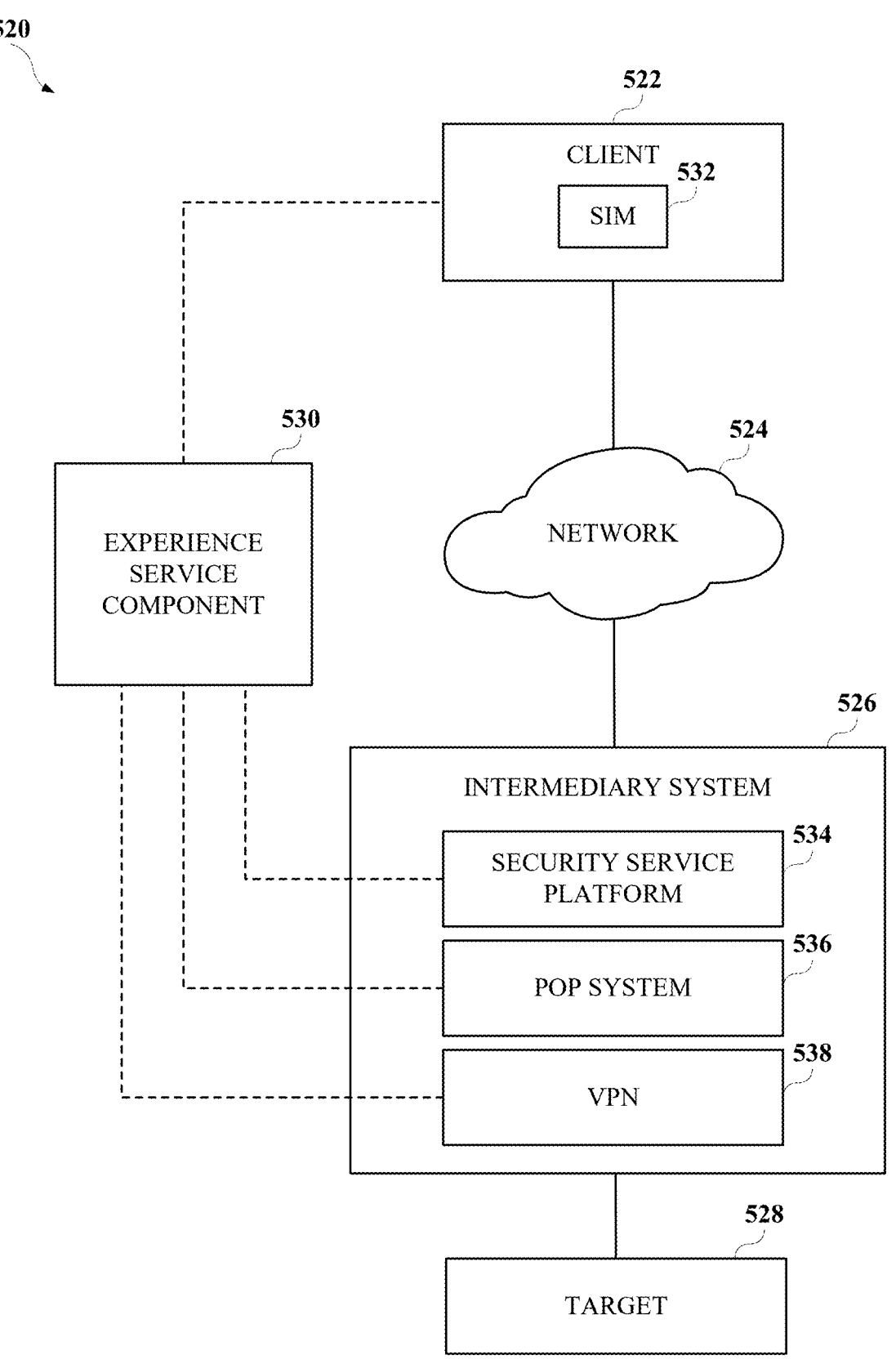

FIG. 5B illustrates a block diagram of a system 520 for secure communication, which shares some similarities with the system 500 depicted in FIG. 5A but introduces some differences. The system 520 includes a client device 522, a network 524, an intermediary system 526, a target 528, and an experience service component 530.

Similar to FIG. 5A, the client device 522 includes a SIM component 532, which may be an eSIM or a physical SIM card. The client device 522 is connected to the network 524, which facilitates communication between the components of the system 520.

A difference in FIG. 5B is the absence of a separate service provider system component. Instead, the network 524 connects the client device 52 directly to the intermediary system 526. This configuration may suggest a more streamlined communication path or indicate that the service provider system functionality may be integrated into the network 524 or the intermediary system 526.

The intermediary system 526, positioned between the network 524 and the target 528, retains the three main components seen in FIG. 5A: a security service platform 534, a PoP system 536, and a VPN 538. These components may function similarly to their counterparts in FIG. 5A, implementing security measures, managing traffic routing, and providing secure, encrypted connections respectively.

An addition in FIG. 5B is the experience service component 530. This component is shown connected to both the client device 522 and the intermediary system 526 and may provide an interface for user interaction or service configuration. The experience service component 530 may provide users with a means to customize their security settings, view performance metrics, or interact with the secure communication service in other ways.

In operation, the system 520 may allow for communication from the client device 522 to flow through the network 524 and intermediary system 526 before reaching the target 528. The intermediary system 526 may apply security measures or other processing to the communication as it passes through, utilizing the security service platform 534, PoP system 536, or VPN 538 components.

The addition of the experience service component 530 may enhance the user experience by providing greater visibility into the secure communication process and allowing for more user control. For example, users may be able to view real-time statistics about their secure connections, adjust security settings on-the-fly, or receive notifications about potential security threats that have been mitigated.

This configuration may offer a more user-centric approach to secure SIM-based communications, potentially increasing user engagement and allowing for more personalized security solutions. The direct connection between the experience service component 530 and the intermediary system 526 may also facilitate more efficient updates to security policies or user preferences, enhancing the system's ability to adapt to changing user needs or emerging security threats.

Figure 6:
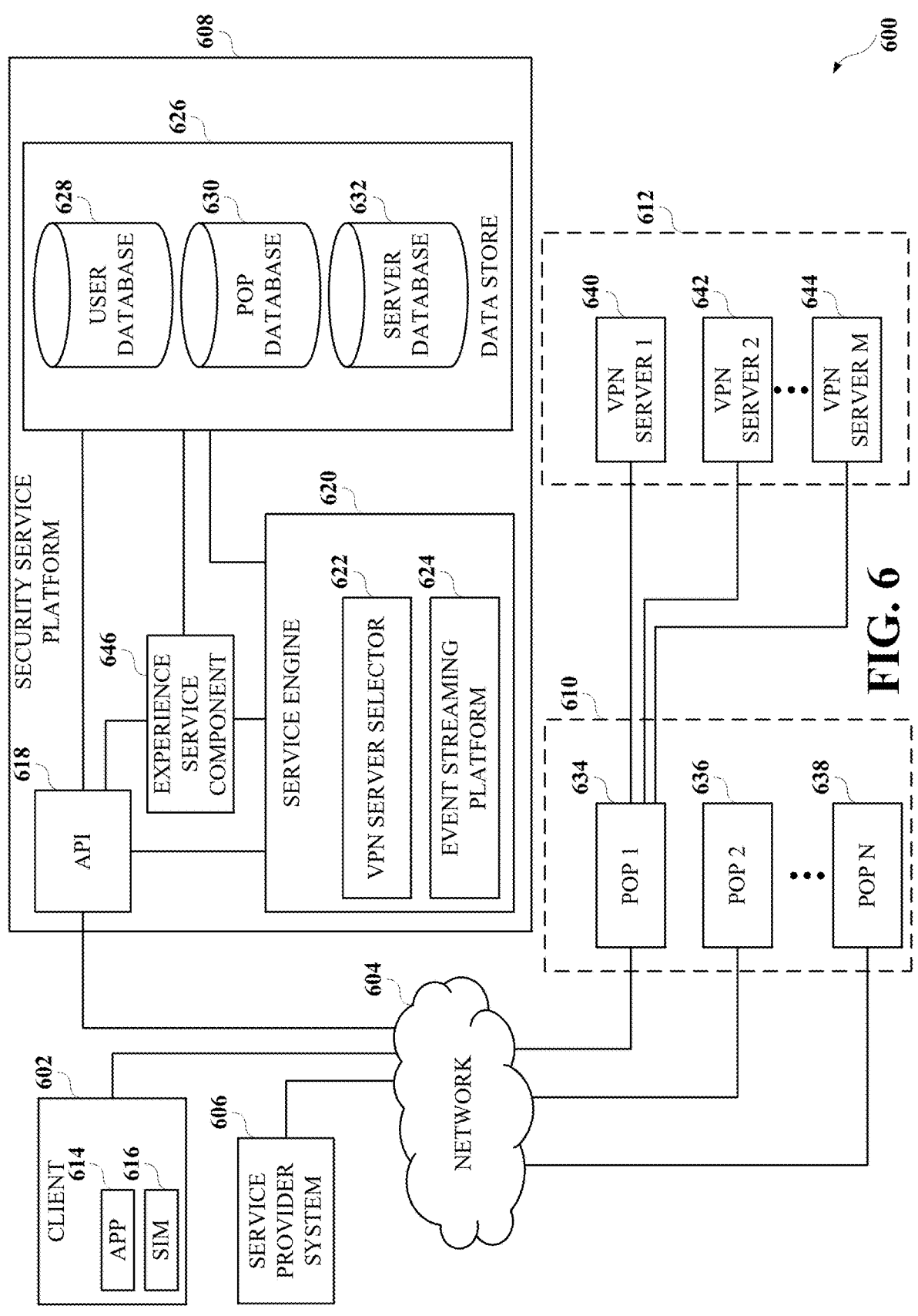
FIG. 6 is a block diagram of a system in which a secure SIM networking service can be implemented.

FIG. 6 is a block diagram of a system 600 in which a secure SIM networking service can be implemented. The system 600 includes a client device 602, a network 604, a service provider system 606, a security service platform 608, a PoP system 610, and a VPN 612, which are communicatively connected. The security service platform 608, the PoP system 610, and/or the VPN 612 may be, be similar to, include, or be included in, an intermediary system such as, for example, the intermediary system 508 shown in FIG. 5A, the intermediary system 526 shown in FIG. 5B, the intermediary system 410 shown in FIG. 4, or the intermediary system 308 shown in FIG. 3.

Each of the client device 602, the network 604, the service provider system 606, the security service platform 608, the PoP system 610, and the VPN 612 may be generically referred to as a system component. A system component refers to one or more devices and/or applications. Where a system component is or refers to a device, the system component can be, be similar to, include, or be included in a computing system, which can include one or more computing devices (e.g., one or more of the computing device 100 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client device 602, the network 604, the service provider system 606, the security service platform 608, the PoP system 610, and the VPN 612 may be similar to corresponding components described in previous figures. The client device 602 may include an application 614 and a SIM 616. The application 614 may be any type of mobile application. The application 614 may be configured to facilitate communication between the client device 602 and one or more other components of the system 600. The SIM 616 may include a removable SIM component or an eSIM component. The network 604 may facilitate communication between the client device 602 and the service provider system 606. The service provider system 606 may be a mobile network operator or mobile virtual network operator that provides cellular connectivity services to the client device 602. In some aspects, the service provider system 606 may interface with the security service platform 608 to facilitate enhanced security features for SIM-based communications.

The security service platform 608 may be configured to manage and implement a secure SIM networking service. The security service platform 608 may include several components such as an API 618; a service engine 620, which may include a VPN server selector 622 and an event streaming platform 624; and a data store 626, which may include a user database 628, a PoP database 630, and a server database 632.

The security service platform 608 may be configured to implement security policies, process incoming requests, and coordinate the actions of other components of the security service platform 608. The security service platform 608 may include features such as threat detection, encryption management, and access control mechanisms to ensure the overall security of the SIM networking service. In some implementations, the security service platform 608 may incorporate machine learning algorithms to dynamically adjust security measures based on real-time threat intelligence. The security service platform 608 may implement various network protocols and technologies to enhance security and network efficiency, such as tunneling protocols, MPLS functionality, or support for dedicated leased lines. In some implementations, the security service platform 608 may offer flexible routing options, providing a mechanism by which users may specify exit points for their traffic to enhance privacy. The security service platform 608 may include DNS-based threat protection to proactively block access to known malicious domains. In some implementations, the security service platform 608 may provide options for users to customize their privacy settings, such as creating profiles for different situations or enabling enhanced encryption for sensitive communications.

The data store 626 within the security service platform 608 may include databases configured to facilitate the operation of the secure SIM networking service. The user database 628 may store user profiles, preferences, or authentication information. The user database 628 may contain data such as usernames, passwords, account types, subscription levels, billing information, device identifiers, usage history, or personalized settings. In some implementations, the user database 628 may store biometric data for multi-factor authentication, such as fingerprint or facial recognition data. The user database 628 may be populated with information provided during account creation, gathered from user interactions, or obtained from third-party identity providers. The user database 628 may be regularly updated to reflect changes in user preferences, device usage patterns, or account status.

The PoP database 630 may maintain information about the available PoPs in the system, such as their locations, capacities, or current status. The PoP database 630 may include data associated with server specifications, network connectivity, bandwidth availability, latency measurements, or historical performance metrics. The PoP database 630 may store information on nearby data centers, peering arrangements, or optimal routing paths. The PoP database 630 may be updated in real-time based on network monitoring tools and may include historical performance data. This data may be used for capacity planning, troubleshooting, or optimizing network performance.

The server database 632 may contain data about the VPN servers and their capabilities, including supported protocols, encryption methods, or performance metrics. The server database 632 may include details on server hardware specifications, operating systems, available IP addresses, load balancing configurations, or security certifications. The server database 632 may receive information from automated server discovery processes, manual configuration by system administrators, or integration with cloud infrastructure management systems. In some cases, the server database 632 may store data on server maintenance schedules, software update statuses, or compliance with data protection regulations.

The service engine 620 may be configured for processing information associated with incoming requests and applying the appropriate security measures based on the SIM security service policies. The incoming requests may include requests to access a target, requests to access SIM security services provided by the security service platform 608, or any other type of request associated with access via the network 604. In some implementations, a request to access a target may be transmitted by the client device 602 to the service provider system 606 or a PoP (e.g., PoP 1 634). The service provider system 606 or the PoP 1 634 may transmit first information associated with the request to the security service platform 608.

The first information may include metadata such as, for example, identifying information associated with the client device 602. As used herein, the term "metadata" refers to any type of data that may be communicated between two or more components to facilitate providing aspects of the SIM security services described herein. The service engine 620 may access the data store 626 to retrieve, based on the first information, second information. The second information may include metadata that includes identifying information associated with the service provider system 606, identifying information associated with the PoP 1 634, information associated with a SIM security service, and/or the like. The service engine 620 may determine routing paths associated with a SIM security policy. For example, the service engine 620 may apply security services and determine routing paths in various ways. For example, when processing an incoming request, the service engine 620 may first analyze the first information and/or the second information, such as the client device's MSISDN, ICCID, and current location. The service engine 620 may then cross-reference this information with the user's profile stored in the user database 628 to determine applicable security policies and preferences.

In some implementations, the first information may be indicative of a SIM security service that a user of the client device 602 would like applied to communications between the client device 602 and a target. The first information may include a SIM security service ID corresponding to a specific security policy, set of security rules, routing plan, set of optimizations, and/or the like. The first information may include user input indicative of configuration information that may indicate one or more configuration settings associated with a SIM security policy. A SIM security policy may include any number of different types of security configurations, tunneling configurations, VPN routing plans, PoP routing plans, optimizations, and/or other functions that may be applied to communications from the client device 602.

The service engine 620 may apply security measures such as encryption, traffic obfuscation, protocol switching, or multi-factor authentication. For encryption, the service engine 620 may select an appropriate encryption protocol based on the sensitivity of the data being transmitted. For instance, the service engine 620 may apply AES-256 encryption for financial transactions or TLS 1.3 for general web browsing. To enhance privacy, the service engine 620 may implement traffic obfuscation techniques like packet padding or traffic shaping to make it more difficult for third parties to analyze the network traffic. The service engine 620 may dynamically switch between different VPN protocols (e.g., OpenVPN, WireGuard, or IPSec) based on network conditions and security requirements. For sensitive operations, the service engine 620 may trigger additional authentication steps, such as requesting a one-time password or biometric verification.

When determining routing paths, the service engine 620 may consider factors such as geographic restrictions, network performance, load balancing, threat avoidance, or custom exit nodes. If a user is attempting to access geo-restricted content, the service engine 620 may route the traffic through a PoP in an appropriate country. By consulting the PoP database 630, the service engine 620 may select a routing path that offers a combination of security and performance, considering factors like latency and available bandwidth. The service engine 620 may distribute traffic across multiple PoPs or VPN servers to optimize resource utilization and maintain service quality. If the service engine 620 detects potential security threats and/or network stability and/or performance issues along certain network paths, it may dynamically reroute traffic to avoid these risks. For users with specific privacy requirements, the service engine 620 may route traffic through pre-defined exit nodes or allow users to select their preferred exit points.

In some implementations, the service engine 620 may employ machine learning algorithms to continuously optimize its decision-making processes. For example, the service engine 620 may analyze historical data to predict network congestion and proactively adjust routing paths. In some implementations, the service engine 620 may learn from past security incidents to improve threat detection and response mechanisms.

The service engine 620 may interact with the VPN server selector 622 to choose an appropriate VPN server for each connection. This selection may be based on factors such as server load, geographic location, or specific security features supported by each server. For instance, if a user requires access to a particular streaming service, the VPN server selector 622 may choose a server known to work well with that service while still meeting the user's security requirements. The VPN server selector 622 may determine an appropriate VPN server for routing a client device's traffic based on factors such as user preferences, server load, geographic location, or current network conditions.

The event streaming platform 624 may facilitate real-time data processing and analytics within the security service platform 608. The event streaming platform 624 may be used for monitoring system performance, detecting anomalies, or providing insights that can be used to optimize the service and respond to potential security threats in real-time. The event streaming platform 624 may facilitate real-time data processing and communication between various components of the secure SIM networking service. In some implementations, the event streaming platform 624 may be, be similar to, include, or be included in, an Apache Kafka or a similar distributed event streaming platform.

The event streaming platform 624 may act as a central nervous system for the security service platform 608, enabling real-time data flow and processing across different components. The event streaming platform 624 may facilitate the creation of data pipelines that can handle high volumes of events or messages in real-time, providing a scalable and fault-tolerant infrastructure for data exchange. In some aspects, the event streaming platform 624 may interact with the security service platform 608 to stream real-time security events, such as potential threats detected or policy violations. This may provide a mechanism by which the security service platform 608 may respond quickly to emerging security issues, potentially adjusting security measures in real-time based on the incoming stream of events.

The event streaming platform 624 may interface with the data store 626, facilitating real-time updates to the user database 628, PoP database 630, and server database 632. For instance, when a user updates their preferences or when network conditions change, these updates may be streamed in real-time to the relevant databases, provide a mechanism by which the most current information is always available for decision-making processes.

In some implementations, the event streaming platform 624 may provide a constant stream of data about network conditions, user activities, or security events to the service engine 620. This real-time data flow may enable the service engine 620 to make more informed and timely decisions about routing paths and security measures. For example, if the event streaming platform 624 detects a sudden increase in traffic or a potential security threat in a particular region, it may immediately notify the service engine 620, which can then adjust its routing decisions accordingly. The event streaming platform 624 may support the VPN server selector 622 by providing real-time data on VPN server performance and load. This may allow the VPN server selector 622 to make more accurate and up-to-date server selections based on current conditions rather than relying solely on periodic updates.

In some implementations, the event streaming platform 624 may facilitate machine learning processes within the security service platform 608. The event streaming platform 624 may stream large volumes of data to machine learning models, provide a mechanism by which the machine learning models may learn and adapt in real-time. This could be particularly useful for anomaly detection, predictive maintenance, and continual optimization of routing and security decisions.

The event streaming platform 624 may provide a mechanism for real-time monitoring and alerting. The event streaming platform 624 may stream key performance indicators (KPIs) and other important metrics to monitoring dashboards, provide a mechanism by which system administrators may keep a close eye on the health and performance of the entire SIM networking service. In some implementations, the event streaming platform 624 may support the implementation of complex event processing (CEP) capabilities. This may provide a mechanism by which the security service platform 608 may detect and respond to complex patterns of events in real-time, further enhancing its ability to identify and mitigate security threats or optimize performance. The event streaming platform 624 may facilitate integration with external systems and services. For instance, the event streaming platform 624 may stream relevant data to third-party analytics platforms or security information and event management (SIEM) systems, enhancing the overall capabilities of the SIM networking service.

The PoP system 610 may include multiple PoPs distributed across various geographic locations. In the diagram, these are represented by PoP 1 634, PoP 2 636, and PoP N 638, indicating that the system can scale to include any number of PoPs as needed. Each PoP may serve as an intermediary routing point, facilitating efficient and secure transmission of data between the client device and its final destination. The PoPs may be implemented in various ways to enhance the security and performance of SIM networking, even without relying on VPN functionalities. For example, PoPs may be configured as edge computing nodes, facilitating localized processing and security enforcement closer to the end-users. In this configuration, PoPs may perform tasks such as traffic inspection, threat detection, or application-level filtering at the network edge, reducing latency and improving overall security posture.

In some implementations, PoPs may incorporate SDN capabilities, enabling dynamic routing and traffic management based on real-time network conditions and security policies. This may allow for rapid adaptation to emerging threats or changing network topologies without requiring manual intervention. In some implementations, PoPs may serve as secure access service edge (SASE) nodes, combining network security functions with WAN capabilities to support secure access for SIM-enabled devices. In this role, PoPs may provide services such as zero trust network access (ZTNA), secure web gateways (SWG), or cloud access security brokers (CASB) to facilitate secure connectivity for SIM users regardless of their location.

In some implementations, PoPs may be equipped with hardware security modules (HSMs) to provide enhanced cryptographic capabilities. These HSMs may be used for secure key storage, encryption, or digital signing operations, further strengthening the security of SIM communications without relying on traditional VPN technologies. In some implementations, PoPs may implement advanced traffic analysis techniques, such as DPI and behavioral analytics, to identify and mitigate potential security threats in real-time. By analyzing traffic patterns and content at the PoP level, the system may detect and respond to anomalies or malicious activities before they reach their intended targets.

In some implementations, PoPs may serve as content delivery network (CDN) nodes, caching frequently accessed content closer to end-users. This may not only improve performance but also enhance security by reducing the need for SIM-enabled devices to communicate directly with origin servers for every request. In some implementations, PoPs may incorporate network function virtualization (NFV) technologies, facilitating the dynamic deployment of security services as needed. This flexibility may provide a mechanism by which the system may rapidly adapt to changing security requirements or to scale specific security functions based on demand.

In some aspects, PoPs may implement protocol-aware security measures, such as API gateways or web application firewalls (WAFs), to provide application-layer protection for SIM-based communications. These measures may help prevent attacks such as SQL injection, cross-site scripting (XSS), or API abuse that traditional network-level security controls might miss. In some implementations, PoPs may serve as secure DNS resolvers, implementing technologies such as DNS over HTTPS (DoH) or DNS over TLS (DoT) to protect SIM users from DNS-based attacks and enhance privacy by encrypting DNS queries. In some implementations, PoPs may incorporate machine learning-based anomaly detection systems, continually analyzing network traffic to identify and respond to previously unknown threats or attack patterns. This proactive approach may help maintain a robust security posture for SIM networking without relying solely on predefined security rules or signatures.

The VPN 612 component of the system may include multiple VPN servers, represented in the diagram as VPN server 1 640, VPN server 2 642, and VPN server M 644. This scalable architecture may provide a mechanism by which the system may support a large number of concurrent users while providing options for geographic diversity in exit points. The VPN servers encrypt the client device's traffic and provide an additional layer of privacy by masking the client device's true IP address.

In operation, when a client device 602 initiates a request to access a target (e.g., a website), the request may be first sent through the network 604 to the service provider system 606 (or directly to a PoP). The service provider system 606 may forward the request to a PoP 1 634 associated with the service provider system 606. The service provider system 606 and/or the PoP 1 634 may forward first information (e.g., first metadata associated with the request and/or the client device 602) to the security service platform 608. The first information may include data such as an MSISDN, an ICCID, an IP address, or location information associated with the client device 602. The first information may include user input indicative of a SIM security policy, configuration settings, and/or any other information that may be used to facilitate providing services to the client device 602. The security service platform 608 may process this information, consulting the data store 626 to retrieve second information (e.g., second metadata such as user preferences, device identifiers, historical behavior patterns, or network configurations). The second information may include data such as a MSISDN, an ICCID, an IP address associated with the client device 602, a SIM security policy identifier, or an IP address associated with the service provider system 606. In some implementations, the security service platform 608 may analyze both the first and second information to generate a comprehensive security profile for the request. This profile may be used to determine appropriate security policies, optimize routing decisions, and apply tailored security measures based on the specific characteristics of the client device 602 and the nature of the request. The security service platform 608 may then forward service information associated with an appropriate SIM security service to be applied to the PoP 1 634. This service information may include instructions for implementing specific security protocols, encryption methods, or routing preferences based on the analyzed metadata and security policies.

The security service platform 608 may process and utilize various types of metadata to enhance the security and efficiency of SIM-based communications. For example, the security service platform 608 may receive first metadata from the service provider system 606 and may access second metadata. The security service platform 608 may access the second metadata by receiving the second metadata and/or by accessing the data store 626, which may include at least a portion of the second metadata.

The first metadata may include information associated with the specific request originating from the client device 602. This may encompass details such as a MSISDN associated with the client device 602, an ICCID associated with an eSIM component of the client device 602, an IP address associated with the client device 602, or location information associated with the client device 602. For example, the MSISDN may be used to identify the specific mobile subscription, while the ICCID may provide unique identification for the SIM itself. Location information may include GPS coordinates, cell tower triangulation data, or IP geolocation information.

The second metadata may comprise additional information associated with the client device 602 that may not be directly related to the current request but may be relevant for security and routing decisions. This may include details such as an MSISDN associated with the client device 602 (which may be different from the one used for the current request in case of multi-SIM devices), an ICCID associated with an eSIM component of the client device 602 (which may be useful for devices with multiple eSIMs), an IP address associated with the client device 602, or an IP address associated with the service provider system 606.

For instance, the security service platform 608 may use the first metadata to verify the authenticity of the request and ensure it originates from a legitimate SIM-enabled device. The MSISDN and ICCID information may be cross-referenced with the user database 628 to confirm the identity of the client device 602 and retrieve associated security policies. The second metadata may be utilized for more complex security and routing decisions. For example, if the IP address associated with the client device 602 differs significantly from the location information provided in the first metadata, it may trigger additional security checks to prevent potential location spoofing attempts. Similarly, the IP address associated with the service provider system 606 may be used to verify that the request is coming through an authorized network path.

In some implementations, the security service platform 608 may combine both types of metadata to create a comprehensive security profile for each request. This profile may be used to determine the most appropriate routing path, select the optimal PoP for processing the request, and apply tailored security measures based on the specific characteristics of the client device 602 and the nature of the request.

The service engine 620 may determine an optimal routing path for a communication, potentially in consultation with the VPN server selector 622 if VPN routing is required. Based on this decision, the communication is forwarded to the appropriate PoP within the PoP system 610. The chosen PoP then routes the communication either directly to its destination or through one of the VPN servers in the VPN 612 component, depending on the security requirements and user preferences. Throughout this process, the event streaming platform 624 may be collecting and analyzing data about the request and the system's performance, facilitating real-time monitoring and optimization of the service. Various implementations described above may allow the system 600 to provide a secure, flexible, and efficient SIM networking service that can adapt to various user needs and security requirements.

The experience service component 646 may provide a user interface and functionality for client devices to interact with and configure the secure SIM networking service. This component may allow users to view and modify their security settings, monitor their network usage, or receive notifications about potential security threats or service updates. In some implementations, the experience service component 646 may be accessible through a mobile application installed on the client device, a web portal, or both, providing flexibility in how users manage their secure SIM networking experience. The application 614 may access this information via an API provided by the experience service component 646 (e.g., via the API 618). For example, the application 614 on the client device 602 may make API calls to retrieve usage statistics, current security settings, or available configuration options. The API 618 may provide a mechanism by which the application 614 may submit changes to security preferences or request specific actions, such as enabling enhanced encryption for a particular session. This integration between the client-side application 614 and the experience service component 646 may facilitate real-time updates and responsive control over the secure SIM networking service directly from the user's device.

The experience service component 646 may offer a range of features to enhance user control and visibility over their secure SIM networking service. For example, the experience service component 646 may provide real-time statistics on data usage, including breakdowns by application or service type. Users may be able to view which security measures are currently active, such as VPN usage or threat protection features, and toggle these features on or off as needed. The experience service component 646 may also offer the ability to select preferred exit points for VPN connections, provide a mechanism by which users may choose specific countries or regions for their traffic routing.

In some cases, the experience service component 646 may include advanced reporting and analytics capabilities. The experience service component 646 may generate periodic reports on network usage, security events, and performance metrics, helping users understand their usage patterns and the effectiveness of the security measures in place. For enterprise client devices, the experience service component 646 may offer additional features such as centralized management of multiple SIM-enabled devices, providing a mechanism by which IT administrators may apply security policies across an entire fleet of devices from a single interface. The experience service component 646 may facilitate communication between users and the service provider system, offering in-app support features, notification systems for service updates or security alerts, or channels for user feedback to continually improve the secure SIM networking service.

As described above, the security service platform 608 may function as a control plane for the PoP system 610 and/or the VPN 612, orchestrating the overall security and routing operations of the secure SIM networking service. In this capacity, the security service platform 608 may process information associated with incoming requests, analyze metadata, apply security policies, and make decisions about how to handle each communication. These decisions may then be implemented by the PoP system 610 and VPN 612, which act as the data plane, handling the actual routing and transmission of data.

For example, when a client device 602 initiates a request to access a website, the security service platform 608 may receive metadata about the request from the service provider system 606. The platform may then analyze this metadata along with stored user preferences and current network conditions. Based on this analysis, the security service platform 608 may determine that the request should be routed through a specific PoP and VPN server to optimize performance and security. The security service platform 608 may then send instructions to the chosen PoP within the PoP system 610, specifying how to handle the request. These instructions may include which security measures to apply, whether to route the traffic through a VPN, and if so, which VPN server to use. The PoP and VPN server would then execute these instructions, applying the specified security measures and routing the traffic as directed by the security service platform 608.

In one example of a use case scenario, consider a multinational corporation using the secure SIM networking service for its employees' devices. An employee traveling abroad may attempt to access sensitive company resources. The security service platform 608 may receive metadata about this request, including the employee's current location and the resource being accessed. The security service platform 608 may then consult the company's security policies stored in its data store 626. Based on this information, the security service platform 608 may determine that the request requires additional authentication and must be routed through a VPN server in the company's home country. The security service platform 608 would then instruct a PoP in the employee's current location to request additional authentication from the user. Once authenticated, the security service platform 608 would direct the PoP to route the traffic through a specific VPN server, applying encryption and other security measures in the process. Throughout this interaction, the security service platform 608 acts as the central decision-making entity, while the PoP system 610 and VPN 612 execute its instructions to provide a secure connection for the employee.

In another use case scenario, a global logistics company may implement the secure SIM networking service to manage its fleet of connected vehicles. Each vehicle may be equipped with an eSIM-enabled telematics unit that continuously transmits data about the vehicle's location, fuel consumption, and cargo conditions. The security service platform 608 may receive this data through various PoPs as the vehicles move across different regions. The security service platform 608 may analyze the metadata associated with each transmission, including the vehicle's unique identifier, current location, and the type of data being sent. Based on this analysis, the security service platform 608 may apply different security policies depending on the sensitivity of the information. For instance, basic telemetry data may be routed directly to the company's cloud servers, while more sensitive information about high-value cargo may be encrypted and routed through a VPN for added security.

In an IoT use case scenario, a smart home system may utilize the secure SIM networking service to protect the various connected devices within a household. Devices such as smart thermostats, security cameras, and voice assistants may each have their own eSIM, provide a mechanism by which they may communicate directly with the home automation hub and external services. The security service platform 608 may receive metadata about each device's communications, including device type, data being transmitted, and intended recipient. For a security camera stream, the security service platform 608 may determine that the video feed should be encrypted and routed through a VPN to the homeowner's mobile device when they are away from home. In contrast, for a smart thermostat's routine temperature updates, the security service platform 608 may apply lighter security measures and route the data directly to the manufacturer's cloud service for analysis.

An IIoT (Industrial Internet of Things) use case scenario may involve a large manufacturing plant using the secure SIM networking service to manage its network of industrial sensors and control systems. Each piece of machinery on the factory floor may be equipped with multiple sensors, all connected via eSIMs. The security service platform 608 may receive a constant stream of data from these sensors, with metadata indicating the specific machine, sensor type, and nature of the readings. For critical control systems that manage potentially dangerous processes, the security service platform 608 may implement strict security measures, such as multi-factor authentication for any remote access attempts and routing all commands through a dedicated, encrypted VPN tunnel. For less critical systems, like energy usage monitors, the security service platform 608 may apply different security policies, balancing the need for real-time data access with appropriate security measures.

In a healthcare-related use case scenario, a telemedicine provider may leverage the secure SIM networking service to ensure the privacy and security of patient data during remote consultations. Portable medical devices used by patients at home, such as heart rate monitors or blood glucose meters, may be equipped with eSIMs to transmit data to healthcare providers. The security service platform 608 may receive metadata about these transmissions, including the device type, patient identifier, and type of medical data being sent. Given the sensitive nature of medical information, the security service platform 608 may apply stringent security measures to all communications. This may include encrypting all data transmissions, routing them through geographically appropriate PoPs to facilitate compliance with regional data protection regulations, and using dedicated VPN servers for added security. The security service platform 608 may implement adaptive security measures, increasing protection levels if it detects any unusual patterns in the metadata that could indicate a potential security threat.

In a biological sensor use case scenario, a research institution may deploy a network of environmental monitoring stations equipped with eSIM-enabled biological sensors to study ecosystem health across various habitats. These sensors may collect data on microbial activity, air and water quality, and the presence of specific organisms. The security service platform 608 may receive continuous data streams from these sensors, with metadata including sensor location, type of biological data collected, and environmental conditions. For sensors placed in sensitive or protected areas, the security service platform 608 may implement enhanced security measures, such as data anonymization and encryption before transmission. The security service platform 608 may route this data through specific PoPs that are geographically closest to the research institution's data centers to minimize latency. For sensors detecting potential environmental hazards or sudden changes in ecosystem health, the security service platform 608 may prioritize these transmissions, routing them through dedicated VPN tunnels to ensure rapid and secure delivery to relevant authorities or emergency response teams.

In a drone-related use case scenario, a precision agriculture company may utilize a fleet of eSIM-equipped drones for crop monitoring and management. These drones may capture high-resolution imagery, collect soil moisture data, and apply targeted treatments to crops. The security service platform 608 may handle the diverse data streams from these drones, processing metadata that includes drone identification, flight path, sensor readings, and captured imagery. For routine monitoring flights, the security service platform 608 may apply standard encryption and route the data directly to the company's cloud-based analysis systems. However, for drones carrying out more sensitive operations, such as applying proprietary treatment formulas, the security service platform 608 may implement stricter security protocols. This may include routing all command and control signals through a VPN, using geofencing to ensure drones only operate within designated areas, and applying additional encryption layers to protect the company's intellectual property. The security service platform 608 may adapt its security measures based on the drone's location, implementing stricter controls when operating near property boundaries or in areas with potential signal interference.

In a robotics-focused use case scenario, a multinational manufacturing company may deploy a network of eSIM-enabled collaborative robots (cobots) across its global factories. These cobots may work alongside human employees, performing tasks ranging from assembly to quality control. The security service platform 608 may manage the communication for these cobots, processing metadata that includes robot identification, current task, location within the factory, and interaction logs with human workers. For routine operations, the security service platform 608 may route data through local PoPs to minimize latency, enabling real-time coordination between cobots and central control systems. When cobots are involved in producing highly confidential products or prototypes, the security service platform 608 may activate enhanced security protocols. This may include routing all data through multiple VPN hops to obscure the true origin of the data, implementing advanced encryption for all transmissions, and requiring multi-factor authentication for any remote access or programming attempts. The security service platform 608 may monitor for any unusual patterns in cobot behavior or unexpected changes in metadata, which could indicate a potential security breach or malfunction.

In an augmented reality (AR) use case scenario, a global architecture firm may utilize eSIM-enabled AR headsets for remote collaboration and on-site project visualization. These headsets may allow architects and engineers to overlay digital models onto physical construction sites, facilitating real-time design adjustments and progress monitoring. The security service platform 608 may manage the complex data flows associated with these AR applications, processing metadata that includes user identity, headset location, project identifiers, and the nature of the AR content being accessed or modified. For general collaboration sessions, the security service platform 608 may route communications through geographically optimized PoPs to ensure low-latency experiences for all participants. When accessing or modifying sensitive project data, such as proprietary designs or client-confidential information, the security service platform 608 may implement additional security measures. This may include routing all AR data streams through dedicated VPN tunnels, applying dynamic watermarking to visual content to deter unauthorized sharing, and using adaptive encryption that adjusts based on the sensitivity of the information being transmitted. The security service platform 608 may leverage its event streaming capabilities to monitor for potential security anomalies, such as unexpected access attempts or unusual data transfer patterns, allowing for real-time threat mitigation.

Figure 7:
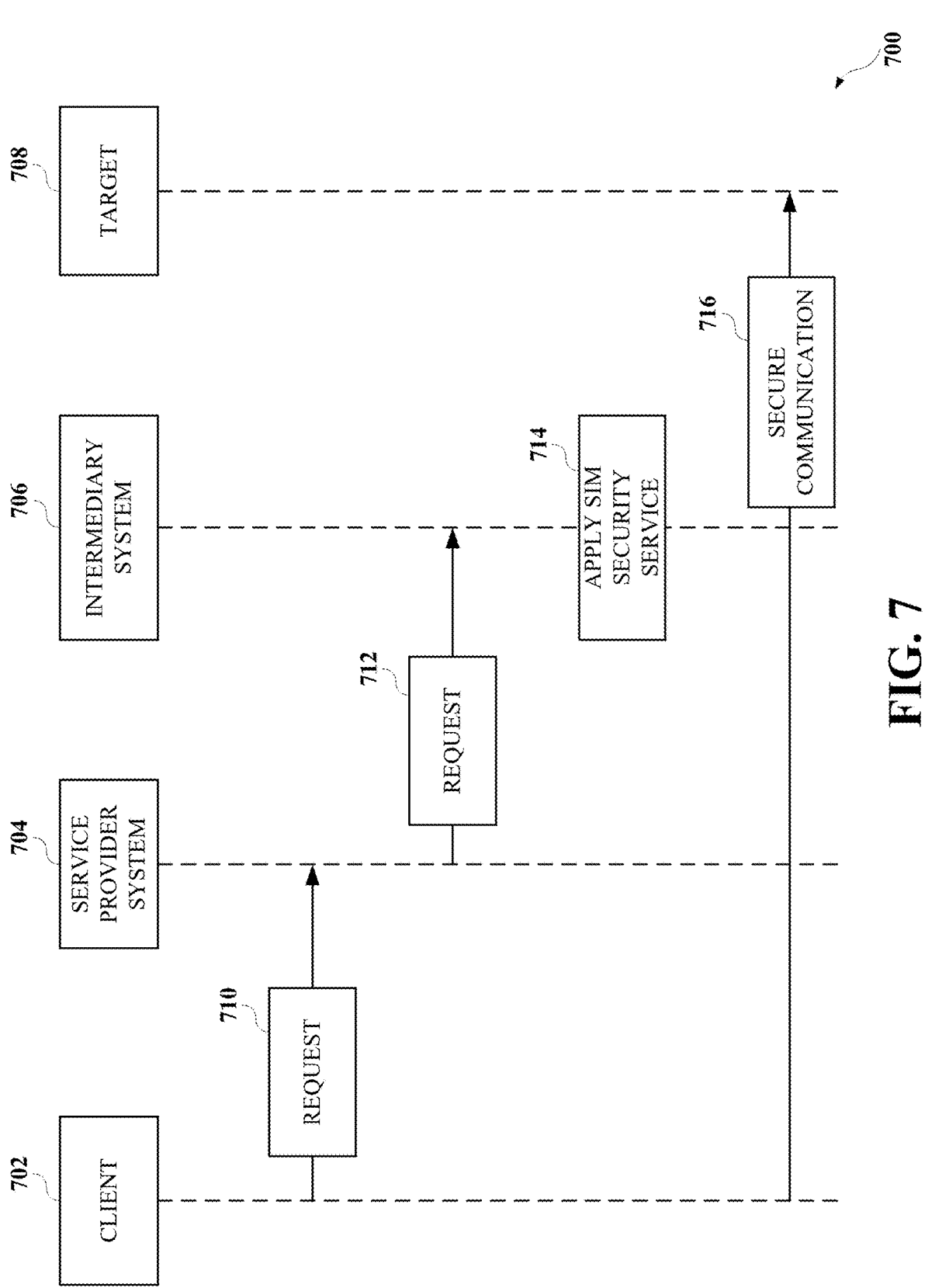
FIG. 7 is a flow diagram of an exemplary process associated with a secure SIM networking service.

FIG. 7 is a flow diagram of an exemplary process 700 associated with a secure SIM networking service. FIG. 7 illustrates a client device 702, a service provider system 704, an intermediary system 706, and a target 708. Each of the client device 702, the service provider system 704, the intermediary system 706, and the target 708 may be generically referred to as a system component. A system component refers to one or more devices and/or applications. Where a system component is or refers to a device, the system component can be, be similar to, include, or be included in a computing system, which can include one or more computing devices (e.g., one or more of the computing device 100 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client device 702 may initiate the process, as shown at 710, by sending a request associated with accessing the target 708. This request may be for various purposes, such as accessing a website, retrieving data from a server, or initiating a secure transaction. The service provider system 704 may receive the request from the client device 702. Upon receiving the request, at 712, the service provider system 704 may forward the request to the intermediary system 706. This forwarding process may involve appending additional metadata to the request, such as the client device's MSISDN, ICCID, or current location information. This metadata may enable the intermediary system 706 to apply appropriate security measures and routing decisions.

The intermediary system 706 may process the request by applying a SIM security service, represented by block 714. This security service may perform various functions to enhance the privacy and security of the communication. The SIM security service may include several layers of security measures. For instance, the intermediary system 706 may verify the authenticity of the request using the metadata provided by the service provider system 704. In some implementations, the intermediary system 706 may apply user-defined security policies, such as traffic encryption, DNS-based threat protection, or routing preferences. In some implementations, the security service may use machine learning algorithms to detect and respond to potential security threats in real-time.

By processing the request through the SIM security service, the intermediary system 706 may generate a secure communication, which provided to the target 708, at 716. The secure communication may be encrypted, its apparent origin may be masked, or it may be routed through a specific VPN server based on user preferences or security requirements.

In some implementations, the intermediary system 706 may process the request to determine a SIM security service to be applied to data communications from the client device addressed to the target. For example, the intermediary system 706 may analyze metadata associated with the request, such as the client device's MSISDN, ICCID, current location, or other relevant information provided by the service provider system 704. Based on this analysis, the intermediary system 706 may select an appropriate SIM security service that aligns with the client device's security requirements and preferences.

The SIM security service may encompass various security measures and protocols that can be applied to the data communications, which may include protocol data units (PDUs) transmitted from the client device 702 to the target 708. These security measures may include encryption, traffic obfuscation, protocol switching, or routing through specific network paths. For instance, the intermediary system 706 may determine that all PDUs from a particular client device 702 should be encrypted using a specific algorithm, or that traffic should be routed through a series of predetermined PoPs before reaching the target 710.

In some cases, the intermediary system 706 may consult a database or policy engine to determine the appropriate SIM security service based on factors such as the client device's identity, the nature of the request, or current network conditions. The system may also take into account user-defined preferences or corporate security policies associated with the client device's SIM.

Once the SIM security service is determined, the intermediary system 706 may apply it to the data communications in real-time. This may involve intercepting PDUs from the client device 702, applying the necessary security measures, and then forwarding the secured PDUs to the target 710. The application of the SIM security service may be transparent to both the client device 702 and the target 710, allowing for enhanced security without requiring changes to existing applications or protocols.

In some implementations, the intermediary system 706 may dynamically adjust the SIM security service based on ongoing analysis of the communication stream. For example, if the system detects potential security threats or unusual patterns in the data flow, it may automatically enhance the security measures applied to subsequent PDUs. This adaptive approach may allow for a flexible and responsive security framework that can address emerging threats in real-time.

The intermediary system 706 may also provide feedback to the client device 702 or service provider system 704 about the applied SIM security service. This feedback may include information about the types of security measures applied, any potential threats that were mitigated, or suggestions for enhancing the security of future communications. Such feedback may be provided through a user interface, API, or other reporting mechanisms, allowing for greater visibility and control over the security of SIM-based communications.

In some implementations of this disclosure, the process 700 may include additional steps or variations. For example, the intermediary system 706 may communicate back to the client device 702 through the service provider system 704 to request additional authentication or to provide status updates on the request processing. In some implementations, the system may be configured to handle responses from the target 710, applying similar security measures to the return path of the communication. In some implementations, the intermediary system 706 may implement advanced traffic analysis techniques, such as DPI and behavioral analytics, to identify and mitigate potential security threats in real-time. The system may incorporate NFV technologies, allowing for the dynamic deployment of security services as needed.

In some implementations, the intermediary system 706 may provide options for dedicated leased lines or wave/dark fiber connections to enhance security and performance for certain client devices or applications. The system may support various tunneling protocols such as GRE, NVGRE, GENEVE, VXLAN, and IPSec to enable secure data transmission across different network environments.

The intermediary system 706 may incorporate MPLS functionality in some aspects. This may facilitate efficient and flexible routing of SIM traffic, potentially improving network performance and enabling advanced traffic engineering capabilities. The system may use MPLS to establish VPNs for secure client device communications or to prioritize certain types of traffic based on QoS requirements.

In some implementations, the intermediary system 706 may employ machine learning algorithms to continually optimize its decision-making processes. For example, the system may analyze historical data to predict network congestion and proactively adjust routing paths. The system may learn from past security incidents to improve threat detection and response mechanisms.

The intermediary system 706 may provide an experience service component in some aspects. This component may offer a user interface for client devices to interact with and configure the secure SIM networking service. Users may be able to view and modify their security settings, monitor their network usage, and receive notifications about potential security threats or service updates. In some implementations, this component may be accessible through a mobile application installed on the client device, a web portal, or both, providing flexibility in how users manage their secure SIM networking experience.

Figure 8:
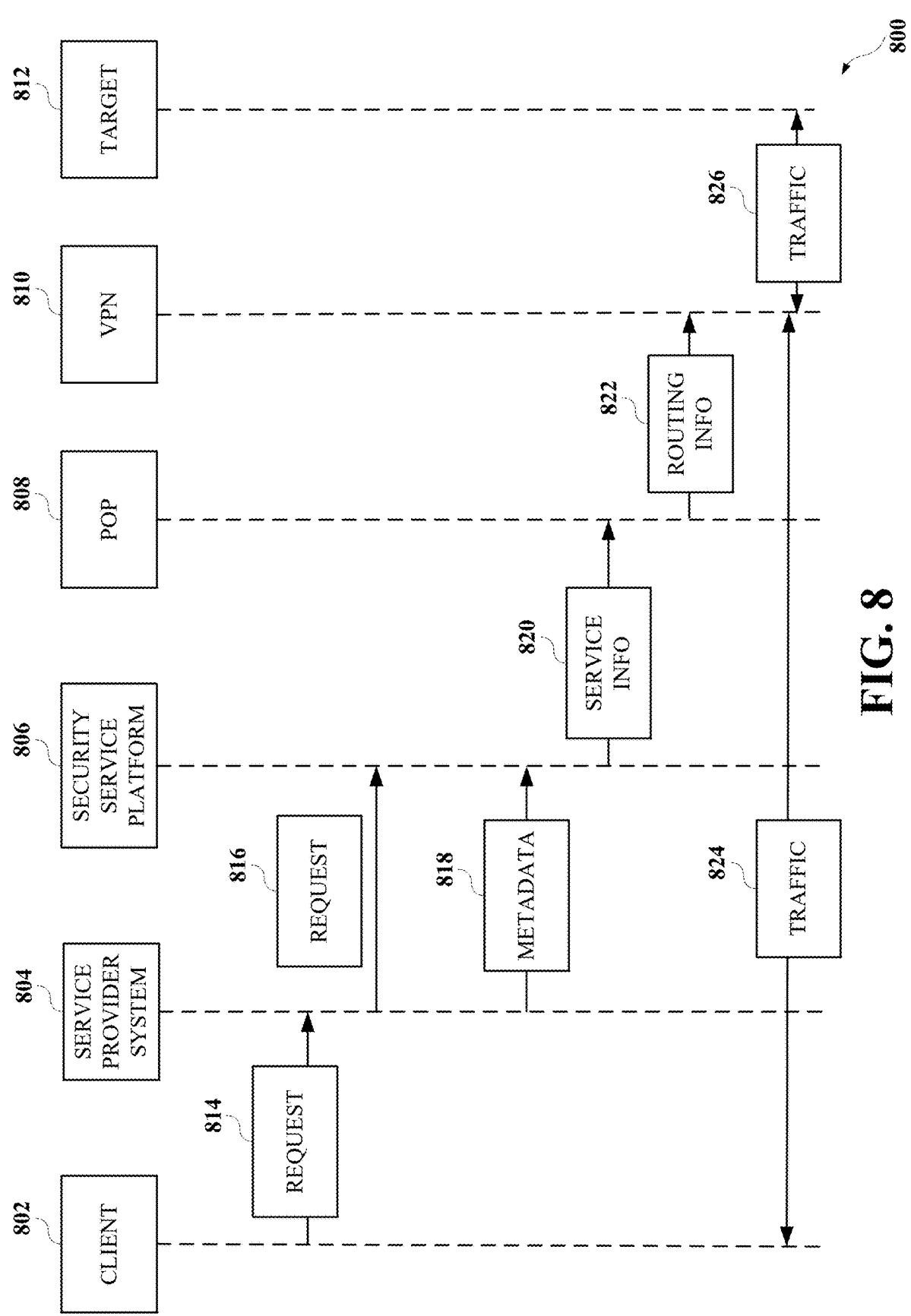
FIG. 8 is a flow diagram of another exemplary process associated with a secure SIM networking service.

FIG. 8 is a flow diagram of another exemplary process 800 associated with a secure SIM networking service. FIG. 8 illustrates a client device 802, a service provider system 804, a security service platform 806, a PoP 808, a VPN 810, and a target 812. Each of the client device 802, the service provider system 804, the security service platform 806, the PoP 808, the VPN 810, and the target 812 may be generically referred to as a system component. A system component refers to one or more devices and/or applications. Where a system component is or refers to a device, the system component can be, be similar to, include, or be included in a computing system, which can include one or more computing devices (e.g., one or more of the computing device 100 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

As shown at 814, the client device 802 sends a request to the service provider system 804. The service provider system 804 forwards the request to the security service platform 806, as shown at 816. The service provider system 804 also sends metadata 818 to the security service platform 806. This metadata 818 may include information about the client device and the request, such as the client device's MSISDN, ICCID, current location, or other relevant data that can aid in security decision-making.

The security service platform 806 may process the request and the metadata to generate service information (shown as "service info"), which the security service platform 806 may provide to the PoP 808, as shown at 820. In some implementations, the security service platform 806 may combine the received metadata with additional data stored in its databases, such as user preferences, historical behavior patterns, or current threat intelligence. The service information may include security policies to be applied, routing decisions, or instructions for further processing of the request.

The PoP 808 may, based on the service information, provide routing information to the VPN 810, as shown at 822. The routing information may specify the optimal path for the request, taking into account factors such as security requirements, performance optimization, and user preferences. In some implementations, the routing information may include instructions for encrypting the traffic, selecting a specific exit node, or applying additional security measures. The VPN 810, upon receiving the routing information 822, establishes a secure connection for moving data traffic between the client device 802 and the target 812, as shown at 824 and 826.

In some implementations, the process 800 may include additional steps or variations. For example, the security service platform 806 might employ machine learning algorithms to dynamically adjust security measures based on real-time threat intelligence. The PoP 808 could incorporate edge computing capabilities to provide low-latency security services closer to the end-user. The VPN 810 might offer advanced features such as split tunneling or multi-hop connections for enhanced security and flexibility.

Figure 9:
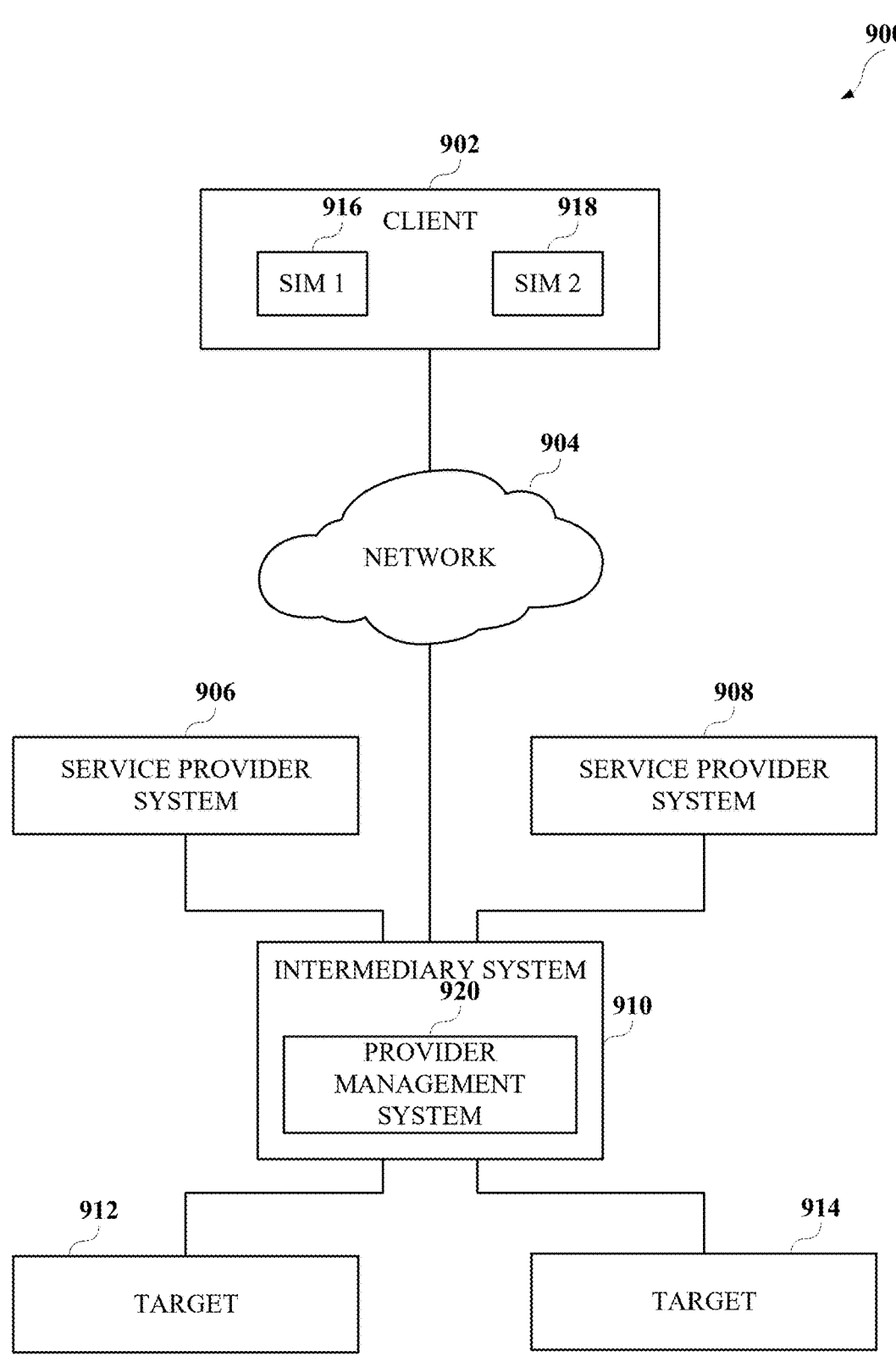
FIG. 9 is a block diagram of an exemplary system for provisioning multi-provider secure subscriber identification module services.

FIG. 9 is a block diagram of an exemplary system for provisioning multi-provider secure subscriber identification module services. The system 900 includes a client device 902, a network 904, a service provider system 906, a service provider system 908, an intermediary system 910, a target 912, and a target 914. In some implementations, two or more of the client device 902, the network 904, the service provider system 906, the service provider system 908, the intermediary system 910, the target 912, and the target 914 may be integrated into a single component. In some implementations, one or more of the client device 902, the network 904, the service provider system 906, the service provider system 908, the intermediary system 910, the target 912, and the target 914 may be implemented using any number of computing devices such as the computing device 100 shown in FIG. 1. For example, one or more of the client device 902, the network 904, the service provider system 906, the service provider system 908, the intermediary system 910, the target 912, and the target 914 may be distributed among a number of computing devices.

The client device 902 may be a computing device configured to initiate communications that are secured and provisioned by other components of the system 900. The client device 902 may be, be similar to, include, or be included in the client device 302 shown in FIG. 3, the client device 402 shown in FIG. 4, the client device 502 shown in FIG. 5A, the client device 522 shown in FIG. 5B, or the client device 602 shown in FIG. 6. The client device 902 may be configured to support multiple subscriber identification modules, such as a SIM 1 916 and a SIM 2 918, which may facilitate connectivity with multiple distinct service provider systems. The client device 902 may be configured to transmit requests for eSIM services and to generate data traffic that is subject to a security service.

In some implementations, the client device 902 may be a mobile device such as a smartphone, a tablet, or a wearable device. For example, the client device 902 may be a laptop computer configured with an eSIM that may store profiles for both a domestic and an international service provider system, allowing the user to switch between services without physically changing a SIM card. The client device 902 may be configured to communicate with the network 904 to transmit and receive data.

The network 904 may be a communications infrastructure configured to facilitate data transmission between the client device 902 and other components of the system 900, such as the service provider system 906 and the service provider system 908. The network 904 may be, be similar to, include, or be included in the network 304 shown in FIG. 3, the network 404 shown in FIG. 4, the network 504 shown in FIG. 5A, the network 524 shown in FIG. 5B, or the network 604 shown in FIG. 6. The network 904 may be configured to support various wireless and wired communication protocols, including cellular, Wi-Fi, and Ethernet technologies.

In some implementations, the network 904 may include a global aggregation of interconnected networks, such as the Internet, and may include both public and private network segments. For example, the network 904 may include a 5G cellular network that the client device 902 uses to connect to the service provider system 906, and may also include fiber optic backbones that connect the service provider system 906 to the intermediary system 910. The network 904 may be configured to handle the routing of data packets from the client device 902 to the appropriate service provider system based on the active SIM profile.

The service provider system 906 may be an entity, such as an MNO or MVNO, configured to provide cellular connectivity services to the client device 902. The service provider system 906 may be, be similar to, include, or be included in the service provider system 306 shown in FIG. 3, the service provider system 406 shown in FIG. 4, the service provider system 506 shown in FIG. 5A, or the service provider system 606 shown in FIG. 6. The service provider system 906 may be configured to receive communications from the client device 902 via the network 904 and forward them to the intermediary system 910 for further processing, such as the application of a security service or the provisioning of a new eSIM service.

In some implementations, the service provider system 906 may have a unique backend system and API for managing user subscriptions and provisioning services. For example, the service provider system 906 may be a national telecommunications company that provides specific data plans for a particular country. The service provider system 906 may interact with the intermediary system 910 to offload the management of multiple, disparate provider integrations and to facilitate enhanced security for its subscribers' data traffic.

The service provider system 908 may be a distinct entity from the service provider system 906, configured to offer different or alternative cellular connectivity services to the client device 902. The service provider system 908 may be, be similar to, include, or be included in the service provider system 408 shown in FIG. 4. The service provider system 908 may be configured to operate in parallel with the service provider system 906, providing the client device 902 with a choice of connectivity options, which may be managed by the intermediary system 910. The service provider system 908 may also receive communications from the client device 902 via the network 904.

In some implementations, the service provider system 908 may be a global connectivity provider specializing in data plans for international travel. For example, a user of the client device 902 may have an eSIM profile for the service provider system 906 for domestic use and another profile for the service provider system 908 for use when abroad. The intermediary system 910 may be configured to receive requests associated with either the service provider system 906 or the service provider system 908.

The intermediary system 910 may be a system of hardware and software components configured to act as an abstraction layer and security gateway between the service provider systems, such as the service provider system 906 and the service provider system 908, and the targets, such as the target 912 and the target 914. The intermediary system 910 may be, be similar to, include, or be included in the intermediary system 308 shown in FIG. 3, the intermediary system 410 shown in FIG. 4, the intermediary system 508 shown in FIG. 5A, or the intermediary system 526 shown in FIG. 5B. The intermediary system 910 may be configured to receive requests from one or more service provider systems and route them to one or more targets.

In some implementations, the intermediary system 910 may be deployed as a distributed, cloud-native application to facilitate scalability and high availability. For example, the intermediary system 910 may be hosted across multiple geographic regions to reduce latency for a global user base. The intermediary system 910 may be configured to apply security services to data traffic and to manage the provisioning of eSIM services from multiple, unique service provider systems through its internal provider management system 920.

The target 912 may be a destination for communications originating from the client device 902. The target 912 may be, be similar to, include, or be included in the target 310 shown in FIG. 3, the target 412 shown in FIG. 4, the target 510 shown in FIG. 5A, or the target 528 shown in FIG. 5B. The target 912 may be configured to receive secure communications that have been processed by the intermediary system 910. Examples of the target 912 may include, but are not limited to, a web server, an application server, or another networked computing device.

In some implementations, the target 912 may be a corporate server hosting sensitive data. A communication from the client device 902 destined for the target 912 may be routed through the intermediary system 910, where a security service is applied to encrypt the communication and verify the user's access privileges before the communication is provided to the target 912.

The target 914 may be another destination for communications originating from the client device 902, distinct from the target 912. The target 914 may be, be similar to, include, or be included in the target 414 shown in FIG. 4. The target 914 may be configured to receive secure communications from the intermediary system 910. The presence of multiple targets, such as the target 912 and the target 914, illustrates the capability of the system 900 to route traffic to various destinations based on the nature of the communication or user-defined policies.

In some implementations, the target 914 may be a public-facing content delivery network (CDN). For example, a request from the client device 902 to stream video may be routed by the intermediary system 910 to the target 914, while a separate request to access a private database may be routed to the target 912, with different security policies applied to each communication stream.

As shown in FIG. 9, the client device 902 includes a SIM 1 916 and a SIM 2 918. The SIM 1 916 may be a subscriber identification module configured to store user subscription information for a specific service provider system, such as the service provider system 906. The SIM 1 916 may be, be similar to, include, or be included in the SIM component 312 shown in FIG. 3 or the SIM 416 shown in FIG. 4. The SIM 1 916 facilitates the authentication of the client device 902 on a cellular network. In some implementations, the SIM 1 916 may be a physical, removable SIM card. In other implementations, the SIM 1 916 may be an eSIM profile stored on an eUICC within the client device 902. For example, the SIM 1 916 may correspond to a user's primary mobile phone plan.

The SIM 2 918 may be a second subscriber identification module within the client device 902, configured to store subscription information for a different service provider system, such as the service provider system 908. The SIM 2 918 may be, be similar to, include, or be included in the SIM 418 shown in FIG. 4. The SIM 2 918 may facilitate dual-SIM functionality, allowing the client device 902 to be connected to two different networks or to switch between them. In some implementations, the SIM 2 918 may be an eSIM profile that is provisioned through a request handled by the intermediary system 910. For example, a user may purchase a short-term data plan from the service provider system 908 for international travel, and the corresponding eSIM profile may be downloaded and activated as the SIM 2 918.

As shown in FIG. 9, the intermediary system 910 includes a provider management system 920. The provider management system 920 may be a collection of software and/or hardware components configured to orchestrate eSIM service provisioning from multiple, distinct service provider systems. The provider management system 920 may be configured to act as an abstraction layer between a primary API and the backend systems of the service provider system 906 and the service provider system 908. As part of its function to abstract and orchestrate communications, the provider management system 920 may be configured to receive a first request associated with an eSIM service from a primary API. In some implementations, this first request may include a composite plan identifier. The provider management system 920 may be configured to use the composite plan identifier to resolve a target service provider module from a plurality of distinct service provider modules, where each service provider module programmatically corresponds to a unique service provider system, such as the service provider system 906 or the service provider system 908. After resolving the target service provider module, the provider management system 920 may be configured to transmit a second request, corresponding to the first request, to the target service provider module. Subsequently, the provider management system 920 may transmit a response from the target service provider module back to the primary API, completing the request-response cycle.

Figure 10:
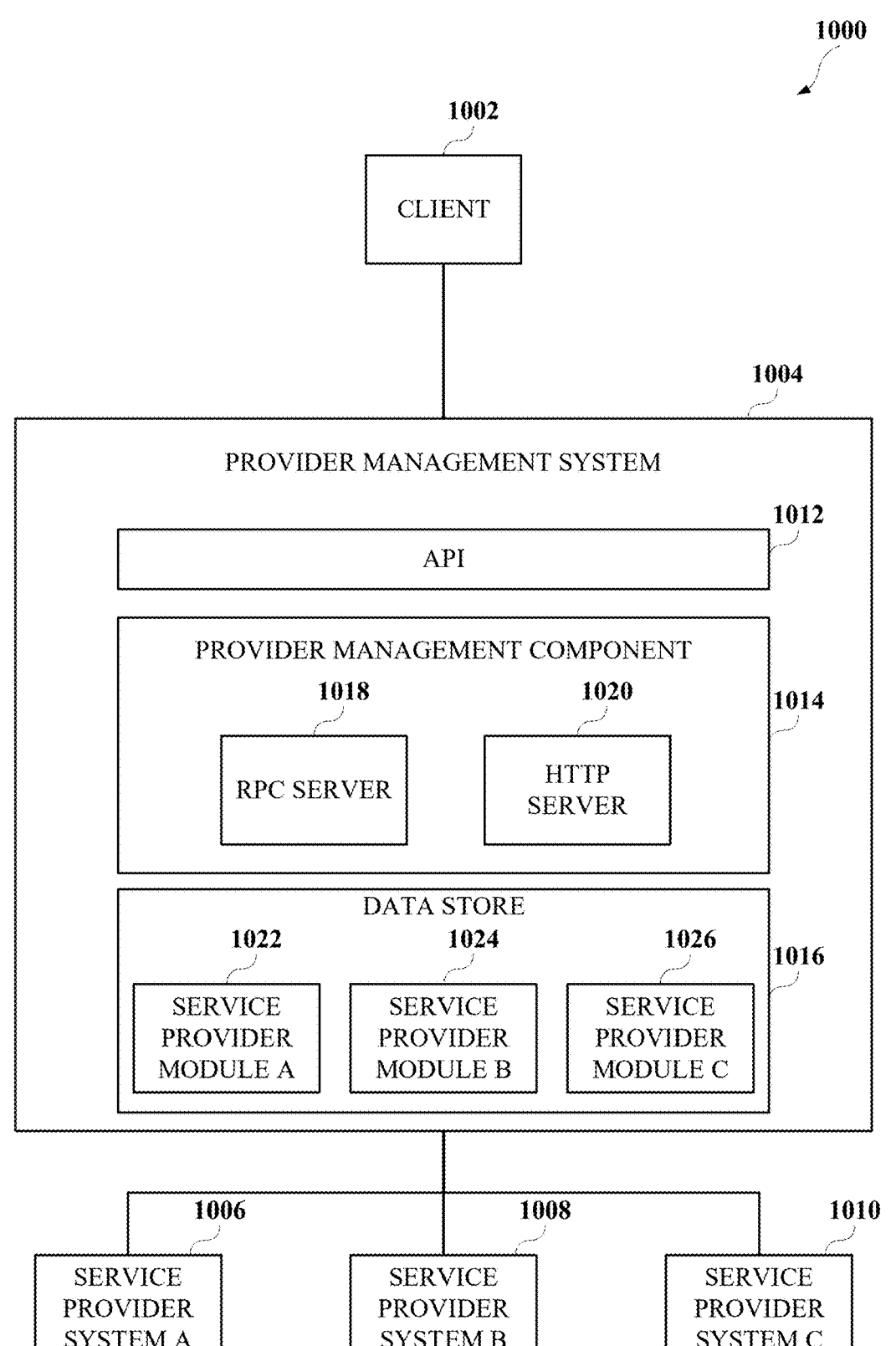
FIG. 10 is a block diagram of an exemplary system for provisioning multi-provider secure subscriber identification module services.

In some implementations, the provider management system 920 may include a provider management component and a plurality of service provider modules, as detailed in the description of FIG. 10. For example, when a user of the client device 902 requests to purchase a new eSIM plan, the request is received by the provider management system 920. The provider management system 920 decodes the composite plan identifier to determine that the plan belongs to the service provider system 908, resolves the corresponding service provider module, and transmits an order creation request to that module. This architecture decouples the primary API from the specific implementation details of each unique service provider system.

FIG. 9 is a block diagram of an exemplary system for provisioning multi-provider secure subscriber identification module services. The system 900 includes a client device 902, a network 904, a service provider system 906, a service provider system 908, an intermediary system 910, a target 912, and a target 914. In some implementations, two or more of the client device 902, the network 904, the service provider system 906, the service provider system 908, the intermediary system 910, the target 912, and the target 914 may be integrated into a single component. In some implementations, one or more of the client device 902, the network 904, the service provider system 906, the service provider system 908, the intermediary system 910, the target 912, and the target 914 may be implemented using any number of computing devices such as the computing device 100 shown in FIG. 1. For example, one or more of the client device 902, the network 904, the service provider system 906, the service provider system 908, the intermediary system 910, the target 912, and the target 914 may be distributed among a number of computing devices.

The client device 902 may be a computing device configured to initiate communications that are secured and provisioned by other components of the system 900. The client device 902 may be, be similar to, include, or be included in the client device 302 shown in FIG. 3, the client device 402 shown in FIG. 4, the client device 502 shown in FIG. 5A, the client device 522 shown in FIG. 5B, or the client device 602 shown in FIG. 6. The client device 902 may be configured to support multiple subscriber identification modules, such as a SIM 1 916 and a SIM 2 918, which may facilitate connectivity with multiple distinct service provider systems. The client device 902 may be configured to transmit requests for eSIM services and to generate data traffic that is subject to a security service.

In some implementations, the client device 902 may be a mobile device such as a smartphone, a tablet, or a wearable device. For example, the client device 902 may be a laptop computer configured with an eSIM that may store profiles for both a domestic and an international service provider system, allowing the user to switch between services without physically changing a SIM card. The client device 902 may be configured to communicate with the network 904 to transmit and receive data.

The network 904 may be a communications infrastructure configured to facilitate data transmission between the client device 902 and other components of the system 900, such as the service provider system 906 and the service provider system 908. The network 904 may be, be similar to, include, or be included in the network 304 shown in FIG. 3, the network 404 shown in FIG. 4, the network 504 shown in FIG. 5A, the network 524 shown in FIG. 5B, or the network 604 shown in FIG. 6. The network 904 may be configured to support various wireless and wired communication protocols, including cellular, Wi-Fi, and Ethernet technologies.

In some implementations, the network 904 may include a global aggregation of interconnected networks, such as the Internet, and may include both public and private network segments. For example, the network 904 may include a 5G cellular network that the client device 902 uses to connect to the service provider system 906, and may also include fiber optic backbones that connect the service provider system 906 to the intermediary system 910. The network 904 may be configured to handle the routing of data packets from the client device 902 to the appropriate service provider system based on the active SIM profile.

The service provider system 906 may be an entity, such as an MNO or MVNO, configured to provide cellular connectivity services to the client device 902. The service provider system 906 may be, be similar to, include, or be included in the service provider system 306 shown in FIG. 3, the service provider system 406 shown in FIG. 4, the service provider system 506 shown in FIG. 5A, or the service provider system 606 shown in FIG. 6. The service provider system 906 may be configured to receive communications from the client device 902 via the network 904 and forward them to the intermediary system 910 for further processing, such as the application of a security service or the provisioning of a new eSIM service.

In some implementations, the service provider system 906 may have a unique backend system and API for managing user subscriptions and provisioning services. For example, the service provider system 906 may be a national telecommunications company that provides specific data plans for a particular country. The service provider system 906 may interact with the intermediary system 910 to offload the management of multiple, disparate provider integrations and to facilitate enhanced security for its subscribers' data traffic.

The service provider system 908 may be a distinct entity from the service provider system 906, configured to offer different or alternative cellular connectivity services to the client device 902. The service provider system 908 may be, be similar to, include, or be included in the service provider system 408 shown in FIG. 4. The service provider system 908 may be configured to operate in parallel with the service provider system 906, providing the client device 902 with a choice of connectivity options, which may be managed by the intermediary system 910. The service provider system 908 may also receive communications from the client device 902 via the network 904.

In some implementations, the service provider system 908 may be a global connectivity provider specializing in data plans for international travel. For example, a user of the client device 902 may have an eSIM profile for the service provider system 906 for domestic use and another profile for the service provider system 908 for use when abroad. The intermediary system 910 may be configured to receive requests associated with either the service provider system 906 or the service provider system 908.

The intermediary system 910 may be a system of hardware and software components configured to act as an abstraction layer and security gateway between the service provider systems, such as the service provider system 906 and the service provider system 908, and the targets, such as the target 912 and the target 914. The intermediary system 910 may be, be similar to, include, or be included in the intermediary system 308 shown in FIG. 3, the intermediary system 410 shown in FIG. 4, the intermediary system 508 shown in FIG. 5A, or the intermediary system 526 shown in FIG. 5B. The intermediary system 910 may be configured to receive requests from one or more service provider systems and route them to one or more targets.

In some implementations, the intermediary system 910 may be deployed as a distributed, cloud-native application to facilitate scalability and high availability. For example, the intermediary system 910 may be hosted across multiple geographic regions to reduce latency for a global user base. The intermediary system 910 may be configured to apply security services to data traffic and to manage the provisioning of eSIM services from multiple, unique service provider systems through its internal provider management system 920.

The target 912 may be a destination for communications originating from the client device 902. The target 912 may be, be similar to, include, or be included in the target 310 shown in FIG. 3, the target 412 shown in FIG. 4, the target 510 shown in FIG. 5A, or the target 528 shown in FIG. 5B. The target 912 may be configured to receive secure communications that have been processed by the intermediary system 910. Examples of the target 912 may include, but are not limited to, a web server, an application server, or another networked computing device.

In some implementations, the target 912 may be a corporate server hosting sensitive data. A communication from the client device 902 destined for the target 912 may be routed through the intermediary system 910, where a security service is applied to encrypt the communication and verify the user's access privileges before the communication is provided to the target 912.

The target 914 may be another destination for communications originating from the client device 902, distinct from the target 912. The target 914 may be, be similar to, include, or be included in the target 414 shown in FIG. 4. The target 914 may be configured to receive secure communications from the intermediary system 910. The presence of multiple targets, such as the target 912 and the target 914, illustrates the capability of the system 900 to route traffic to various destinations based on the nature of the communication or user-defined policies.

In some implementations, the target 914 may be a public-facing content delivery network (CDN). For example, a request from the client device 902 to stream video may be routed by the intermediary system 910 to the target 914, while a separate request to access a private database may be routed to the target 912, with different security policies applied to each communication stream.

As shown in FIG. 9, the client device 902 includes a SIM 1 916 and a SIM 2 918. The SIM 1 916 may be a subscriber identification module configured to store user subscription information for a specific service provider system, such as the service provider system 906. The SIM 1 916 may be, be similar to, include, or be included in the SIM component 312 shown in FIG. 3 or the SIM 416 shown in FIG. 4. The SIM 1 916 facilitates the authentication of the client device 902 on a cellular network. In some implementations, the SIM 1 916 may be a physical, removable SIM card. In other implementations, the SIM 1 916 may be an eSIM profile stored on an eUICC within the client device 902. For example, the SIM 1 916 may correspond to a user's primary mobile phone plan.

The SIM 2 918 may be a second subscriber identification module within the client device 902, configured to store subscription information for a different service provider system, such as the service provider system 908. The SIM 2 918 may be, be similar to, include, or be included in the SIM 418 shown in FIG. 4. The SIM 2 918 may facilitate dual-SIM functionality, allowing the client device 902 to be connected to two different networks or to switch between them. In some implementations, the SIM 2 918 may be an eSIM profile that is provisioned through a request handled by the intermediary system 910. For example, a user may purchase a short-term data plan from the service provider system 908 for international travel, and the corresponding eSIM profile may be downloaded and activated as the SIM 2 918.

As shown in FIG. 9, the intermediary system 910 includes a provider management system 920. The provider management system 920 may be a collection of software and/or hardware components configured to orchestrate eSIM service provisioning from multiple, distinct service provider systems. The provider management system 920 may be configured to act as an abstraction layer between a primary API and the backend systems of the service provider system 906 and the service provider system 908. As part of its function to abstract and orchestrate communications, the provider management system 920 may be configured to receive a first request associated with an eSIM service from a primary API. In some implementations, this first request may include a composite plan identifier. The provider management system 920 may be configured to use the composite plan identifier to resolve a target service provider module from a plurality of distinct service provider modules, where each service provider module programmatically corresponds to a unique service provider system, such as the service provider system 906 or the service provider system 908. After resolving the target service provider module, the provider management system 920 may be configured to transmit a second request, corresponding to the first request, to the target service provider module. Subsequently, the provider management system 920 may transmit a response from the target service provider module back to the primary API, completing the request-response cycle.

In some implementations, the provider management system 920 may include a provider management component and a plurality of service provider modules, as detailed in the description of FIG. 10. For example, when a user of the client device 902 requests to purchase a new eSIM plan, the request is received by the provider management system 920. The provider management system 920 decodes the composite plan identifier to determine that the plan belongs to the service provider system 908, resolves the corresponding service provider module, and transmits an order creation request to that module. This architecture decouples the primary API from the specific implementation details of each unique service provider system.

FIG. 10 is a block diagram of an exemplary system 1000 for provisioning multi-provider secure subscriber identification module services. The system 1000 includes a client device 1002, a provider management system 1004, a service provider system A 1006, a service provider system B 1008, and a service provider system C 1010. In some implementations, two or more of the client device 1002, the provider management system 1004, the service provider system A 1006, the service provider system B 1008, and the service provider system C 1010 may be integrated into a single component. In some implementations, one or more of the client device 1002, the provider management system 1004, the service provider system A 1006, the service provider system B 1008, and the service provider system C 1010 may be implemented using any number of computing devices such as the computing device 100 shown in FIG. 1. For example, one or more of the client device 1002, the provider management system 1004, the service provider system A 1006, the service provider system B 1008, and the service provider system C 1010 may be distributed among a number of computing devices.

The client device 1002 may be a computing device configured to initiate requests for eSIM services and to generate data traffic that is subject to a security service. The client device 1002 may be, be similar to, include, or be included in the client device 902 shown in FIG. 9, the client device 602 shown in FIG. 6, the client device 522 shown in FIG. 5B, the client device 502 shown in FIG. 5A, the client device 402 shown in FIG. 4, or the client device 302 shown in FIG. 3. The client device 1002 may be configured to communicate with the provider management system 1004, for example, by transmitting requests to an application programming interface of the provider management system 1004. In some implementations, the client device 1002 may be a smartphone that includes an application configured to display available eSIM plans and to facilitate the purchase and activation of a selected plan by interacting with the provider management system 1004.

The provider management system 1004 may be a collection of hardware and software components configured to act as an abstraction layer between the client device 1002 and a plurality of unique service provider systems, such as the service provider system A 1006, the service provider system B 1008, and the service provider system C 1010. The provider management system 1004 may be, be similar to, include, or be included in the provider management system 920 shown in FIG. 9. The provider management system 1004 may be configured to receive requests associated with eSIM services, resolve the appropriate service provider system to handle the request, and manage the communication flow between the client device 1002 and the selected service provider system. For example, the provider management system 1004 may receive a request from the client device 1002 to view all available data plans, and in response, the provider management system 1004 may query each of its integrated service provider systems to aggregate and return a unified list of plans.

The service provider system A 1006 may be a unique service provider system, such as an MNO or an MVNO, configured to offer cellular connectivity services. The service provider system A 1006 may be, be similar to, include, or be included in the service provider system 906 shown in FIG. 9, the service provider system 606 shown in FIG. 6, the service provider system 506 shown in FIG. 5A, the service provider system 406 shown in FIG. 4, or the service provider system 306 shown in FIG. 3. The service provider system A 1006 may be configured to communicate with the provider management system 1004 to receive service provisioning requests and to provide status updates, such as through webhook postbacks. In some implementations, the service provider system A 1006 may represent a national telecommunications carrier with its own distinct API and data models for managing eSIM subscriptions.

The service provider system B 1008 may be a second unique service provider system, distinct from the service provider system A 1006. The service provider system B 1008 may be, be similar to, include, or be included in the service provider system 908 shown in FIG. 9 or the service provider system 408 shown in FIG. 4. The service provider system B 1008 is configured to offer its own set of cellular connectivity services and plans, which are managed and exposed to the client device 1002 via the provider management system 1004. For example, the service provider system B 1008 may be a global connectivity provider that specializes in international data roaming plans, operating independently from the service provider system A 1006 but integrated into the same overarching provider management system 1004.

The service provider system C 1010 may be a third unique service provider system, distinct from both the service provider system A 1006 and the service provider system B 1008. The provider management system 1004 is configured to manage interactions with the service provider system C 1010 alongside the other service provider systems. The inclusion of multiple distinct service provider systems, such as the service provider system A 1006, the service provider system B 1008, and the service provider system C 1010, illustrates the scalable nature of the provider management system 1004. In some implementations, the service provider system C 1010 may be a provider focused on IoT device connectivity, offering specialized low-bandwidth data plans that are programmatically accessible through the provider management system 1004.

As shown in FIG. 10, the provider management system 1004 includes an API 1012, a provider management component 1014, and a data store 1016. In some implementations, these components may be deployed as a set of interconnected microservices in a cloud environment to facilitate scalability and resilience. In other implementations, the API 1012, the provider management component 1014, and the data store 1016 may be co-located on a single server or distributed across a private data center infrastructure.

The API 1012 may be an application programming interface configured to serve as the primary entry point for the client device 1002 to interact with the provider management system 1004. The API 1012 may expose a set of endpoints for operations such as requesting a list of available eSIM plans, initiating an order for a new plan, or checking the status of an existing order. The API 1012 may be configured to receive a first request associated with an eSIM service from the client device 1002 and to transmit a response back to the client device 1002 after the request has been processed by the provider management system 1004. For example, the API 1012 may be a RESTful API that accepts requests in a standardized format, such as JSON, abstracting the complexities of the underlying provider integrations from the client device 1002.

The provider management component 1014 may be a software component configured to orchestrate communications between the API 1012 and the various service provider modules within the data store 1016. The provider management component 1014 may be configured to receive a first request from the API 1012, resolve a target service provider module from a plurality of distinct service provider modules based on a composite plan identifier included in the request, and transmit a second request corresponding to the first request to the resolved target service provider module. In some implementations, the provider management component 1014 may be configured to aggregate responses from multiple service provider modules when handling requests that are not specific to a single provider, such as a request for all available plans.

The data store 1016 may be a storage system configured to contain a plurality of distinct service provider modules, each programmatically representing a unique service provider system. The data store 1016 may be, be similar to, include, or be included in the data store 626 shown in FIG. 6. The data store 1016 may be configured to provide the provider management component 1014 with access to the business logic, data models, and API interaction details for each supported service provider system. In some implementations, the data store 1016 may be a relational database system where each service provider module has its own dedicated database tables, enforcing logical and technical separation between the providers.

As shown in FIG. 10, the provider management component 1014 includes an RPC server 1018 and HTTP server 1020. In some implementations, the RPC server 1018 and the HTTP server 1020 may be implemented as separate services within the provider management component 1014, each handling a specific type of communication. This separation of concerns may facilitate independent scaling and maintenance of the RPC and HTTP functionalities.

The RPC server 1018 may be a server configured to facilitate internal communications between the provider management component 1014 and the plurality of service provider modules. The RPC server 1018 may be configured to implement a common service provider module interface that standardizes how the provider management component 1014 interacts with each service provider module for operations such as creating an order or retrieving plan information. For example, when the provider management component 1014 transmits a second request to a target service provider module, it may do so by making a remote procedure call to the target service provider module via the RPC server 1018.

The RPC server 1018 may be configured to provide a standardized, internal communication protocol for the provider management component 1014 to interact with the plurality of distinct service provider modules, including the service provider module A 1022, the service provider module B 1024, and the service provider module C 1026. This server may implement a common service provider module interface, which defines a consistent set of procedures and data structures for all provider-facing operations. For example, the common service provider module interface may define procedures such as CreateOrder, GetPlans, and GetOrderStatus, each with a standardized request and response format. By exposing this uniform interface, the RPC server 1018 abstracts the unique, underlying API implementations of each external service provider, such as the service provider A 1006, the service provider B 1008, and the service provider C 1010.

In some implementations, the RPC server 1018 may utilize a framework such as gRPC or Apache Thrift to facilitate efficient, low-latency communication between the provider management component 1014 and the service provider modules. When the provider management component 1014 needs to transmit a second request to a target service provider module, it may initiate a remote procedure call through the RPC server 1018. The RPC server 1018 may be configured to serialize the standardized request object, transmit it over the network to the designated endpoint of the target service provider module, and await a response. Upon receiving the response, the RPC server 1018 may deserialize it back into a standardized response object and return it to the provider management component 1014. This mechanism decouples the core logic of the provider management component 1014 from the specific communication protocols or data formats used by any single service provider module.

The use of the RPC server 1018 and the common service provider module interface may facilitate system maintainability and scalability. For instance, to add a new service provider system to the provider management system 1004, a new service provider module may be developed that implements the predefined common service provider module interface. This new module may be configured to handle the translation between the standardized RPC calls and the unique API of the new service provider system. No changes may be needed for the provider management component 1014 or the API 1012, as the RPC server 1018 provides a consistent point of interaction. This architectural approach may reduce development overhead and minimize the risk of introducing errors into existing integrations when expanding the system's capabilities.

The HTTP server 1020 may be a server configured to handle external, HTTP-based communications, such as webhook postbacks originating from the unique service provider systems. The HTTP server 1020 may be configured to provide a separate, dedicated endpoint for each unique service provider system, facilitating secure and reliable reception of asynchronous status updates. In some implementations, each dedicated endpoint may be configured with a unique authorization method corresponding to its respective service provider system to prevent unauthorized access. When the HTTP server 1020 receives a webhook postback, such as an order completion notification, it may be configured to route the data contained in the webhook postback signal to the appropriate service provider module for processing.

The HTTP server 1020 may be configured to manage inbound, asynchronous communications from the unique service provider systems, such as the service provider system A 1006, the service provider system B 1008, and the service provider system C 1010. A primary function of the HTTP server 1020 may be to handle webhook postbacks, which are automated messages sent by a service provider system when a specific event occurs, such as the successful provisioning of an eSIM service or a change in subscription status. The HTTP server 1020 may provide a stable and reliable endpoint for receiving these event-driven notifications, which may be critical for maintaining an accurate and up-to-date state of eSIM orders and subscriptions within the provider management system 1004.

In some implementations, the HTTP server 1020 may be configured to provide a separate, dedicated endpoint for each unique service provider system. This architectural choice enhances security and simplifies processing logic. Each dedicated endpoint may be configured with a unique authorization method corresponding to its respective service provider system. For example, the endpoint for the service provider system A 1006 may require a specific API key or an OAuth 2.0 token for authentication, while the endpoint for the service provider system B 1008 may use a different authentication scheme, such as validating a cryptographic signature included in the request header. This per-provider authorization facilitates secure communication and prevents unauthorized or malicious actors from submitting fraudulent status updates.

Upon receiving a valid webhook postback at a dedicated endpoint, the HTTP server 1020 may be configured to route the data contained in the webhook postback signal to the appropriate service provider module for processing. For example, if a webhook indicating successful order completion is received from the service provider system A 1006, the HTTP server 1020 may forward the payload of the webhook to the service provider module A 1022. The service provider module A 1022 may then process this information, update the order status in its dedicated database tables, and potentially trigger subsequent actions, such as publishing a message to a message queue to notify other parts of the system that a security service may now be activated for the newly provisioned eSIM.

As shown in FIG. 10, the data store 1016 includes a service provider module A 1022, a service provider module B 1024, and a service provider module C 1026. Each of these modules programmatically represents a unique service provider system. For example, each service provider module of the plurality of distinct service provider modules may be an isolated software module with its own dedicated database tables, dedicated message queue topics, and customized internal business logic. In some implementations, each service provider module may reside in a dedicated code repository to enforce strict technical separation and facilitate independent development and deployment cycles.

The service provider module A 1022 may be an isolated software component that programmatically represents the service provider system A 1006 within the provider management system 1004. The service provider module A 1022 may be configured to translate standardized requests received from the provider management component 1014 into the specific format required by the API of the service provider system A 1006. For example, the service provider module A 1022 may contain custom business logic for handling the specific order creation workflow or data validation rules unique to the service provider system A 1006.

The service provider module B 1024 may be an isolated software component that programmatically represents the service provider system B 1008. The service provider module B 1024 is configured to manage all interactions with the service provider system B 1008, encapsulating the unique business logic and API specifications of that provider. In some implementations, if a request to create an order fails due to the unavailability of the service provider system B 1008, the logic within the service provider module B 1024 may be configured to trigger a retry mechanism, such as by publishing a message to a retry topic in a message queue system.

The service provider module C 1026 may be an isolated software component that programmatically represents the service provider system C 1010. The service provider module C 1026 is configured to translate communications between the standardized format used by the provider management component 1014 and the proprietary format used by the service provider system C 1010. By encapsulating provider-specific logic within isolated modules such as the service provider module A 1022, the service provider module B 1024, and the service provider module C 1026, the provider management system 1004 may facilitate the addition of new service provider systems without modifying the core logic of the provider management component 1014 or the API 1012.

Figure 11:
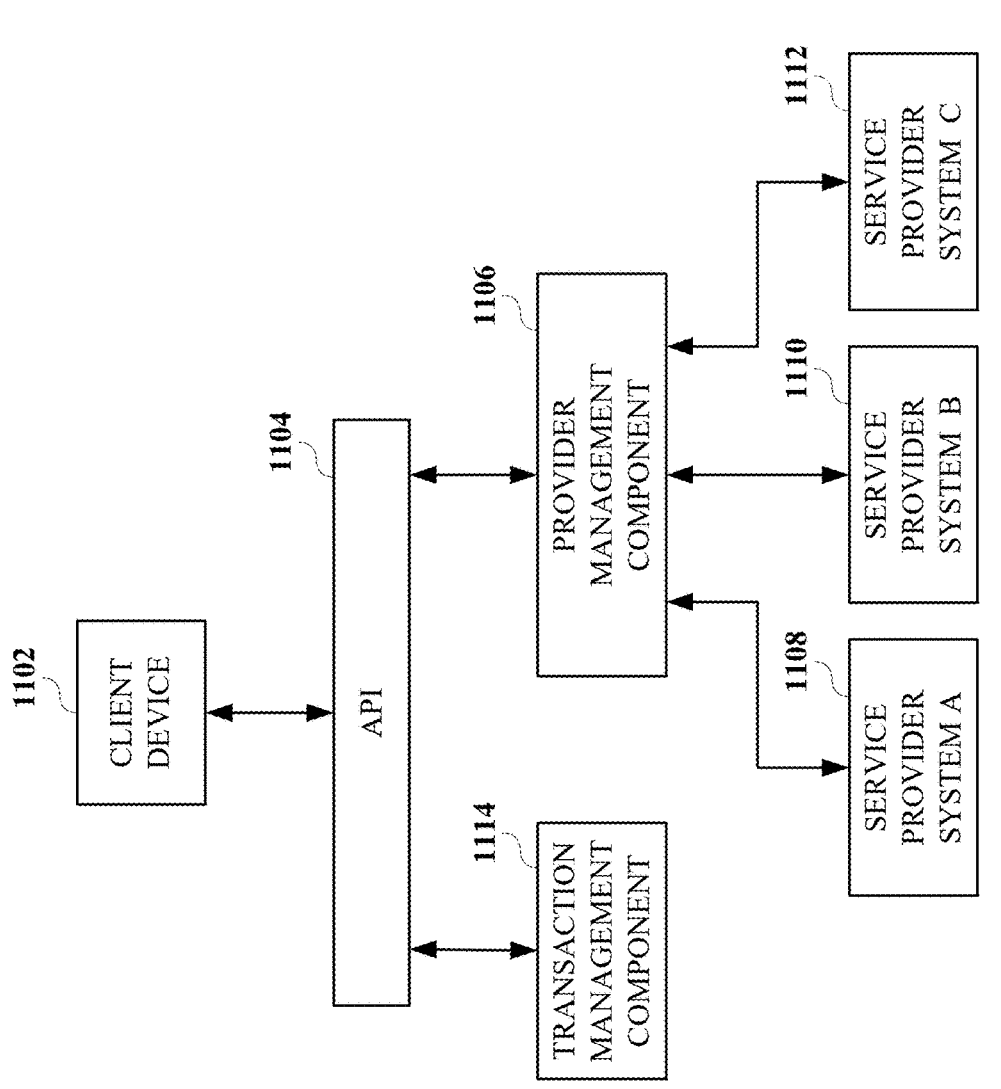
FIG. 11 is a schematic block diagram associated with provisioning multi-provider secure subscriber identification module services.

FIG. 11 is a schematic block diagram associated with provisioning multi-provider secure subscriber identification module services. The system 1100 includes a client device 1102, an API 1104, a provider management component 1106, a service provider system A 1108, a service provider system B 1110, a service provider system C 1112, and a transaction manager 1114. In some implementations, two or more of the client device 1102, the API 1104, the provider management component 1106, the service provider system A 1108, the service provider system B 1110, the service provider system C 1112, and the transaction manager 1114 may be integrated into a single component. In some implementations, one or more of the client device 1102, the API 1104, the provider management component 1106, the service provider system A 1108, the service provider system B 1110, the service provider system C 1112, and the transaction manager 1114 may be implemented using any number of computing devices such as the computing device 100 shown in FIG. 1. For example, one or more of the client device 1102, the API 1104, the provider management component 1106, the service provider system A 1108, the service provider system B 1110, the service provider system C 1112, and the transaction manager 1114 may be distributed among a number of computing devices.

The client device 1102 may be a computing device configured to initiate requests for eSIM services. The client device 1102 may be, be similar to, include, or be included in the client device 1002 shown in FIG. 10, the client device 902 shown in FIG. 9, the client device 602 shown in FIG. 6, the client device 522 shown in FIG. 5B, the client device 502 shown in FIG. 5A, the client device 402 shown in FIG. 4, or the client device 302 shown in FIG. 3. The client device 1102 may be configured to communicate with other components of the system 1100, such as by transmitting a first request associated with an eSIM service to the API 1104. The client device 1102 may include hardware and software components, such as a user interface, to facilitate user interaction for selecting and purchasing eSIM plans.

In some implementations, the client device 1102 may be a smartphone, tablet, laptop, or other computing device that supports eSIM technology. For example, the client device 1102 may execute an application that provides a graphical user interface for browsing available eSIM plans, submitting payment information, and activating a provisioned eSIM profile. The client device 1102 may be configured to receive a response from the API 1104, which may include a list of available plans or a confirmation of a successfully provisioned service.

The client device 1102 may be configured to generate and transmit various types of requests to the API 1104. Examples of these requests may include, but are not limited to, a request for a list of available eSIM service plans, a request to initiate an order for a new plan, or a request to query the status of an existing subscription. The client device 1102 may format these requests according to the specifications defined by the API 1104, for example, using standardized data formats such as JavaScript Object Notation (JSON) or Extensible Markup Language (XML). The client device 1102 may also be configured to handle responses from the API 1104, such as by parsing a list of plans to display to a user or processing an activation code to provision a new eSIM profile.

The API 1104 may be an application programming interface configured to serve as a primary entry point for communications originating from the client device 1102. The API 1104 may be, be similar to, include, or be included in the API 1012 shown in FIG. 10 or the API 618 shown in FIG. 6. The API 1104 may be configured to receive requests from the client device 1102 and to interact with other components, such as the provider management component 1106 and the transaction manager 1114, to fulfill those requests. The API 1104 may expose a set of standardized endpoints that abstract the underlying complexity of the multi-provider system from the client device 1102.

For example, the API 1104 may be a RESTful API configured to receive HTTP requests from the client device 1102. When the client device 1102 transmits a request for available plans, the API 1104 may be configured to receive this request and forward it to the provider management component 1106 for processing. The API 1104 may also be configured to communicate with the transaction manager 1114 to coordinate transactional operations, such as payment processing, associated with an eSIM service order.

In some implementations, the API 1104 may be configured to enforce security and authentication policies for incoming requests from the client device 1102. For example, the API 1104 may require an API key, an OAuth token, or another form of credentials to be included with each request to verify the identity and authorization of the client device 1102. The API 1104 may also be configured to perform validation on the data included in the requests, facilitating that the data is correctly formatted and contains all information for processing by downstream components like the provider management component 1106.

The provider management component 1106 may be a software component configured to orchestrate communications between the API 1104 and a plurality of unique service provider systems, including the service provider system A 1108, the service provider system B 1110, and the service provider system C 1112. The provider management component 1106 may be, be similar to, include, or be included in the provider management component 1014 shown in FIG. 10. The provider management component 1106 may be configured to receive requests from the API 1104 and to resolve the appropriate service provider system to handle each request.

For example, when the API 1104 forwards a first request that includes a composite plan identifier, the provider management component 1106 may be configured to parse this identifier to determine which unique service provider system offers the selected plan. The provider management component 1106 may then transmit a second request, corresponding to the first request, to the appropriate service provider system, such as the service provider system A 1108. This architecture decouples the API 1104 from the specific implementation details of each unique service provider system.

In some implementations, the provider management component 1106 may implement a common service provider module interface that standardizes how it communicates with the programmatic representations of the service provider system A 1108, the service provider system B 1110, and the service provider system C 1112. This may facilitate the addition of new service provider systems to the system with minimal changes to the core logic of the provider management component 1106. The provider management component 1106 may also be configured to handle asynchronous communications, such as by interacting with a message queue system for resilient order creation.

The service provider system A 1108 may be a unique service provider system, such as a mobile network operator (MNO) or mobile virtual network operator (MVNO), configured to offer cellular connectivity services. The service provider system A 1108 may be, be similar to, include, or be included in the service provider system A 1006 shown in FIG. 10, the service provider system 906 shown in FIG. 9, the service provider system 606 shown in FIG. 6, the service provider system 506 shown in FIG. 5A, the service provider system 406 shown in FIG. 4, or the service provider system 306 shown in FIG. 3. The service provider system A 1108 may be configured to communicate with the provider management component 1106 to receive service provisioning requests and to provide status updates.

For example, the provider management component 1106 may transmit an order creation request to the service provider system A 1108 after a user of the client device 1102 has successfully purchased a plan offered by the service provider system A 1108. The service provider system A 1108 may then be configured to process this request, provision the eSIM service, and transmit a response back to the provider management component 1106.

In some implementations, the service provider system A 1108 may have a distinct backend system and API that is programmatically represented within a provider management system by a corresponding service provider module. This service provider module may be configured to translate the standardized requests from the provider management component 1106 into the specific format required by the service provider system A 1108. The service provider system A 1108 may also be configured to send asynchronous notifications, such as webhook postbacks, to the provider management component 1106 to indicate changes in subscription status.

The service provider system B 1110 may be a second unique service provider system, distinct from the service provider system A 1108, configured to offer its own set of cellular connectivity services. The service provider system B 1110 may be, be similar to, include, or be included in the service provider system B 1008 shown in FIG. 10, the service provider system 908 shown in FIG. 9, or the service provider system 408 shown in FIG. 4. The service provider system B 1110 may be configured to communicate with the provider management component 1106 in a manner similar to the service provider system A 1108, but may have its own unique API, data models, and business logic.

For example, the service provider system B 1110 may be an international carrier that specializes in data roaming plans, while the service provider system A 1108 may be a domestic carrier. The provider management component 1106 is configured to abstract these differences, allowing the API 1104 to interact with both service provider systems through a unified interface.

In some implementations, the interaction between the provider management component 1106 and the service provider system B 1110 may be managed by a dedicated service provider module within a provider management system. This module for the service provider system B 1110 may contain the specific logic needed to create orders, query plan information, and handle status updates according to the protocols of the service provider system B 1110. The isolation of this logic facilitates system maintenance and scalability.

The service provider system C 1112 may be a third unique service provider system, distinct from both the service provider system A 1108 and the service provider system B 1110. The service provider system C 1112 may be, be similar to, include, or be included in the service provider system C 1010 shown in FIG. 10. The inclusion of multiple distinct service provider systems illustrates the capacity of the provider management component 1106 to manage a diverse ecosystem of connectivity options. The service provider system C 1112 is configured to receive requests from and send responses to the provider management component 1106.

For example, the service provider system C 1112 may be a provider that specializes in connectivity for Internet of Things (IoT) devices, offering low-bandwidth, low-cost data plans. When a user of the client device 1102 requests to view all available plans, the provider management component 1106 may be configured to query the service provider system A 1108, the service provider system B 1110, and the service provider system C 1112 to aggregate a comprehensive list of options for the user.

In some implementations, a dedicated service provider module for the service provider system C 1112 may encapsulate all provider-specific details, such as API endpoints, authentication methods, and data formats. This modular architecture facilitates the provider management component 1106 in routing a request to the appropriate service provider system, such as the service provider system C 1112, based on a composite plan identifier included in a request from the API 1104.

The transaction manager 1114 may be a component configured to manage transactional aspects of the eSIM service provisioning process. The transaction manager 1114 may be configured to interact with the API 1104 to facilitate operations such as payment processing, order lifecycle management, and maintaining transactional integrity. The bidirectional communication shown between the API 1104 and the transaction manager 1114 indicates a cooperative relationship where these components may exchange information to facilitate the successful completion of a transaction.

For example, after a user of the client device 1102 selects an eSIM plan, the API 1104 may communicate with the transaction manager 1114 to initiate a payment process. The transaction manager 1114 may be configured to interact with an external payment gateway and, upon successful payment, transmit a confirmation back to the API 1104. This confirmation may then trigger the API 1104 to initiate the order creation process with the provider management component 1106.

In some implementations, the transaction manager 1114 may be configured to maintain the state of each order throughout its lifecycle. For instance, the transaction manager 1114 may track whether an order is pending payment, in the process of being provisioned, successfully completed, or has failed. This state management may facilitate error handling and provide a reliable record of all transactions processed by the system 1100.

Figure 12:
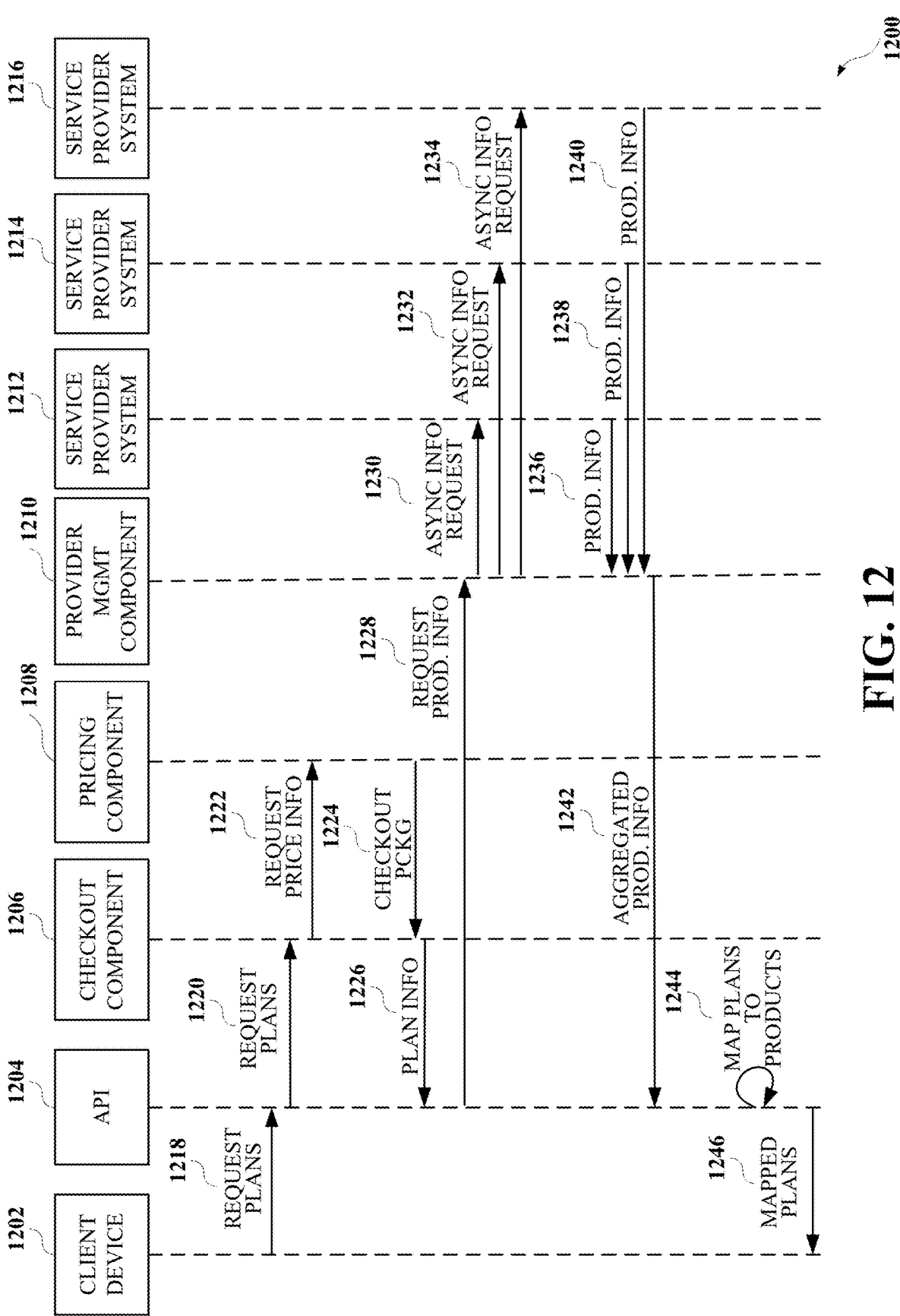
FIG. 12 is a flow diagram of an exemplary process for provisioning multi-provider secure subscriber identification module services.

FIG. 12 is a flow diagram of an exemplary process for provisioning multi-provider secure subscriber identification module services. The process 1200 may be performed by a system such as the system 1000 shown in FIG. 10 or the system 1100 shown in FIG. 11. The process 1200 illustrates the interactions between a client device 1202, an API 1204, a checkout component 1206, a pricing component 1208, a provider management component 1210, and a plurality of unique service provider systems, including a service provider system 1212, a service provider system 1214, and a service provider system 1216. The process 1200 may be implemented using hardware, software, or a combination thereof, and may be executed by one or more computing devices, such as the computing device 100 shown in FIG. 1.

The process 1200 begins at 1218 with the client device 1202 transmitting a request for plans to the API 1204. The client device 1202 may be, be similar to, include, or be included in the client device 1102 shown in FIG. 11 or the client device 1002 shown in FIG. 10. The client device 1202 may be a computing device, such as a smartphone or a tablet, executing an application configured to facilitate the discovery and purchase of eSIM services. The request for plans at 1218 may be generated in response to a user interaction with a graphical user interface of the application, for example, a user selecting an option to view available data plans. The request for plans at 1218 may be formatted as an HTTP request and may include authentication credentials to identify the client device 1202 or the user account.

At 1220, the API 1204 forwards the request for plans to the checkout component 1206. The API 1204 may be, be similar to, include, or be included in the API 1104 shown in FIG. 11 or the API 1012 shown in FIG. 10. The API 1204 may act as the primary entry point for the system, receiving requests from the client device 1202 and orchestrating the necessary interactions with backend components. Forwarding the request at 1220 may involve validating the request from the client device 1202, extracting relevant data, and transmitting it to the checkout component 1206 using an internal communication protocol, such as an RPC.

At 1222, the checkout component 1206 transmits a request for price information to the pricing component 1208. The checkout component 1206 may be configured to manage the user-facing aspects of the plan selection and purchasing workflow. The request for price information at 1222 may be an internal request to retrieve pricing details, promotional offers, or other commercial information associated with the available eSIM plans. The pricing component 1208 may be a dedicated service configured to manage and provide up-to-date pricing data, which may be sourced from a database or an external pricing engine.

At 1224, the pricing component 1208 returns plan information to the checkout component 1206. This plan information may include, but is not limited to, pricing tiers, data allowances, validity periods, and geographical coverage for various eSIM plans. Upon receiving the plan information, the checkout component 1206 may package this data into a checkout package, also referenced at 1224, which may be a data structure containing all the information needed to present the available plans to the user and to initiate a provisioning request.

At 1226, the checkout component 1206 transmits the plan information, potentially as part of the checkout package, to the provider management component 1210. The provider management component 1210 may be, be similar to, include, or be included in the provider management component 1106 shown in FIG. 11 or the provider management component 1014 shown in FIG. 10. The provider management component 1210 may be configured to act as an abstraction layer, managing communications with multiple, distinct service provider systems.

At 1228, the API 1204 transmits a request for production information to the provider management component 1210. At 1230, 1232, and 1234, the provider management component 1210 transmits requests for product information to the service provider system 1212, the service provider system 1214, and the service provider system 1216, respectively. The service provider systems may be, be similar to, include, or be included in the service provider system A 1108, the service provider system B 1110, and the service provider system C 1112 shown in FIG. 11. These requests may be transmitted asynchronously, as indicated at 1230, 1232, and 1234, to query each service provider system for their current product offerings and technical specifications. This step demonstrates the system's ability to aggregate data from a plurality of distinct service provider modules, where each service provider module corresponds to a unique service provider system.

At 1236, 1238, and 1240, the service provider system 1212, the service provider system 1214, and the service provider system 1216 each transmit a response containing product information back to the provider management component 1210. This product information may include technical details about the eSIM profiles, network capabilities, and any provider-specific data required for provisioning. In some implementations, the requests may be transmitted asynchronously to facilitate load balancing and optimize the provider management system's performance.

At 1242, the provider management component 1210 aggregates the product information received from the plurality of service provider systems and transmits the aggregated product information back to the checkout component 1206. This aggregation process involves combining the disparate data from each provider into a unified and consistent format. This step may be part of transmitting a response to the primary API, as it is part of the overall process to fulfill the initial request for plans.

At 1244, the checkout component 1206 performs an internal operation to map the aggregated plans to the corresponding product information. This mapping may involve correlating the commercial plan information received from the pricing component 1208 with the technical product information received from the provider management component 1210, creating a comprehensive data object for each available plan.

At 1246, the checkout component 1206 transmits the mapped plans to the API 1204. This represents the fulfillment of the initial request for plans. The API 1204 may then format this data and transmit a final response to the client device 1202, which may then display the comprehensive list of available and priced eSIM plans to the user. This flow illustrates a method for handling a request for a list of available eSIM service plans, where the system queries multiple providers and aggregates the results.

The disclosed subject matter provides a technical solution that facilitates the aggregation and presentation of diverse eSIM service offerings. The process 1200 depicted in FIG. 12 illustrates a structured method for decoupling the client-facing request for service plans from the complex, multi-provider backend query process. This decoupling is achieved through a provider management component that acts as a centralized orchestrator, asynchronously gathering product information from a plurality of distinct service provider systems. By aggregating disparate product data into a unified and consistently formatted response, the system may simplify the logic required in the primary API and client device application, which no longer needs to implement and maintain separate communication protocols for each unique service provider system. This abstraction layer may enhance system scalability and maintainability, as new service provider systems may be integrated without requiring modifications to the core client-facing components.

Figure 13:
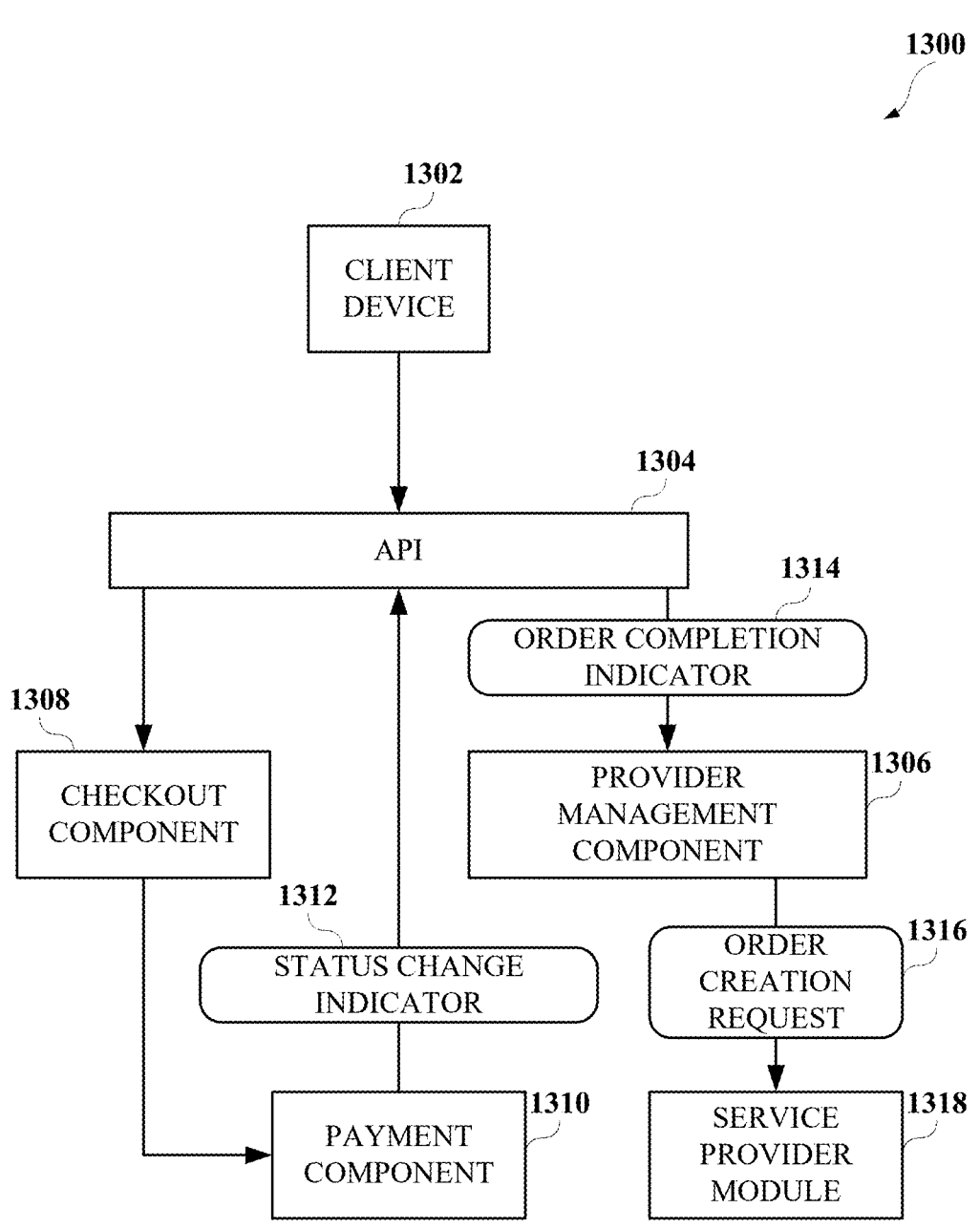
FIG. 13 is a schematic block diagram associated with provisioning multi-provider secure subscriber identification module services.

FIG. 13 is a schematic block diagram associated with provisioning multi-provider secure subscriber identification module services. The system 1300 includes a client device 1302, an API 1304, a provider management component 1306, a checkout component 1308, a payment component 1310, and a service provider module 1318. The system 1300 illustrates a process flow for handling a new order, from initiation by the client device 1302 to the transmission of an order creation request to the service provider module 1318. The process is orchestrated by the API 1304 and the provider management component 1306, and involves interactions with components for checkout and payment processing.

The client device 1302 may be a computing device configured to initiate a request for an eSIM service. The client device 1302 may be, be similar to, include, or be included in the client device 1202 shown in FIG. 12, the client device 1102 shown in FIG. 11, the client device 1002 shown in FIG. 10, the client device 902 shown in FIG. 9, the client device 602 shown in FIG. 6, the client device 522 shown in FIG. 5B, the client device 502 shown in FIG. 5A, the client device 402 shown in FIG. 4, or the client device 302 shown in FIG. 3. The client device 1302 may be configured to communicate with the API 1304 to start a transaction, such as by submitting a shopping cart for processing after selecting an eSIM plan. The client device 1302 may include a user interface that facilitates this interaction.

In some implementations, the client device 1302 may be a mobile device, such as a smartphone, that executes a dedicated application for managing eSIM services. For example, a user may select a desired data plan within the application and initiate the purchase process, which causes the client device 1302 to transmit a request to the API 1304. The client device 1302 may also be configured to receive status updates or confirmations from the API 1304 regarding the progress of the order.

The API 1304 may be an interface configured to serve as the primary entry point for requests originating from the client device 1302 and to orchestrate the interactions between the various backend components of the system 1300. The API 1304 may be, be similar to, include, or be included in the API 1204 shown in FIG. 12, the API 1104 shown in FIG. 11, the API 1012 shown in FIG. 10, or the API 618 shown in FIG. 6. The API 1304 is configured to receive an initial request from the client device 1302 and to route communications to the checkout component 1308 and the provider management component 1306.

The API 1304 may also be configured to receive asynchronous notifications, such as a status change indicator 1312 from the payment component 1310. In response to such an indicator, which may signal a successful payment, the API 1304 may be configured to generate and transmit an order completion indicator 1314 to the provider management component 1306, thereby triggering the next stage of the provisioning process. In some implementations, the API 1304 may publish an order creation message to a message queue system in response to a successful payment event.

In some implementations, the API 1304 may be a RESTful API that defines a set of standardized endpoints for initiating checkout, checking order status, and managing subscriptions. The API 1304 may be configured to enforce authentication and authorization policies to facilitate secure communication with the client device 1302. For example, the API 1304 may require valid credentials, such as an API key or an OAuth token, to be included with each request from the client device 1302.

The provider management component 1306 may be a software component configured to manage communications with a plurality of distinct service provider modules. The provider management component 1306 may be, be similar to, include, or be included in the provider management component 1210 shown in FIG. 12, the provider management component 1106 shown in FIG. 11, or the provider management component 1014 shown in FIG. 10. The provider management component 1306 may be configured to receive an order completion indicator 1314 from the API 1304. This indicator may contain the necessary data, such as a composite plan identifier and user account information, to proceed with provisioning.

Upon receiving the order completion indicator 1314, the provider management component 1306 may be configured to resolve a target service provider module based on the information within the indicator. The provider management component 1306 is then configured to transmit an order creation request 1316 to the resolved service provider module 1318. This action formally initiates the provisioning of the eSIM service with the unique service provider system represented by the service provider module 1318.

In some implementations, the provider management component 1306 may act as a consumer of messages from a message queue system. For example, the order completion indicator 1314 may be transmitted in the form of a message on a dedicated message topic. The provider management component 1306 may be configured to consume this message, parse its contents to identify the target service provider module, and then transmit the order creation request 1316.

The checkout component 1308 may be a component configured to manage the checkout process for an eSIM service order. The checkout component 1308 may be, be similar to, include, or be included in the checkout component 1206 shown in FIG. 12. The checkout component 1308 may be configured to receive a request from the API 1304, which may be initiated by the client device 1302. The checkout component 1308 may then communicate with the payment component 1310 to initiate payment processing.

In some implementations, the checkout component 1308 may be configured to calculate the total cost of an order, apply any applicable discounts or promotions, and prepare the transaction details for the payment component 1310. For example, after receiving a cart processing request from the API 1304, the checkout component 1308 may validate the items in the cart, retrieve final pricing, and then transmit a request to the payment component 1310 to authorize the transaction.

The payment component 1310 may be a component configured to handle payment processing for the eSIM service order. The payment component 1310 may be configured to receive a request from the checkout component 1308 and to interact with external payment gateways to process a transaction. Upon completion of the transaction, the payment component 1310 may be configured to generate and transmit a status change indicator 1312 to the API 1304.

In some implementations, the status change indicator 1312 may be a webhook postback or another form of asynchronous notification that informs the API 1304 of a successful payment event. For example, after a user completes a payment using a credit card, the payment component 1310 may receive a confirmation from the payment gateway and, in response, transmit the status change indicator 1312 to the API 1304, signaling that the order is paid and ready for provisioning.

The service provider module 1318 may be an isolated software module that programmatically represents a unique service provider system. The service provider module 1318 may be, be similar to, include, or be included in the service provider module A 1022, the service provider module B 1024, or the service provider module C 1026 shown in FIG. 10. The service provider module 1318 is configured to receive the order creation request 1316 from the provider management component 1306.

The service provider module 1318 may contain the specific business logic, data models, and API interaction details necessary to communicate with its corresponding unique service provider system's backend system. Upon receiving the order creation request 1316, the service provider module 1318 may be configured to translate this standardized request into the specific format required by the unique service provider system and transmit it to provision the eSIM service.

In some implementations, the service provider module 1318 may be configured to handle error conditions or retry logic specific to its corresponding service provider system. For example, if an initial attempt to create an order fails due to a temporary issue with the service provider system's API, the service provider module 1318 may be configured to initiate a retry operation after a specified delay. The service provider module 1318 may also be configured to transmit a response back to the provider management component 1306 indicating the success or failure of the order creation attempt.

Figure 14:
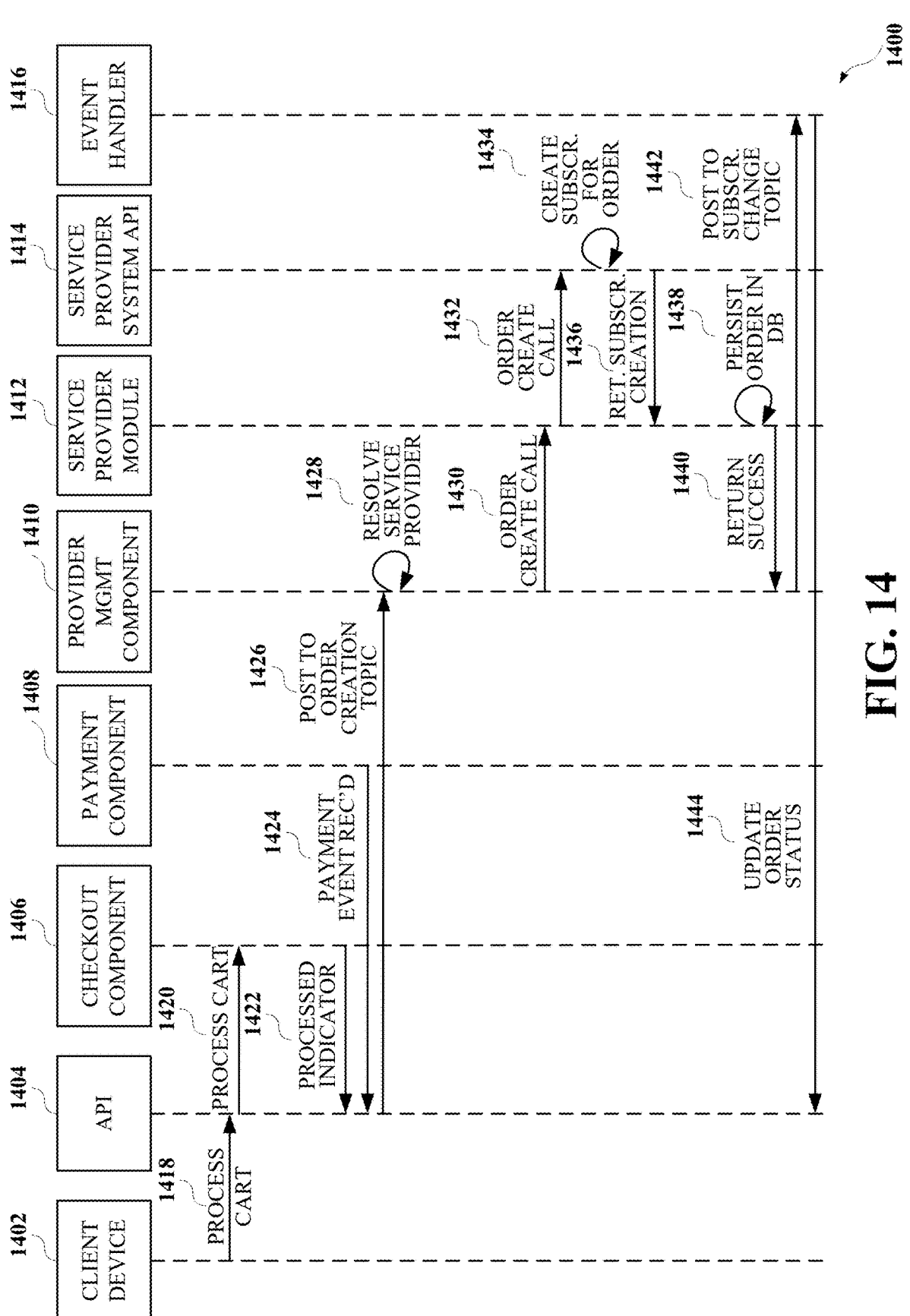
FIG. 14 is a flow diagram of an exemplary process for provisioning multi-provider secure subscriber identification module services.

FIG. 14 is a flow diagram of an exemplary process for provisioning multi-provider secure subscriber identification module services. The process 1400 illustrates the interactions between a client device 1402, an API 1404, a checkout component 1406, a payment component 1408, a provider management component 1410, a service provider module 1412, a service provider system API 1414, and an event handler 1416. The process 1400 may be implemented using hardware, software, or a combination thereof, and may be executed by one or more computing devices, such as the computing device 100 shown in FIG. 1.

The process 1400 begins at 1418, where the client device 1402 transmits a request to process a cart to the API 1404. The client device 1402 may be, be similar to, include, or be included in the client device 1302 shown in FIG. 13. This request may be generated after a user has selected one or more eSIM service plans and initiates a purchase. The request to process the cart at 1418 may include data identifying the selected plans, user account information, and any other data needed for the transaction. In some implementations, the request is a first request associated with an eSIM service, and may include a composite plan identifier.

At 1420, the API 1404 forwards the request to process the cart to the checkout component 1406. The API 1404 may be, be similar to, include, or be included in the API 1304 shown in FIG. 13. This action may involve validating the incoming request from the client device 1402 and routing it to the appropriate internal service responsible for managing the checkout workflow. The checkout component 1406 may be configured to prepare the transaction for payment processing.

At 1422, the checkout component 1406 transmits a processed indicator to the payment component 1408. The checkout component 1406 may be, be similar to, include, or be included in the checkout component 1308 shown in FIG. 13. This indicator may signal that the cart contents have been validated and the final transaction amount has been calculated, authorizing the payment component 1408 to proceed with collecting payment from the user.

At 1424, the payment component 1408 transmits a payment event received indicator to the API 1404. The payment component 1408 may be, be similar to, include, or be included in the payment component 1310 shown in FIG. 13. This indicator signifies that a successful payment processing event has occurred, confirming that the user has successfully paid for the selected eSIM service plan. In some implementations, this indicator may be transmitted as an asynchronous webhook postback to an endpoint on the API 1404.

At 1426, the API 1404 transmits a post to an order creation topic to the event handler 1416. This action is triggered by the successful payment event. In some implementations, this may involve publishing an order creation message to a first message topic of a message queue system, such as Kafka. The order creation message may contain all the information from the original request, such as the composite plan identifier and user account details, needed to provision the service. This asynchronous, message-based approach decouples the payment confirmation from the order fulfillment, enhancing system resilience.

At 1428, the event handler 1416 transmits a request to resolve the service provider system to the provider management component 1410. The event handler 1416 may be a component configured to consume messages from the message queue and orchestrate subsequent actions. This step involves communicating with the provider management component 1410 to determine the appropriate target service provider module from a plurality of distinct service provider modules based on the composite plan identifier included in the order creation message.

At 1430, the provider management component 1410 transmits an order create call to the service provider module 1412. The provider management component 1410 may be, be similar to, include, or be included in the provider management component 1306 shown in FIG. 13. After resolving the target service provider module, the provider management component 1410 transmits a second request, corresponding to the first request, to the resolved module. In some implementations, this may be an RPC made via a common service provider module interface.

At 1432, the service provider module 1412 transmits an order create call to the service provider system API 1414. The service provider module 1412, which may be similar to the service provider module 1318 shown in FIG. 13, is an isolated software module that programmatically represents a unique service provider system. This step involves translating the standardized request from the provider management component 1410 into the specific format required by the unique service provider system's external API and transmitting it to initiate the provisioning.

At 1434, the service provider system API 1414 transmits a request to create a subscription for the order to the event handler 1416. This may be a webhook postback or other asynchronous notification from the unique service provider system, confirming that the subscription has been successfully created on their backend system. This signal indicates that the eSIM service is ready for use.

At 1436, the service provider module 1412 receives a return subscription creation signal from the service provider system API 1414. This signal is a response to the order create call from 1432, providing confirmation or status information regarding the subscription creation process. This response may then be transmitted from the target service provider module to the primary API via the provider management component 1410.

At 1438, the provider management component 1410 receives an instruction to persist the order in a database from the service provider module 1412. Upon receiving a successful response from the service provider system API 1414, the service provider module 1412 may instruct the provider management component 1410 to update the order's status to 'completed' or a similar state in a persistent data store.

At 1440, the provider management component 1410 returns a success indicator to the event handler 1416. This indicates that the order creation request has been successfully processed and persisted, completing the order fulfillment part of the workflow.

At 1442, the event handler 1416 posts to a subscription change topic. This is an internal notification that the subscription state has changed. This event may be consumed by other parts of the system, for example, to activate a security service for the data traffic associated with the newly provisioned eSIM. Activating a security service may include applying a security service to data traffic to generate a secure communication.

At 1444, the checkout component 1406 performs an operation to update the order status. This final step in the process updates the overall order record to reflect that the entire process, from payment to provisioning, is complete. This may trigger a final notification to be sent to the client device 1402 confirming that their eSIM service is active.

The process 1400 provides a resilient and scalable technical solution for provisioning multi-provider eSIM services. By decoupling the client-facing transaction from the backend order fulfillment process through a message-based architecture, the system may enhance availability and fault tolerance. For example, using a first message topic for order creation, as shown at 1426, facilitates asynchronous processing, which may prevent the primary API 1404 from being blocked or failing if a specific service provider system's API 1414 is temporarily unavailable. This architectural choice abstracts the complexities and potential latencies of communicating with multiple, distinct provider APIs from the user-facing components, such as the checkout component 1406, which may contribute to a more responsive user experience. Furthermore, the modular design, wherein a provider management component 1410 resolves a specific service provider module 1412, may simplify the integration of new service provider systems without necessitating changes to the core API or payment processing logic. The process may also facilitate the activation of associated security services in response to provisioning events, as indicated by the posting to a subscription change topic at 1442, providing a structured mechanism for linking service activation with security policy enforcement.

Figure 15:
FIG. 15 is a flowchart of a technique for providing a secure SIM networking service.
Figure 15:
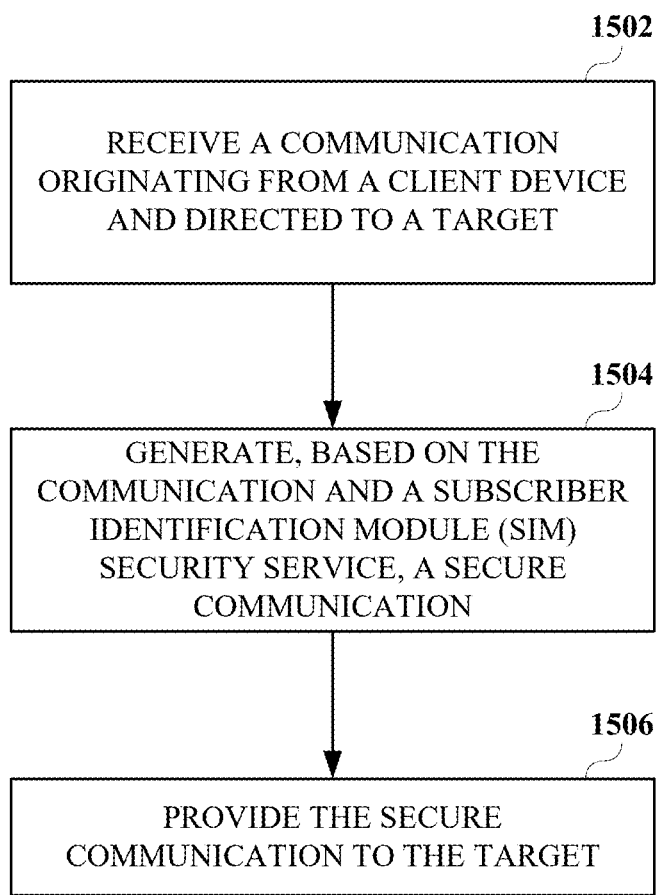

To further describe some implementations in greater detail, reference is next made to examples of techniques which may be performed in association with a secure SIM networking service. FIG. 15 is a flowchart of a technique 1500 for providing a secure SIM networking service. The technique 1500 can be executed using computing devices, such as the systems, hardware, and software described with respect to FIGS. 1-14. The technique 1500 can be implemented, for example, as a software program that may be executed by computing devices such as the computing device 100 of FIG. 1. The software program can include machine-readable instructions that may be stored in a memory such as the memory 106, and that, when executed by a processor, such as the processor 104, may cause the computing device 100 to perform the technique 1500. The technique 1500 may be implemented at least in part by an intermediary system, such as, for example, the intermediary system 910 shown in FIG. 9, the intermediary system 508 shown in FIG. 5A, the intermediary system 526 shown in FIG. 5B, the intermediary system 410 shown in FIG. 4, or the intermediary system 308 shown in FIG. 3. The technique 1500 can be implemented using specialized hardware or firmware. Multiple processors, memories, or both, may be used.

At 1502, the technique 1500 includes receiving, by an intermediary system between a service provider system and a target, a communication originating from a client device device and directed to a target. In some implementations, the intermediary system comprises a security service platform and at least one of a PoP or a VPN. At 1504, the technique 1500 includes generating, based on the communication and a SIM security service, a secure communication. At 1506, the technique 1500 includes providing the secure communication to the target.

In some implementations, the technique 1500 includes receiving, from the service provider system, first metadata associated with the communication; and accessing second metadata associated with the client device device, wherein the secure communication may be based on the first metadata and the second metadata. In some implementations, the first metadata includes at least one of an MSISDN associated with the client device device, an ICCID associated with an SIM component (e.g., an eSIM component) of the client device device, an IP address associated with the client device device, or location information associated with the client device device. In some implementations, the second metadata includes at least one of an MSISDN associated with the client device device, an ICCID associated with an eSIM component of the client device device, an IP address associated with the client device device, or an IP address associated with the service provider system. In some implementations, the technique 1500 includes receiving user input indicative of an exit point, where the secure communication is based on the exit point. In some implementations, the exit point is associated with at least one of a virtual private network or a location (e.g., a country, a state, a city, or a region). The user input may be received from the client device device.

In some implementations, the technique 1500 includes receiving, from the service provider system, first metadata associated with the request and accessing second metadata associated with the client device device, where the secure communication is based on the first metadata and the second metadata. In some implementations, at least a portion of the second metadata is stored in a data store of the security service platform. In some implementations, accessing the second metadata includes receiving at least a portion of the second metadata from the service provider system. In some implementations, the security service platform includes a service engine and the technique 1500 includes generating, by the service engine, service information including the first metadata, the second metadata, and a service indication corresponding to the SIM security service.

In some implementations, the security service platform includes a service engine, and the technique 1500 includes selecting, by the service engine and based on at least one of the second metadata and the SIM security service, a PoP of a PoP system. In some implementations, providing the secure communication to the target includes transmitting the secure communication to the PoP for routing to the target. In some implementations, the technique 1500 includes determining, based on the SIM security service, a routing path associated with a VPN. In some implementations, providing the secure communication to the target includes transmitting, based on the routing path, the secure communication to the VPN.

Figure 16:
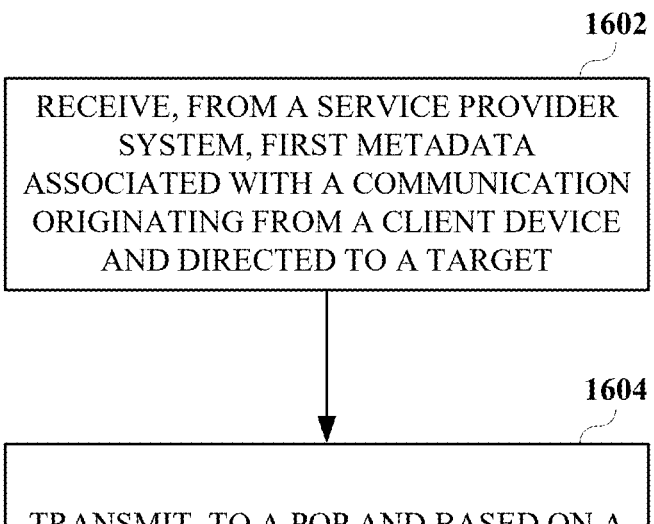
FIG. 16 is a flowchart of a technique for providing a secure SIM networking service.

FIG. 16 is a flowchart of a technique 1600 for providing a secure SIM networking service. The technique 1600 can be executed using computing devices, such as the systems, hardware, and software described with respect to FIGS. 1-14. The technique 1600 can be implemented, for example, as a software program that may be executed by computing devices such as the computing device 100 of FIG. 1. The software program can include machine-readable instructions that may be stored in a memory such as the memory 106, and that, when executed by a processor, such as the processor 104, may cause the computing device 100 to perform the technique 1600. The technique 1600 may be implemented at least in part by an intermediary system, such as, for example, the intermediary system 910 shown in FIG. 9, the intermediary system 508 shown in FIG. 5A, the intermediary system 526 shown in FIG. 5B, the intermediary system 410 shown in FIG. 4, or the intermediary system 308 shown in FIG. 3. The technique 1600 can be implemented using specialized hardware or firmware. Multiple processors, memories, or both, may be used.

At 1602, the technique 1600 includes receiving, from a service provider system, first metadata associated with a communication originating from a client device and directed to a target. At 1604, the technique 1600 includes transmitting, to a PoP and based on an SIM security service, service information including the first metadata and second metadata associated with the client device.

In some implementations, the first metadata includes at least one of an MSISDN associated with the client device, an ICCID associated with an eSIM component of the client device, location information associated with the client device, an IP address associated with the client device, or an exit point indication. In some implementations, the exit point is associated with at least one of a virtual private network or a location. In some implementations, the second metadata includes at least one of an MSISDN associated with the client device, an ICCID associated with an eSIM component of the client device, an IP address associated with the client device, or an IP address associated with the service provider system. In some implementations, the technique 1600 includes determining, based on the SIM security service, a routing path associated with a VPN, where the service information is indicative of the routing path.

Figure 17:
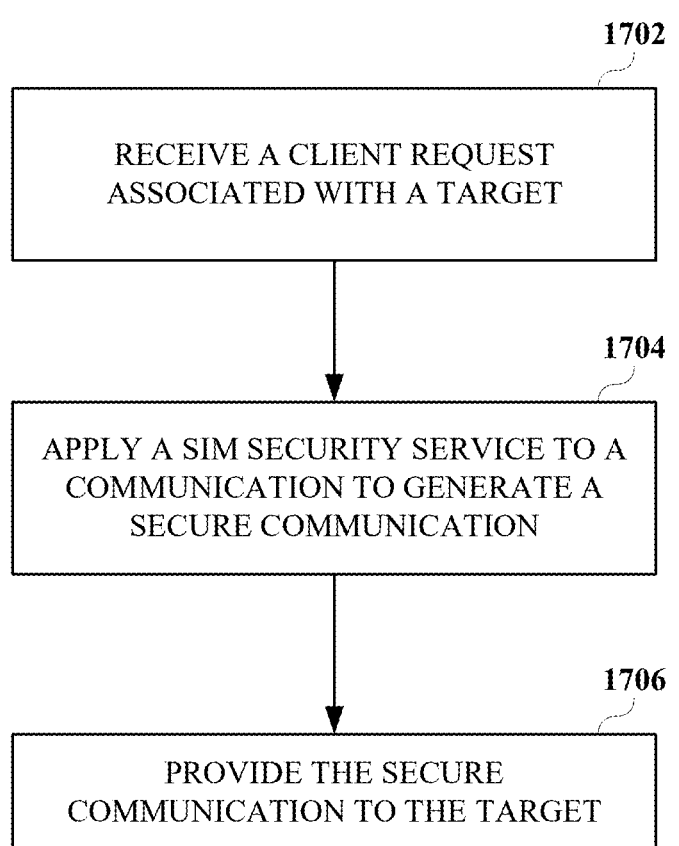
FIG. 17 is a flowchart of a technique for providing a secure SIM networking service.

FIG. 17 is a flowchart of a technique 1700 for providing a secure SIM networking service. The technique 1700 can be executed using computing devices, such as the systems, hardware, and software described with respect to FIGS. 1-14. The technique 1700 can be implemented, for example, as a software program that may be executed by computing devices such as the computing device 100 of FIG. 1. The software program can include machine-readable instructions that may be stored in a memory such as the memory 106, and that, when executed by a processor, such as the processor 104, may cause the computing device 100 to perform the technique 1700. The technique 1700 may be implemented at least in part by an intermediary system, such as, for example, the intermediary system 910 shown in FIG. 9, the intermediary system 508 shown in FIG. 5A, the intermediary system 526 shown in FIG. 5B, the intermediary system 410 shown in FIG. 4, or the intermediary system 308 shown in FIG. 3. The technique 1700 can be implemented using specialized hardware or firmware. Multiple processors, memories, or both, may be used.

At 1702, the technique 1700 includes receiving, by PoP, a client device request associated with a target. At 1704, the technique 1700 includes receiving, from a security service platform, service information associated with an SIM security service, the service information including first metadata associated with the request and second metadata associated with the client device. At 1706, the technique 1700 includes providing, based on the request and the SIM security service, a secure communication to the target.

In some implementations, the first metadata includes at least one of an MSISDN associated with the client device, an ICCID associated with an eSIM component of the client device, an IP address associated with the client device, or location information associated with the client device. In some implementations, the second metadata includes at least one of an MSISDN associated with the client device, an ICCID associated with an eSIM component of the client device, an IP address associated with the client device, or an IP address associated with the service provider system.

In some implementations, the technique 1700 includes receiving user input indicative of an exit point, where the secure request is based on the exit point. In some implementations, the exit point is associated with at least one of a virtual private network or a location. In some implementations, the technique 1700 includes receiving first metadata associated with the request and receiving second metadata associated with the client device, where the secure request is based on the first metadata and the second metadata. In some implementations, the technique 1700 includes determining, based on the SIM security service, a routing path associated with a VPN. In some implementations, providing the secure request to the target includes transmitting, based on the routing path, the secure request to the VPN.

FIG. 18 is a flowchart of a technique 1800 for providing a secure eSIM networking service. The technique 1800 can be executed using computing devices, such as the systems, hardware, and software described with respect to FIGS. 1-14. The technique 1800 can be implemented, for example, as a software program that may be executed by computing devices such as the computing device 100 of FIG. 1. The software program can include machine-readable instructions that may be stored in a memory such as the memory 106, and that, when executed by a processor, such as the processor 104, may cause the computing device 100 to perform the technique 1800. The technique 1800 may be implemented at least in part by an intermediary system, such as, for example, the intermediary system 910 shown in FIG. 9, the intermediary system 508 shown in FIG. 5A, the intermediary system 526 shown in FIG. 5B, the intermediary system 410 shown in FIG. 4, or the intermediary system 308 shown in FIG. 3. The technique 1800 can be implemented using specialized hardware or firmware. Multiple processors, memories, or both, may be used.

At 1802, the technique 1800 includes receiving, by PoP, a communication originating from a client device and directed to a target. At 1804, the technique 1800 includes receiving, from a security service platform, service information associated with an SIM security service, the service information including first metadata associated with the request, second metadata associated with the client device, an IP address associated with the client device, and a service indication corresponding to the SIM security service. At 1806, the technique 1800 includes determining, based on the service information and the SIM security service and the service indication, a routing path associated with a VPN. At 1808, the technique 1800 includes providing, based on the routing path, a secure request to the VPN.

In some implementations, the first metadata includes at least one of an MSISDN associated with the client device, an ICCID associated with an eSIM component of the client device, or location information associated with the client device. In some implementations, the second metadata includes at least one of an MSISDN associated with the client device, an ICCID associated with an eSIM component of the client device, an IP address associated with the client device, or an IP address associated with the service provider system.

FIG. 19 is a flowchart of an example of a technique 1900 associated with provisioning multi-provider secure subscriber identification module services. The technique 1900 can be executed using computing devices, such as the systems, hardware, and software described with respect to FIGS. 1-18. The technique 1900 can be performed, for example, by executing a machine-readable program or other computer-executable instructions, such as routines, instructions, programs, or other code. The steps, or operations, of the technique 1900, or another technique, method, process, or algorithm described in connection with the implementations disclosed herein can be implemented directly in hardware, firmware, software executed by hardware, circuitry, or a combination thereof. For simplicity of explanation, the technique 1900 is depicted and described herein as a series of steps or operations. However, the steps or operations of the technique 1900 can occur in various orders and/or concurrently. Additionally, other steps or operations not presented and described herein may be used. Furthermore, not all illustrated steps or operations may be required to implement a technique in accordance with the disclosed subject matter.

At 1902, the technique 1900 includes receiving a first request message associated with an embedded subscriber identification module (eSIM) service, the first request message including a plan identifier associated with a service plan offered by a service provider system. For example, a provider management component of an intermediary system may receive the first request message from a client device. In some implementations, receiving the first request message comprises receiving the first request message via an application programming interface (API) of the intermediary system. In some implementations, the first request message is generated by the client device subsequent to a processing of a payment event by a payment component of the intermediary system. In some implementations, receiving the first request message may include publishing, by an application programming interface (API) of the intermediary system and based on a successful payment processing event, the first request message to an order creation topic of an asynchronous event queue associated with the service provider system, and consuming, by the provider management component, the first request message from the order creation topic.

At 1904, the technique 1900 includes identifying, based on the plan identifier, a target service provider module corresponding to the service provider system, wherein the target service provider module comprises a dedicated data structure, stored in the intermediary system, comprising at least one of a database table associated with the service provider system, an asynchronous event queue associated with the service provider system, or a set of workflow logic components associated with the service provider system. For example, the provider management component may identify the target service provider module from a plurality of service provider modules stored in a data store of the intermediary system, wherein each service provider module of the plurality of service provider modules corresponds to a different service provider system of a plurality of service provider systems.

At 1906, the technique 1900 includes providing, via the target service provider module, an order creation request signal to request completion of an order corresponding to the service plan. For example, the provider management component may provide the order creation request signal to the service provider system via the target service provider module. In some implementations, the technique 1900 may include determining, by the provider management component, that providing the order creation request signal resulted in an error, and publishing, by an API and based on the error, a message to a retry topic of the asynchronous event queue associated with the service provider module to facilitate a subsequent attempt to provide the order creation request signal. The technique may then include consuming the message from the retry topic and re-providing the order creation request signal.

At 1908, the technique 1900 includes receiving, from the service provider system, a subscription creation confirmation signal indicative of creation, by the service provider system, of a subscription associated with the service plan. For example, the target service provider module may receive the subscription creation confirmation signal. This signal may be received via a webhook event at a dedicated endpoint of an HTTP server of the provider management component. The provider management component may then proxy the event to the target service provider module for processing.

At 1910, the technique 1900 includes receiving, from the target service provider module, an order completion status signal based on the subscription creation confirmation signal. For example, the provider management component receives the order completion status signal. In some implementations where the dedicated data structure includes a database table, the technique may include persisting, by the target service provider module and subsequent to receiving the subscription creation confirmation signal, an indication of the order in the database table associated with the service provider system.

At 1912, the technique 1900 includes posting, to a subscription change topic of an asynchronous event queue managed by an event handler component of the intermediary system, an indication of a completion of the order to cause the event handler component to provide an updated order status signal to the client device. For example, the provider management component may post the indication. In some implementations, the technique 1900 includes generating a secure communication based on applying, by the intermediary system, a security service to data traffic generated using the eSIM service, which may be triggered by the posting to the subscription change topic Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, by a provider management component provided by a processor that executes instructions stored in a memory of an intermediary system and from a client device, a first request message associated with an embedded subscriber identification module (eSIM) service, the first request message including a plan identifier associated with a service plan offered by a service provider system,
   identifying, by the provider management component and based on the plan identifier, a target service provider module corresponding to the service provider system, wherein the target service provider module comprises a dedicated data structure, stored in the intermediary system, comprising at least one of a database table associated with the service provider system, an asynchronous event queue associated with the service provider system, or a set of workflow logic components associated with the service provider system;
   providing, by the provider management component via the target service provider module, an order creation request signal to request completion of an order corresponding to the service plan;
   receiving, by the target service provider module from the service provider system, a subscription creation confirmation signal indicative of creation, by the service provider system, of a subscription associated with the service plan;
   receiving, by the provider management component from the target service provider module, an order completion status signal based on the subscription creation confirmation signal; and
   posting, by the provider management component to a subscription change topic of an asynchronous event queue managed by an event handler component of the intermediary system, an indication of completion of the order to cause the event handler component to provide an updated order status signal to the client device.

2. The method of claim 1, wherein receiving the first request message comprises receiving the first request message via an application programming interface (API) of the intermediary system.

3. The method of claim 2, wherein the first request message is generated by the client device subsequent to a processing of a payment event by a payment component of the intermediary system.

4. The method of claim 1, wherein the dedicated data structure of the target service provider module comprises the database table associated with the service provider system, the method comprising:
   persisting, by the target service provider module and subsequent to receiving the subscription creation confirmation signal, an indication of the order in the database table associated with the service provider system.

5. The method of claim 1, wherein the target service provider module is one of a plurality of service provider modules stored in a data store of the intermediary system, and wherein each service provider module of the plurality of service provider modules corresponds to a different service provider system of a plurality of service provider systems.

6. The method of claim 1, wherein the provider management component comprises a hypertext transfer protocol (HTTP) server, the method comprising:
   receiving, by the HTTP server, one or more webhook events from the service provider system, wherein the one or more webhook events include at least one asynchronous notification corresponding to a change in a status of the subscription; and
   proxying, by the HTTP server, the one or more webhook events to a dedicated endpoint of the target service provider module to cause the target service provider module to process the change in the status of the subscription.

7. The method of claim 1, comprising:

transmitting, from the provider management component to a plurality of service provider systems, a plurality of asynchronous requests for product information; and receiving, at the provider management component and based on the plurality of asynchronous requests, a plurality of asynchronous responses indicative of a plurality of sets of product information, wherein each set of product information of the plurality of sets of product information is associated with a corresponding service provider system of the plurality of service provider systems.

8. The method of claim 7, comprising:

aggregating, by the provider management component, the product information into a single aggregated set of product information; and providing the single aggregated set of product information to the client device.

9. The method of claim 8, comprising:

providing the single aggregated set of product information to an application programming interface (API) of the intermediary system to cause the API to map the single aggregated set of product information to a set of available service plans associated with the plurality of service provider systems.

10. A system, comprising:

one or more memories; and one or more processors communicatively coupled with the one or more memories, the one or more processors configured to execute instructions stored in the one or more memories to cause the system to:

receive, by a provider management component of the system and from a client device, a first request message associated with an embedded subscriber identification module (eSIM) service, the first request message including a plan identifier associated with a service plan offered by a service provider system;

identify, by the provider management component and based on the plan identifier, a target service provider module corresponding to the service provider system, wherein the target service provider module comprises a dedicated data structure, stored in the system, comprising at least one of a database table associated with the service provider system, an asynchronous event queue associated with the service provider system, or a set of workflow logic components associated with the service provider system;

provide, by the provider management component via the target service provider module, an order creation request signal to request completion of an order corresponding to the service plan;

receive, by the target service provider module from the service provider system, a subscription creation confirmation signal indicative of creation, by the service provider system, of a subscription associated with the service plan;

receive, by the provider management component from the target service provider module, an order completion status signal based on the subscription creation confirmation signal; and post, by the provider management component to a subscription change topic of an asynchronous event queue managed by an event handler component of the system, an indication of a completion of the order to cause the event handler component to provide an updated order status signal to the client device.

11. The system of claim 10, wherein the one or more processors are configured to execute the instructions to cause the system to:

receive, by a hypertext transfer protocol (HTTP) server of the provider management component and at a first dedicated endpoint corresponding to the target service provider module, a callback event from the service provider system; and authenticate the callback event using a first authorization operation unique to the first dedicated endpoint, wherein the first authorization operation is different from a second authorization operation associated with a second service provider module stored in the system.

12. The system of claim 11, wherein the one or more processors are configured to execute the instructions to cause the system to:

route, based on a successful authentication, the callback event to the target service provider module for processing.

13. The system of claim 12, wherein the callback event includes a data payload having a data structure unique to the service provider system, and wherein, to process the callback event, the one or more processors are configured to execute the instructions to cause the system to:

process the data payload using a set of workflow logic components of the target service provider module.

14. The system of claim 11, wherein the callback event comprises an asynchronous notification indicating a change in a status of a subscription associated with the service plan.

15. The system of claim 10, wherein, to receive the first request message, the one or more processors are configured to execute the instructions to cause the system to:

publish, by an application programming interface (API) of the system and based on a successful payment processing event, the first request message to an order creation topic of the asynchronous event queue associated with the service provider system.

16. The system of claim 15, wherein, to receive the first request message, the one or more processors are configured to execute the instructions to cause the system to:

consume, by the provider management component, the first request message from the order creation topic of the asynchronous event queue associated with the service provider system.

17. One or more non-transitory computer-readable media storing instructions operable to cause one or more processors to perform operations comprising:

receiving, by a provider management component of an intermediary system and from a client device, a first request message associated with an embedded subscriber identification module (eSIM) service, the first request message including a plan identifier associated with a service plan offered by a service provider system;

identifying, by the provider management component and based on the plan identifier, a target service provider module corresponding to the service provider system, wherein the target service provider module comprises a dedicated data structure, stored in the intermediary system, comprising at least one of a database table associated with the service provider system, an asynchronous event queue associated with the service provider system, or a set of workflow logic components associated with the service provider system;

providing, by the provider management component via the target service provider module, an order creation request signal to request completion of an order corresponding to the service plan;

receiving, by the target service provider module from the service provider system, a subscription creation confirmation signal indicative of creation, by the service provider system, of a subscription associated with the service plan;

receiving, by the provider management component from the target service provider module, an order completion status signal based on the subscription creation confirmation signal; and posting, by the provider management component to a subscription change topic of an asynchronous event queue managed by an event handler component of the intermediary system, an indication of a completion of the order to cause the event handler component to provide an updated order status signal to the client device.

18. The one or more non-transitory computer-readable media of claim 17, the operations comprising:

determining, by the provider management component, that providing the order creation request signal resulted in an error; and publishing, by an application programming interface (API) and based on the error, a message to a retry topic of the asynchronous event queue associated with the service service provider module to facilitate a subsequent attempt to provide the order creation request signal.

19. The one or more non-transitory computer-readable media of claim 18, the operations comprising:

consuming, by the provider management component, the message from the retry topic; and re-providing, by the provider management component via the target service provider module, the order creation request signal to the service provider system.

20. The one or more non-transitory computer-readable media of claim 17, the operations comprising:

generating a secure communication based on applying, by the intermediary system, a security service to data traffic generated using the eSIM service.

* * * * *